United States Patent
Wilkerson et al.

(10) Patent No.: US 9,934,166 B2
(45) Date of Patent: Apr. 3, 2018

(54) HARD OBJECT: CONSTRAINING CONTROL FLOW AND PROVIDING LIGHTWEIGHT KERNEL CROSSINGS

(71) Applicants: Daniel Shawcross Wilkerson, Berkeley, CA (US); Mark William Winterrowd, San Francisco, CA (US)

(72) Inventors: Daniel Shawcross Wilkerson, Berkeley, CA (US); Mark William Winterrowd, San Francisco, CA (US)

( * ) Notice: Subject to any disclaimer, the term of this patent is extended or adjusted under 35 U.S.C. 154(b) by 781 days.

(21) Appl. No.: 13/804,633

(22) Filed: Mar. 14, 2013

(65) Prior Publication Data

US 2013/0283017 A1 Oct. 24, 2013

Related U.S. Application Data

(63) Continuation-in-part of application No. 12/965,158, filed on Dec. 10, 2010, now abandoned.

(51) Int. Cl.
| | |
|---|---|
| *G06F 9/30* | (2006.01) |
| *G06F 9/32* | (2006.01) |
| *G06F 12/10* | (2016.01) |
| *G06F 12/14* | (2006.01) |
| *G06F 12/1009* | (2016.01) |

(52) U.S. Cl.
CPC ...... *G06F 12/1483* (2013.01); *G06F 9/30043* (2013.01); *G06F 9/322* (2013.01); *G06F 12/1009* (2013.01); *G06F 12/145* (2013.01)

(58) Field of Classification Search
CPC .... G06F 9/30043; G06F 9/3005; G06F 9/322; G06F 12/1483; G06F 12/145; G06F 12/1009; G06F 12/1458; G06F 12/1416; G06F 12/1453; G06F 9/3004
See application file for complete search history.

(56) References Cited

U.S. PATENT DOCUMENTS

| | | |
|---|---|---|
| 4,408,274 A | 10/1983 | Wheatley et al. |
| 4,434,464 A | 2/1984 | Suzuki et al. |
| 4,442,484 A | 4/1984 | Childs et al. |
| 4,525,780 A | 6/1985 | Bratt et al. |
| 4,701,846 A | 10/1987 | Ikeda et al. |
| 5,075,842 A | 12/1991 | Lai |
| 5,075,845 A | 12/1991 | Lai et al. |

(Continued)

OTHER PUBLICATIONS

[BO-2003]: Randal E. Bryant and David R. O'Hallaron "Computer Systems: A Programmer's Perspective" Prentice Hall 2003.

(Continued)

*Primary Examiner* — Benjamin Geib
(74) *Attorney, Agent, or Firm* — Brown & Michaels, PC

(57) ABSTRACT

A method providing simple fine-grain hardware primitives with which software engineers can efficiently implement enforceable separation of programs into modules and constraints on control flow, thereby providing fine-grain locality of causality to the world of software. Additionally, a mechanism is provided to mark some modules, or parts thereof, as having kernel privileges and thereby allows the provision of kernel services through normal function calls, obviating the expensive prior art mechanism of system calls. Together with software changes, Object Oriented encapsulation semantics and control flow integrity in hardware are enforced.

13 Claims, 31 Drawing Sheets

(56) References Cited

U.S. PATENT DOCUMENTS

| | | | |
|---|---|---|---|
| 5,075,848 | A | 12/1991 | Lai et al. |
| 5,157,777 | A | 10/1992 | Lai et al. |
| 5,563,843 | A | 10/1996 | Fackenthal et al. |
| 5,627,987 | A | 5/1997 | Nozue et al. |
| 5,845,129 | A | 12/1998 | Wendorf et al. |
| 5,890,189 | A | 3/1999 | Nozue et al. |
| 5,892,944 | A | 4/1999 | Fukumoto et al. |
| 6,542,919 | B1 | 4/2003 | Wendorf et al. |
| 6,615,340 | B1 | 9/2003 | Wilmot, II |
| 6,854,039 | B1 | 2/2005 | Strongin et al. |
| 6,873,993 | B2 | 3/2005 | Charlesworth et al. |
| 6,941,473 | B2 | 9/2005 | Etoh et al. |
| 7,134,050 | B2 | 11/2006 | Wenzel |
| 7,197,502 | B2 | 3/2007 | Fiensmith |
| 7,287,140 | B1 | 10/2007 | Asanovic et al. |
| 7,467,272 | B2 | 12/2008 | Genty et al. |
| 7,584,461 | B2 | 9/2009 | Plum |
| 7,882,318 | B2 | 2/2011 | Savagaonkar et al. |
| 7,917,710 | B2 | 3/2011 | Freeman et al. |
| 8,136,091 | B2 * | 3/2012 | Erlingsson .......... G06F 12/1441 713/151 |
| 8,364,910 | B2 | 1/2013 | Wilkerson et al. |
| 8,495,036 | B2 | 7/2013 | Calder et al. |
| 2002/0123981 | A1 | 9/2002 | Baba et al. |
| 2003/0172246 | A1 | 9/2003 | Tessarolo |
| 2008/0222397 | A1 | 9/2008 | Wilkerson et al. |
| 2012/0102268 | A1 | 4/2012 | Smith et al. |
| 2012/0255001 | A1 | 10/2012 | Sallam |
| 2013/0205285 | A1 | 8/2013 | Pizlo |
| 2014/0201422 | A1 | 7/2014 | Tseng et al. |
| 2014/0258635 | A1 | 9/2014 | Hong et al. |
| 2016/0147811 | A1 | 5/2016 | Eluri et al. |

OTHER PUBLICATIONS

[EKO-1995]: Dawson R. Engler, M. Frans Kaashoek, James O'Toole "Exokernel: An Operating System Architecture for Application-Level Resource Management", Symposium on Operating Systems Principles, 1995, pp. 251-266.
[HP-1998]: "HP OpenVMS Systems Documentation: OpenVMS Alpha Guide to 64-Bit Addressing and VLM Features", Jan. 1998.
[I-2005] "Intel 80386 Programmers Reference Manual", 1986.
[OSSNMS-1992]: T. Okamoto, H. Segawa, S. H. Shin, H. Nozue, Ken-Ichi Maeda, M. Saito, "A Micro-Kernel Architecture for Next Generation Processors", Proceedings of the Workshop on Microkernels and Other Kernel Architectures, 1992, pp. 83-94.
[W-2004]: Emmett Witchel, "Mondrian Memory Protection", Ph.D. Thesis MIT, 2004.
[WA-2003]: Emmett Witchel, Krste Asanovic, "Hardware Works, Software Doesn't: Enforcing Modularity with Mondriaan Memory Protection" 9th Workshop on Hot Topics in Operating Systems (HotOS-IX), Lihue, HI, May 2003.
[WCA-2002]: Emmett Witchel, Josh Cates, Krste Asanovic, "Mondrian Memory Protection", ASPLOS-X: Proceedings of the 10th international conference on Architectural support for programming languages and operating systems, San Jose, California 2002, pp. 304-316.
[WS-1992]: John Wilkes, Bart Sears, "A comparison of Protection Lookaside Buffers and the PA-RISC protection architecture", HP Laboratories Technical Report HPL-92-55, Mar. 1992, pp. 1-11.
[ZLFLQZMT-2004]: P. Zhou, W. Liu, L. Fei, S. Lu, F. Qin, Y. Zhou, S. Midkiff, J. Torrellas, "AccMon: Automatically Detecting Memory-related Bugs via Program Counter-based Invariants", IEEE Micro, 2004.
[ZQLZT-2004]: P. Zhou, F. Qin, W. Liu, Y. Zhou, J. Torrellas, "Matcher: Efficient Architectural Support for Software Debugging", International Symposium on Computer Architecture ISCA, 2004.
[ZQLZT-2004b]: P. Zhou, F. Qin, W. Liu, Y. Zhou, J. Torrellas, "iWatcher: Simple and General Architectural Support for Software Debugging", IEEE Top Picks in Computer Architecture, 2004.
Martin Abadi, Mihai Budiu, Ulfar Erlingsson, Jay Ligatti, "Control-Flow Integrity: Principles, Implementations, and Applications", ACM Conference on Computer and Communications Security, Nov. 2005.
Jeffrey S. Chase, Henry M. Levy, Michael J. Feeley, Edward D. Lazowska, "Sharing and Protection in a Single-Address-Space Operating System", ACM Transactions on Computer Systems 1994, vol. 12, No. 4, pp. 271-307.
E.J. Koldinger, J.S. Chase, S.J. Eggers, "Architectural Support for Single Address Space Operating Systems", 1992, Architectural Support for Programming Languages and Operating Systems (ASPLOS) V, pp. 175-186.
Robert Wahbe, Steven Lucco, Thomas E. Anderson, Susan L. Graham "Efficient Software-Based Fault Isolation", ACM SIGOPS Operating Systems Review, Dec. 1993, vol. 27, No. 5, pp. 203-216.
A. Wiggins, S. S Winwood, H. Tuch, G. Heiser, "Legba: Fast Hardware Support for Fine-Grained Protection", 8th Asia-Pacific Computer Systems Architecture Conference (ACSAC), Apr. 2003.
Thread in usenet newsgroup comp.arch "Does PowerPC 970 has Tagged TLBs", May 2003.
Thread in usenet newsgroup comp.sys.hp.hpux "Severe performance problems with shared libraries at HP-UX 9.05", Nov. 1995.
Intel, "Intel Itanium Architecture Software Developer's Manual, vol. 2: System Architecture", Revision 2.3, May 2010, pp. 2:59-2:60, pp. 2:564-2:565.
Intel, "Intel Itanium Architecture Software Developer's Manual, vol. 3: Intel Itanium Instruction Set Reference", Revision 2.3, May 2010, p. 3:29, p. 3:53.
Nicholas P. Carter, Stephen W. Keckler, William J. Dally. "Hardware Support for Fast Capability-based Addressing", ASPLOS-VI Proceedings—Sixth International Conference on Architectural Support for Programming Languages and Operating Systems, San Jose, California, Oct. 4-7, 1994. ACM SIGPLAN Notices 29(11) pp. 319-327.
Joe Devietti, Colin Blundell, Milo M. K. Martin, Steve Zdancewic. "HardBound: Architectural Support for Spatial Safety of the C Programming Language", ASPLOS-XIII Proceedings—Thirteenth International Conference on Architectural Support for Programming Languages and Operating Systems, Seattle, Washington, Mar. 1-5, 2008. ACM SIGARCH Computer Architecture News 36(1) pp. 103-114.
Bennet Yee, David Sehr, Gregory Dardyk, J. Bradley Chen, Robert Muth, Tavis Ormandy, Shiki Okasaka, Neha Narula, Nicholas Fullagar, "Native Client: A Sandbox for Portable, Untrusted x86 Native Code," sp, pp. 79-93, 2009 30th IEEE Symposium on Security and Privacy, May 17, 2009.
"Control-Flow Integrity Principles, Implementations, and Applications", Abadi, et. al, ACM Journal, vol. V, No. N, Feb. 2007, pp. 1-41 (revised version of 2005 Abadi et. al paper previously cited).
Daniel Wilkerson, David Alexander Molnar, Matthew Harren, and John D. Kubiatowicz. "Hard-Object: Enforcing object Interfaces using code-range data protection". Technical Report UCB/EECS-2009-97, EECS Department, University of California, Berkeley, Jul. 8, 2009.
Kevin Klues, Derrick Coetzee, Daniel Wilkerson, Mark Winterrowd, and John Kubiatowicz. "Evaluating Hard Object: a lightweight module isolation system", Dec. 11, 2009.
Nagarakatte et al. "WatchdogLite: Hardware-Accelerated Compiler-Based Pointer Checking"; 2014 International Symposium on Code Generation and Optimization; Feb. 15-19, 2014.
Bojinov et al. "Address Space Randomization for Mobile Devices"; Fourth ACM Conference on Wireless Network Security; Jun. 14-17, 2011.
Warg et al. "Rounding Pointers-Type Safe Capabilities with C++ Meta Programming", 6th Workshop on Programming Languages and Operating Systems; Oct. 23, 2011.

* cited by examiner

Figure 3a -- Prior Art
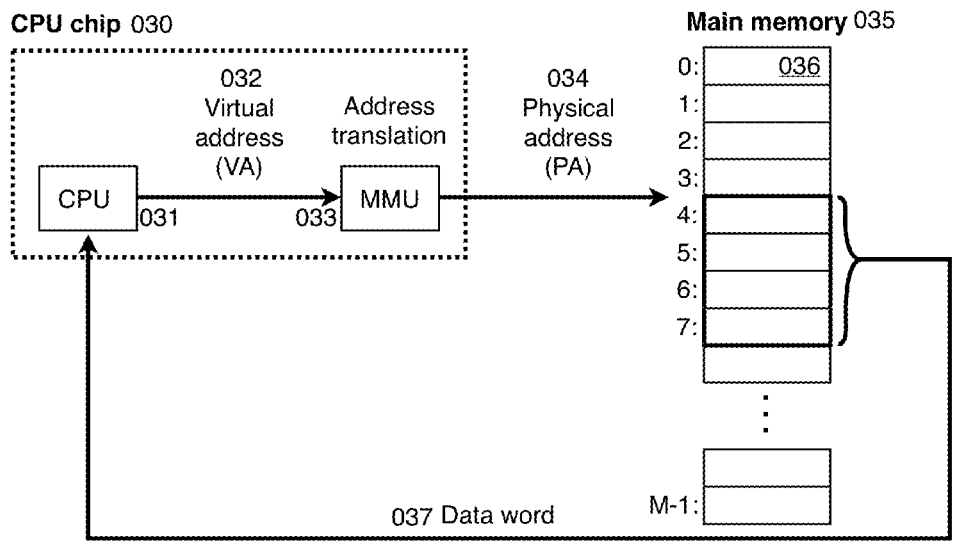
Figure 3b
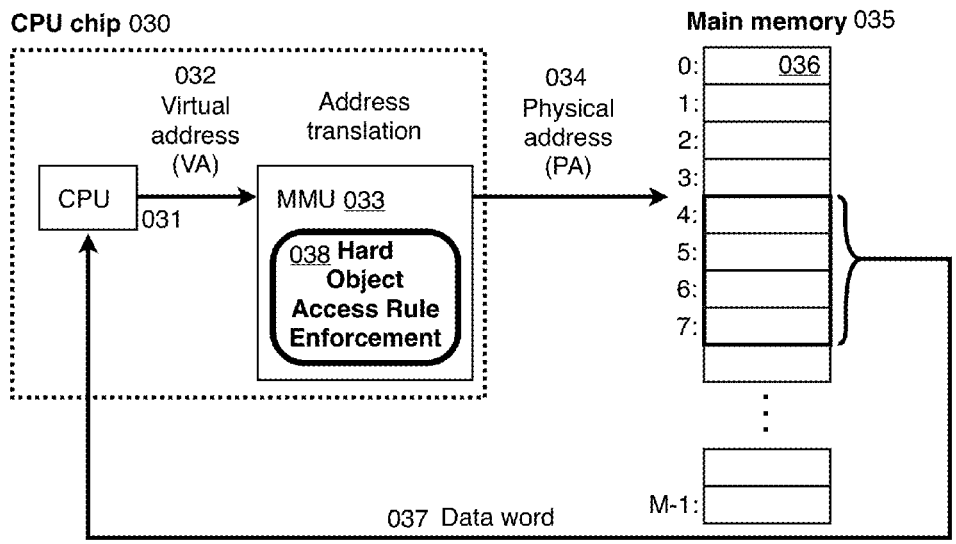

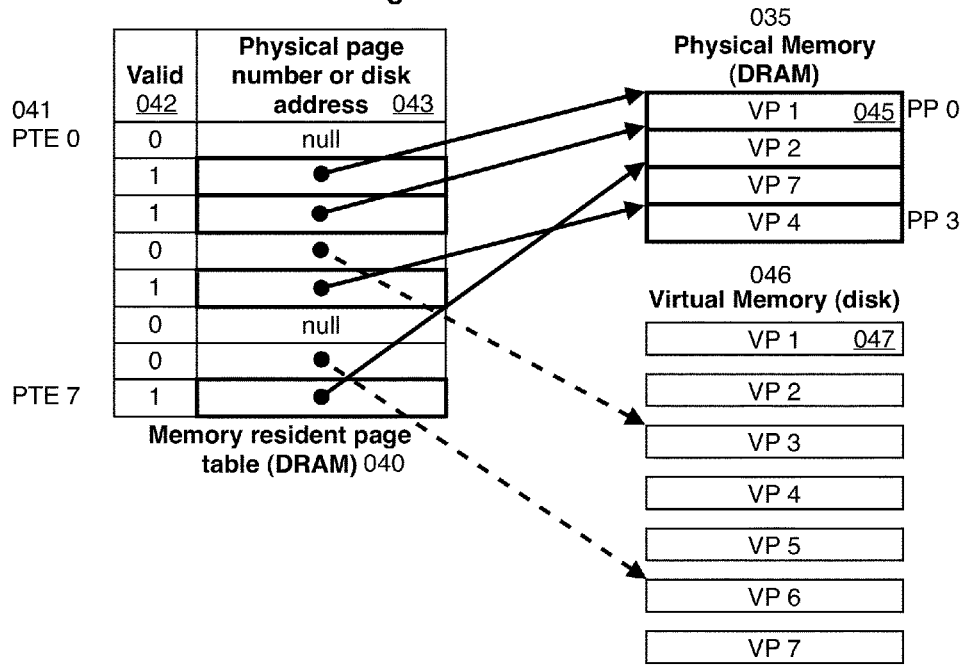
Figure 4 -- Prior Art
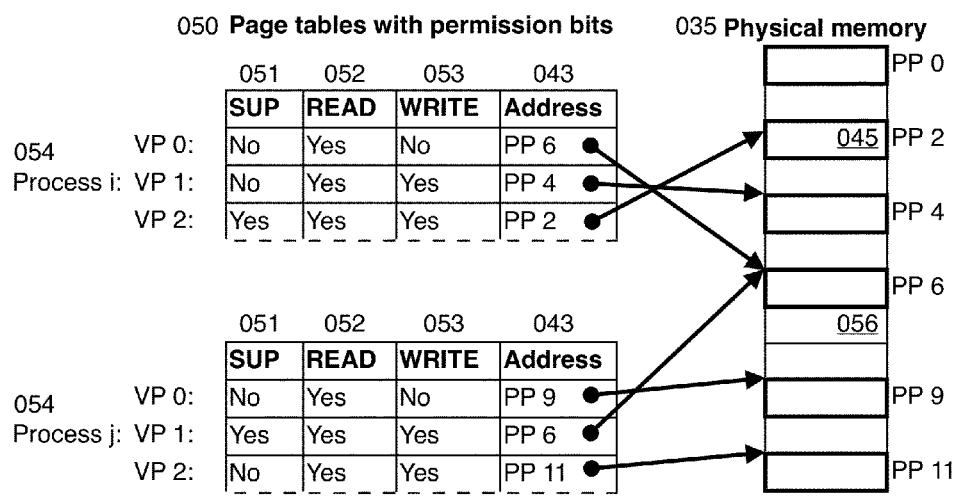
Figure 5 -- Prior Art

Figure 6

| Page table 060 | | | | |
|---|---|---|---|---|
| 051 | 052 | 053 | | 043 |
| SUP (1 bit) | READ (1 bit) | WRITE (1 bit) | Hard Object meta-data | Address (32 bits) |
| VP 0: No | Yes | No | (see below) | PP 6 |
| VP 1: No | Yes | Yes | | PP 4 |
| VP 2: Yes | Yes | Yes | | PP 2 |

| Hard Object Meta-Data 061 | | | | | |
|---|---|---|---|---|---|
| text bit (1 bit) 062 | owner module-id (15 bits) 063 | integrity bit 064 (1 bit) | danger bit (1 bit) 065 | control bit (1 bit) 066 | target-tag (12 bits) 067 |
| VP 0: text | 0x0003 | No | No | Yes | 0xA73 |
| VP 1: data | 0x0003 | Yes | No | No | 0x000 |
| VP 2: data | 0x0017 | Yes | No | No | 0x000 |

Figure 10a

| type | meta-data field name | description |
|---|---|---|
| Bit | text 062 | text page (vs. data page) |
| UInt | owner-module-id 063 | owner module ID |
| Bit | integrity 064 | data integrity verified |
| Bit | danger 065 | code on page runs as kernel |
| Bit | control 066 | internal transfers are also controlled |
| UInt | target-tag 067 | equals argument of target-indicator instructions on page |

Figure 10b

| type | meta-data field name | description |
|---|---|---|
| Bit | public-readable 100 | data is public readable |

Figure 11

| type | register name | description |
|---|---|---|
| Address | caller-protect 021 | top of function arguments |
| Address | stack-limit 022 | max allowed extent of stack |

Figure 11b

| type | register name | description |
|---|---|---|
| UInt | current-module-id register 110 | used in lieu of (instead of) the owner module-id annotated onto the instruction address of the currently executing instruction |
| UInt | current-module-suff-len register 111 | optional: at a data access, the number of least significant bits to ignore when comparing the current-module-id and the target data page ownable-module-id |

Figure 12a

| | |
|---|---|
| set-owner-module-id(Address x, UInt newOwnerModuleID) | 120 |
| UInt get-owner-module-id(Address x) | 121 |
| set-integrity(Address x, Bit newIntegrity) | 122 |
| Bit get-integrity(Address x) | 123 |
| set-caller-protect(Address newCallerProtect) | 124 |
| Address get-caller-protect() | 125 |
| set-stack-limit(Address newStackLimit) | 126 |
| Address get-stack-limit() | 127 |

Figure 12b

| | |
|---|---|
| branch-on-integrity-false(Address x, Address jumpTo) | 128 |
| branch-on-integrity-true(Address x, Address jumpTo) | 129 |

Figure 12c

| | |
|---|---|
| set-public-readable(Address x, Bit newPublicReadable) | 12A |
| Bit get-public-readable(Address x) | 12B |

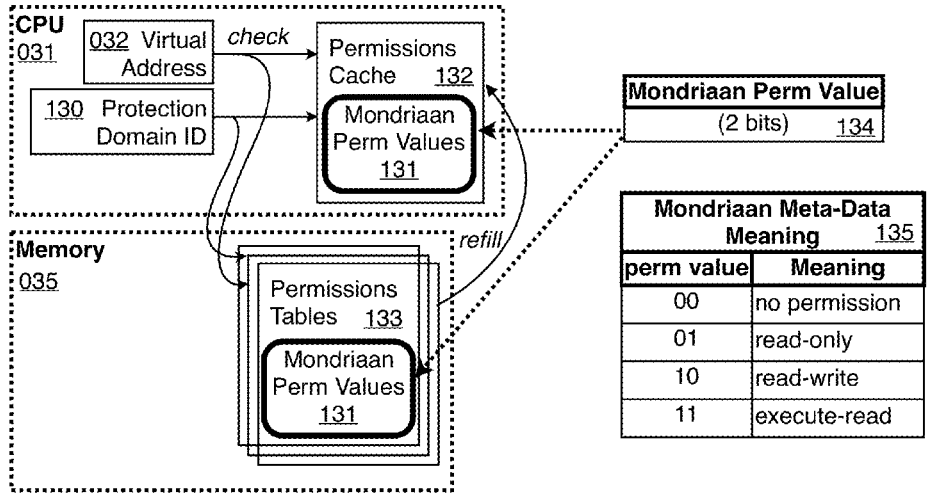
Figure 13a -- Prior Art
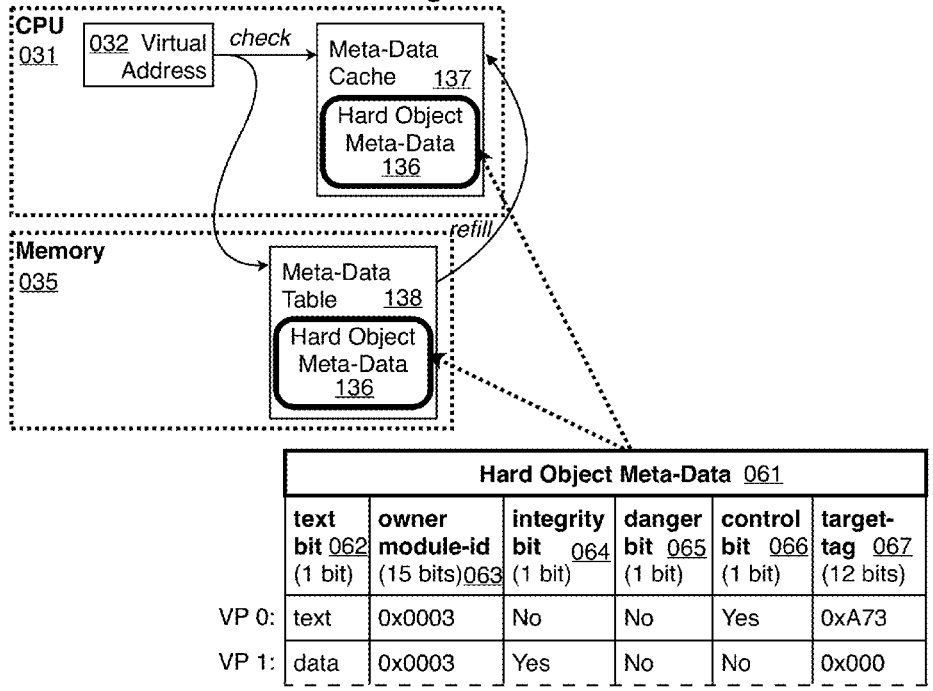
Figure 13b

Figure 20

| instruction | description |
|---|---|
| target-pub(UInt target-tag argument 203) 200 | cross-mod or internal calls may land |
| target-priv(UInt target-tag argument 203) 201 | internal calls may land |
| target-jump(UInt target-tag argument 203) 202 | (internal) jumps or branches may land |

Figure 21

| CPU status bit name | | description |
|---|---|---|
| just-called-cross | 210 | just made a cross-module function call |
| just-called-internal | 211 | just made an internal function call |
| just-jumped | 212 | just made an internal jump or branch |

Figure 22

| stack data | | notes |
|---|---|---|
| caller temporaries . . . | 220 | |
| . . . | | |
| saved return address | 221 | |
| saved caller caller-protect | 222 | |
| callee function argument N | 223 | <-- caller-protect 021 |
| . . . | | |
| callee argument 2 | 223 | |
| callee argument 1 | 223 | |
| callee temporaries . . . | 224 | <-- prior art frame-pointer (if being used) 225 |
| . . . | | <-- prior art stack-pointer 226 |
| | | <-- stack-limit 022 |

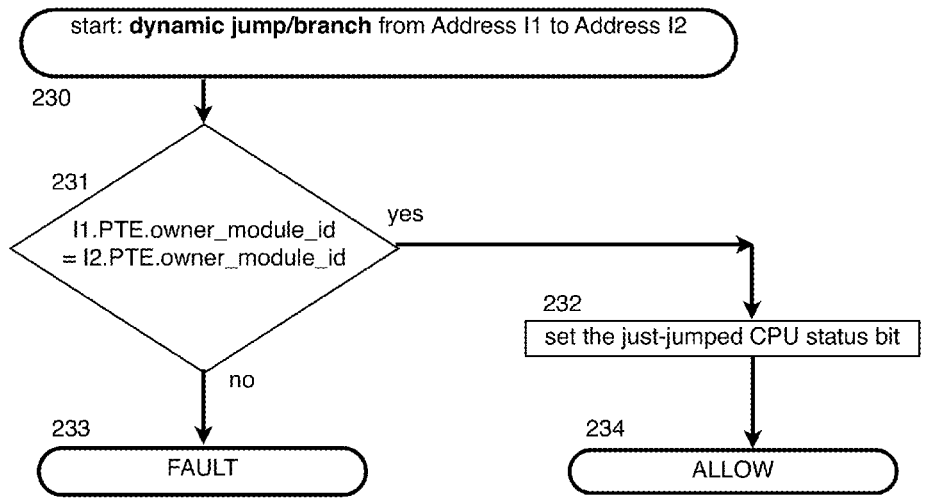
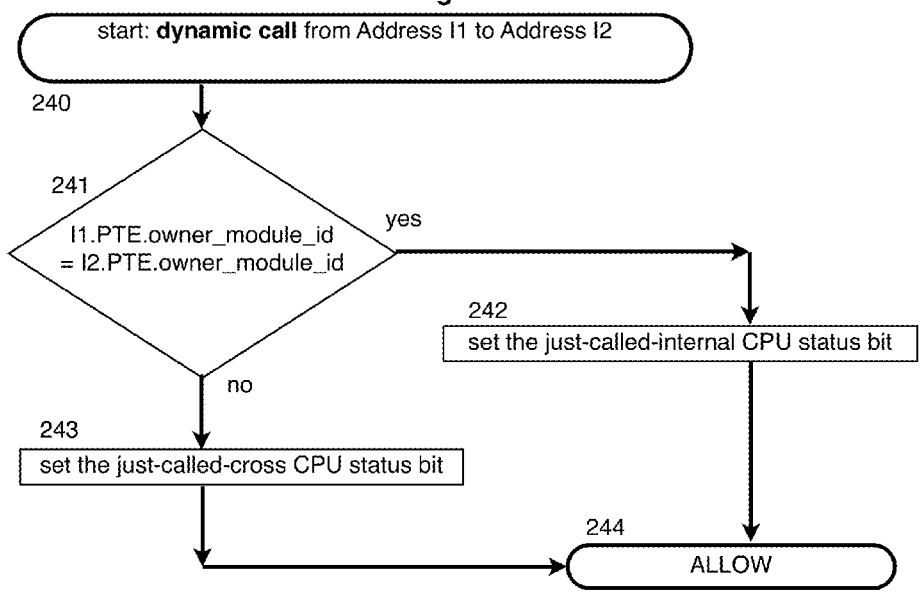

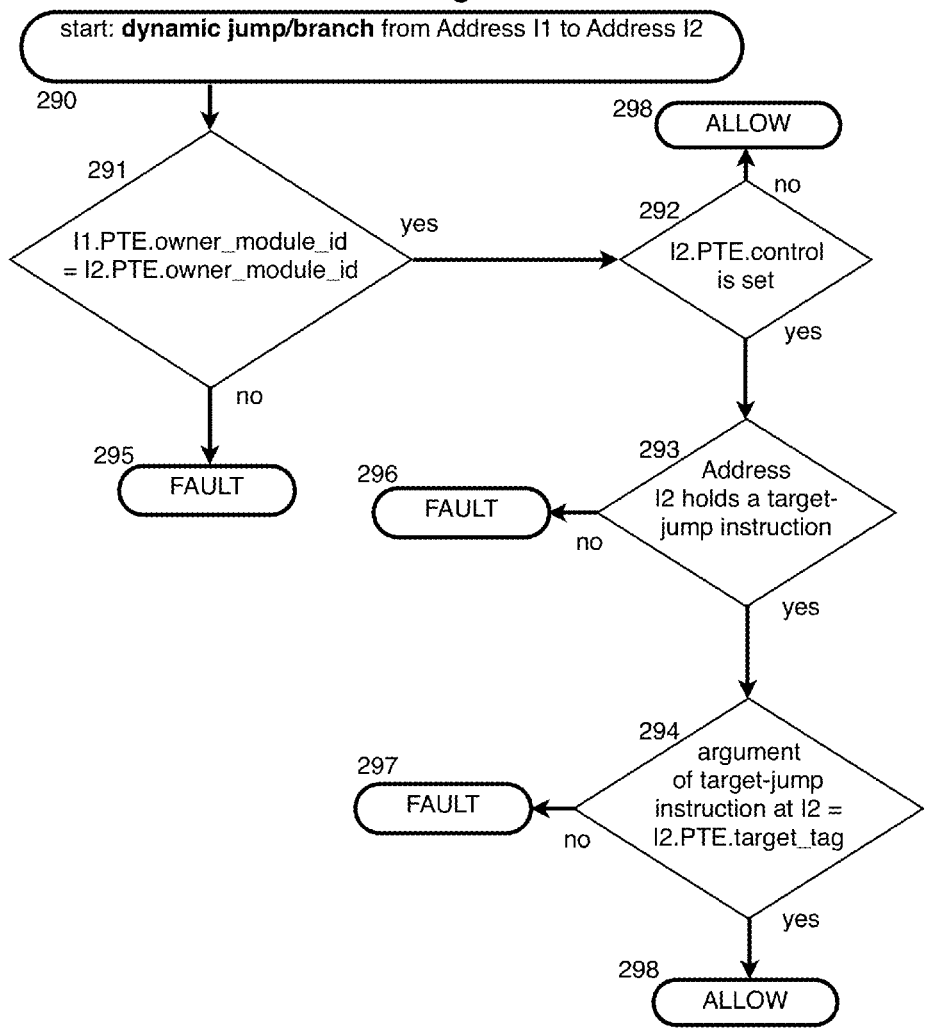

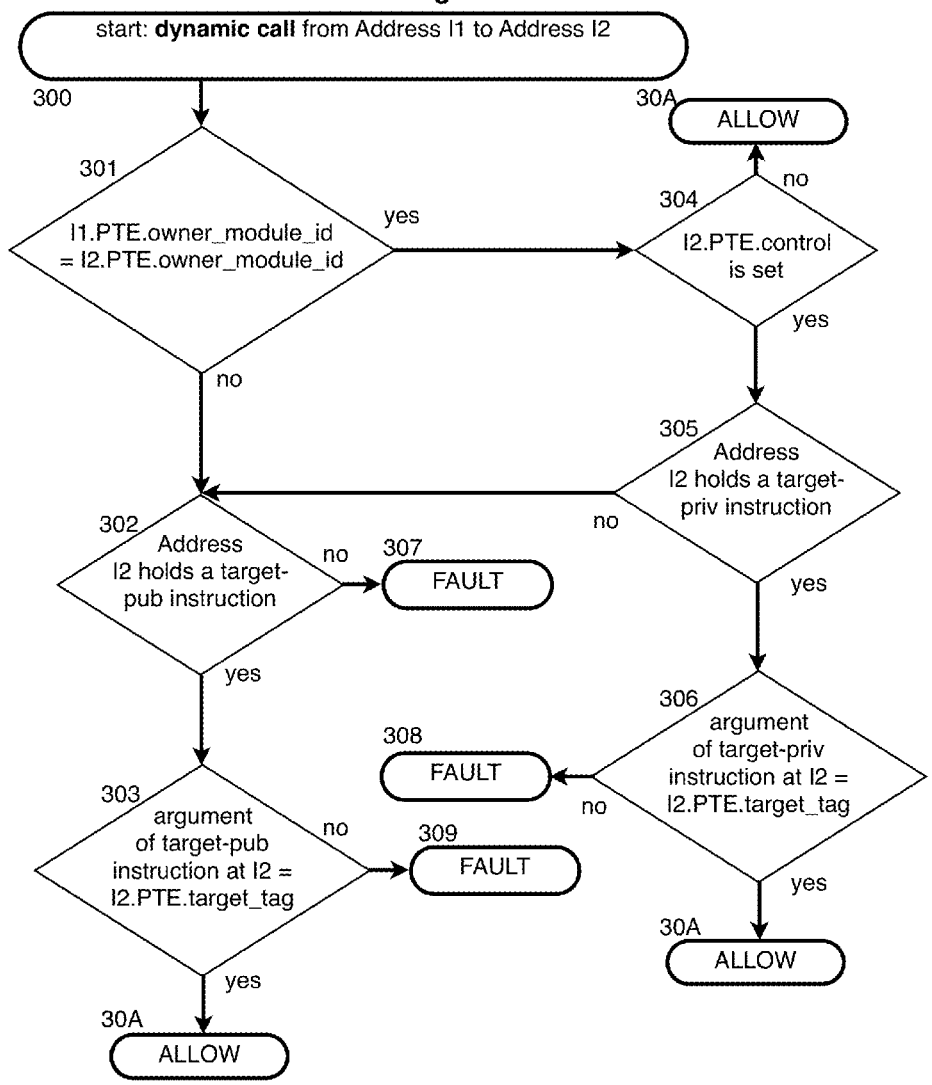

Figure 31
| instruction | description |
|---|---|
| enter-kernel-mode() 310 | if executed on a page having the danger bit set, then set the kernel bit in the CPU status register, thus going into kernel mode |
| exit-kernel-mode() 311 | clear the kernel bit in the CPU status register |
Figure 32
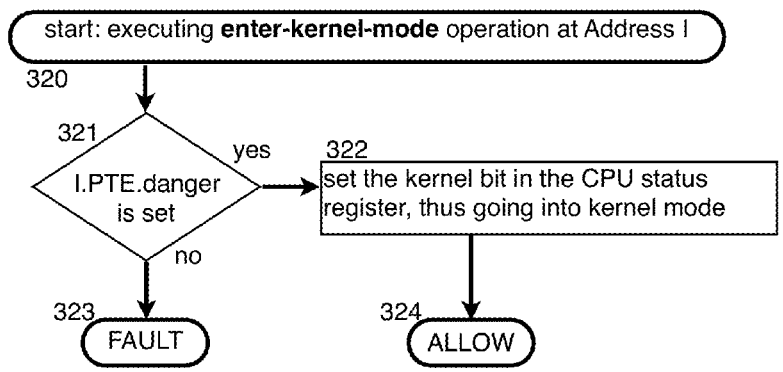
Figure 33
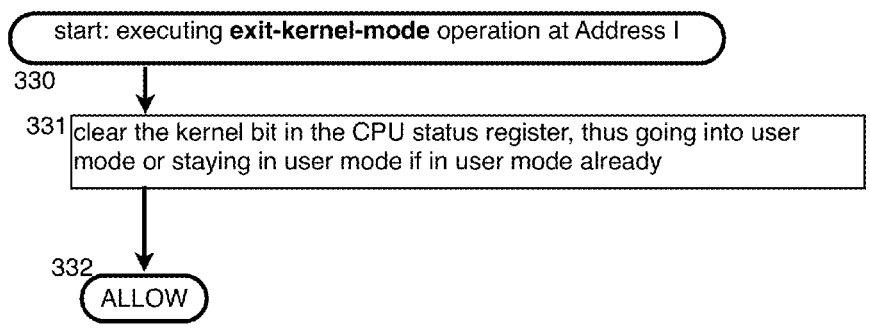

| device annotation | description |
|---|---|
| device module-id  340 | code having an owner module-id matching the device module-id of a device can access that device, even in user mode |

| input / output device | device module-id |
|---|---|
| disk0  342 | 0x7000  343 |
| disk1 | 0x7001 |
| keyboard | 0x7002 |
| mouse | 0x7003 |
| . . . | |

Figure 37a

| special module-id | | description |
|---|---|---|
| nobody | 370 | not the module-id of any particular user module |
| master | 371 | code running with this module-id has master powers |
| multi | 372 | text pages having this module-id explicitly manage the current-module-id register |

Figure 37b

| instruction<br>note: arguments omitted: see Fig. 37c for the argument listing | | description |
|---|---|---|
| target-pub-multi() | 373 | cross-mod or internal calls may land when PTE.owner_module_id is the multi module-id |
| target-priv-multi() | 374 | internal calls may land when PTE.owner_module_id is the multi module-id |
| target-jump-multi() | 375 | (internal) jumps or branches may land when PTE.owner_module_id is the multi module-id |
| target-return-multi() | 376 | return (from call) may land when PTE.owner_module_id is the multi module-id |

Figure 37c

| target-pub/priv/jump/return-multi instruction argument | | description |
|---|---|---|
| target-tag argument | 203 | argument to be compared with the target-tag of the PTE |
| new-module-id argument | 378 | argument providing a new value for the current-module-id register |
| new-module-suff-len argument | 379 | optional: argument providing a new value for the current-module-suff-len register |

Figure 37d

| CPU status bit name | | description |
|---|---|---|
| just-called-multi | 37A | just made a call to a page where the PTE owner module-id is the multi module-id |
| just-jumped-multi | 37B | just made a branch/jump to a page where the PTE owner module-id is the multi module-id |
| just-returned-multi | 37C | just made a return to a page where the PTE owner module-id is the multi module-id |

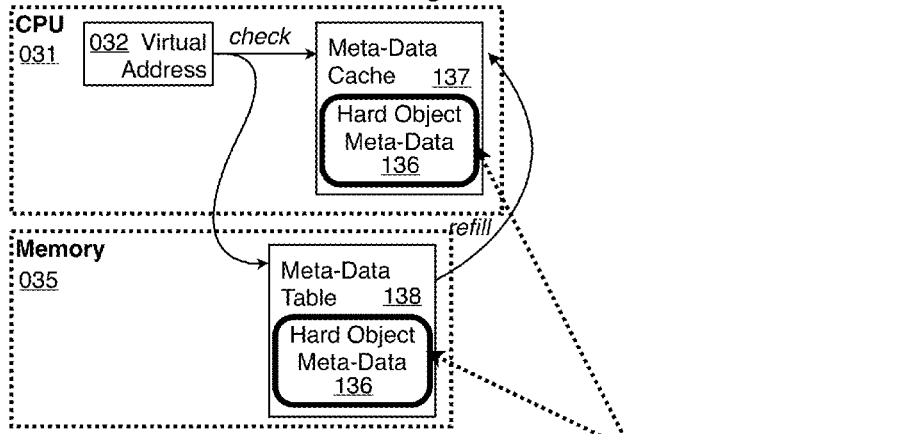

Figure 38a

| | Hard Object Meta-Data with control-danger bit | | | | |
|---|---|---|---|---|---|
| | text bit 062 (1 bit) | owner module-id (15 bits) 063 | integrity bit 064 (1 bit) | control-danger bit 380 (1 bit) | target-tag 067 (12 bits) |
| VP 0: | text | 0x0003 | No | Yes | 0xA73 |
| VP 1: | data | 0x0003 | Yes | No | 0x000 |

Figure 38b

| Hard Object Meta-Data with control-danger bit | | | | |
|---|---|---|---|---|
| text bit (1 bit) 062 | owner module-id (15 bits) 063 | integrity bit (1 bit) 064 | control-danger bit (1 bit) 380 | target-tag (12 bits) 067 |

Figure 39a

| Hard Object Meta-Data with owner/ownable separation, text pages | | | | | | |
|---|---|---|---|---|---|---|
| text bit (1 bit) 062 | owner module-id (15 bits) 063 | owner module-suff-len (4 bits) 390 | integrity bit (1 bit) 064 | danger bit (1 bit) 065 | control bit (1 bit) 066 | target-tag (12 bits) 067 |

Figure 39b

| Hard Object Meta-Data with owner/ownable separation, data pages | | | | | |
|---|---|---|---|---|---|
| text bit (1 bit) 062 | ownable module-id (15 bits) 391 | integrity bit (1 bit) 064 | danger bit (1 bit) 065 | control bit (1 bit) 066 | target-tag (12 bits) 067 |

Figure 39c

| Two values being compared while ignoring a suffix length of 3 | |
|---|---|
| value A | 0x 1101 1011 0110 |
| value B | 0x 1101 1011 0011 |
| bitwise exclusive-or | 0x 0000 0000 0101 |
| result | equal | circled least significant (rightmost) 3 bits are ignored

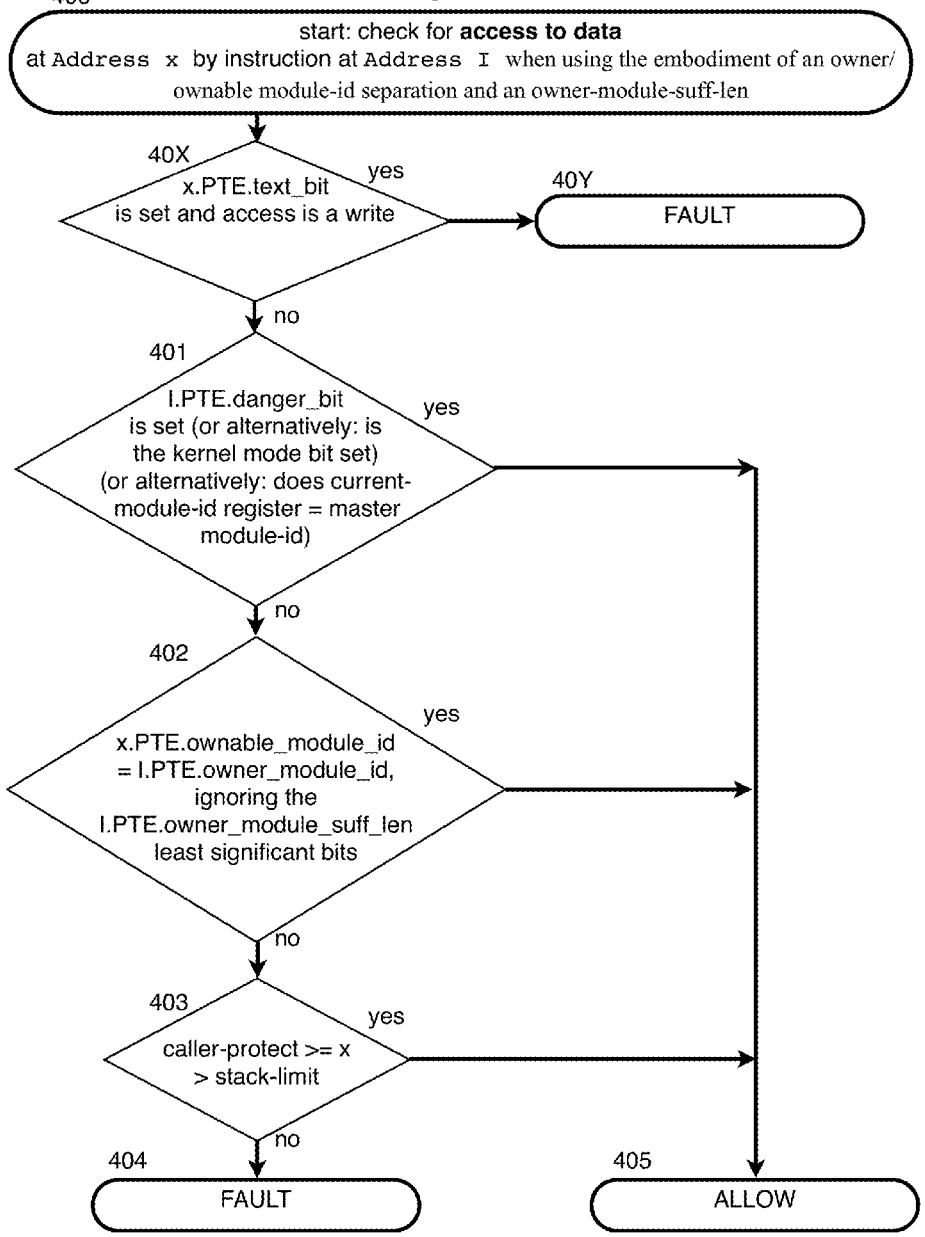

Figure 42

| instruction | description |
|---|---|
| set-current-module-id 420 (UInt new-module-id 421) | if executed on a page having the control (or control-danger) bit set, then set the value of the current-module-id register to the new-module-id argument |
| restore-current-module-id () 422 | restore the value of the current-module-id register to that of the owner module-id field of the PTE of the instruction address holding this instruction unless that is the multi module-id in which case fault |

Figure 43

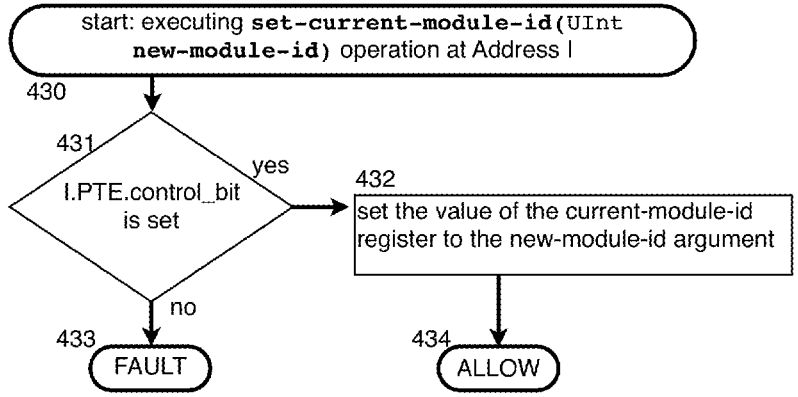

Figure 44

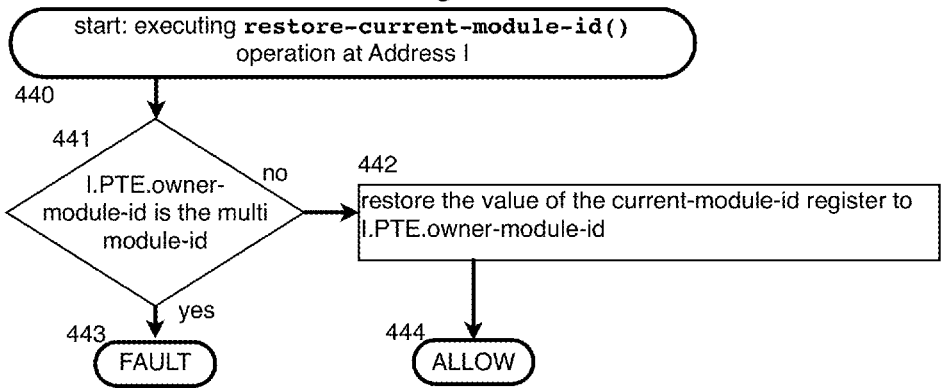

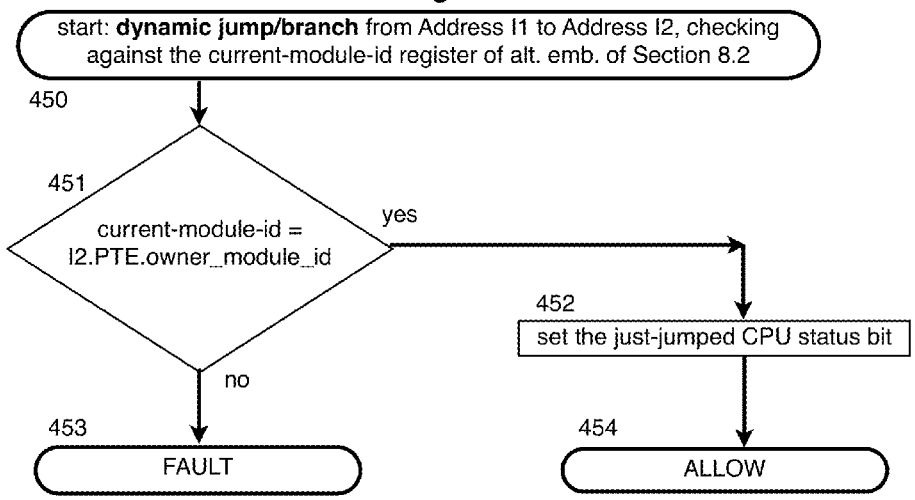
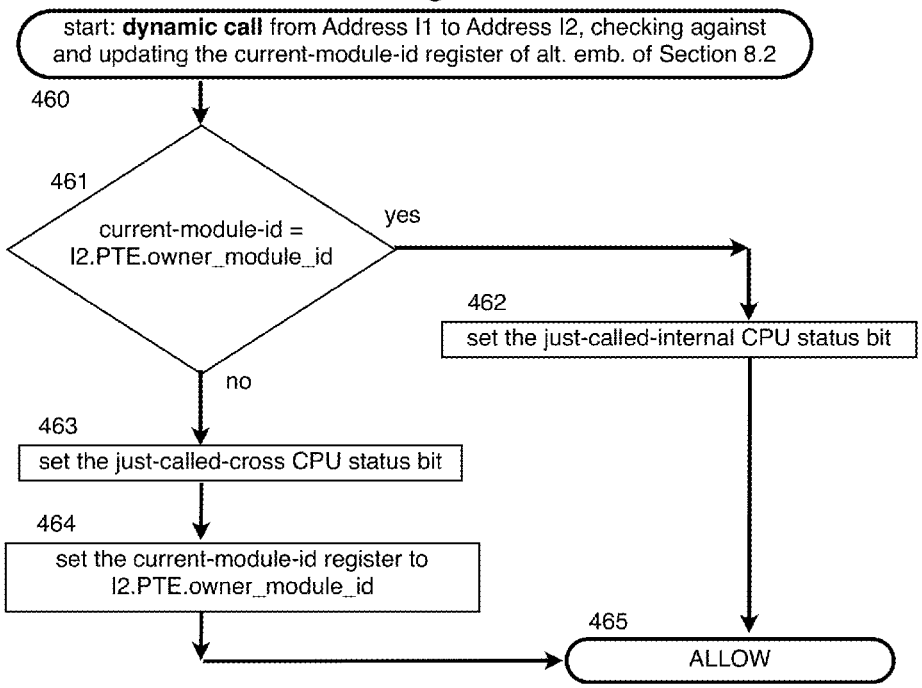

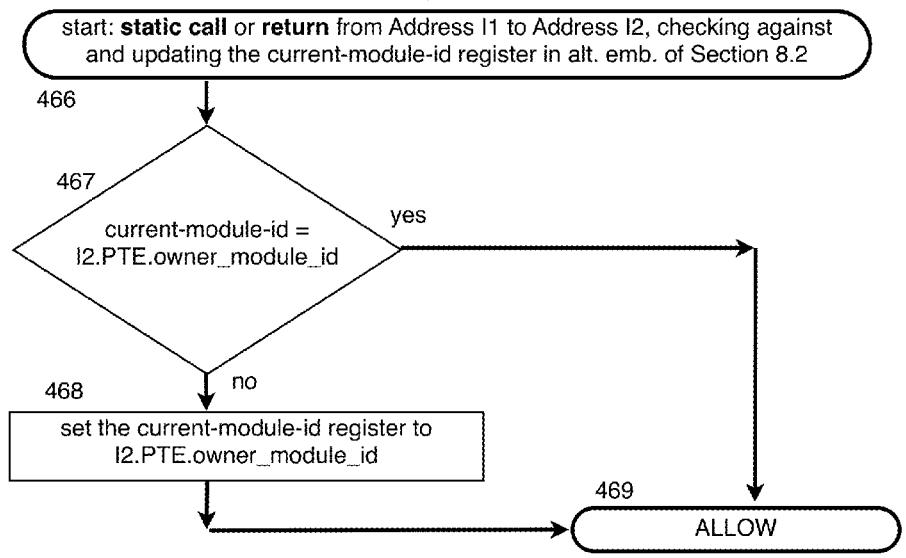
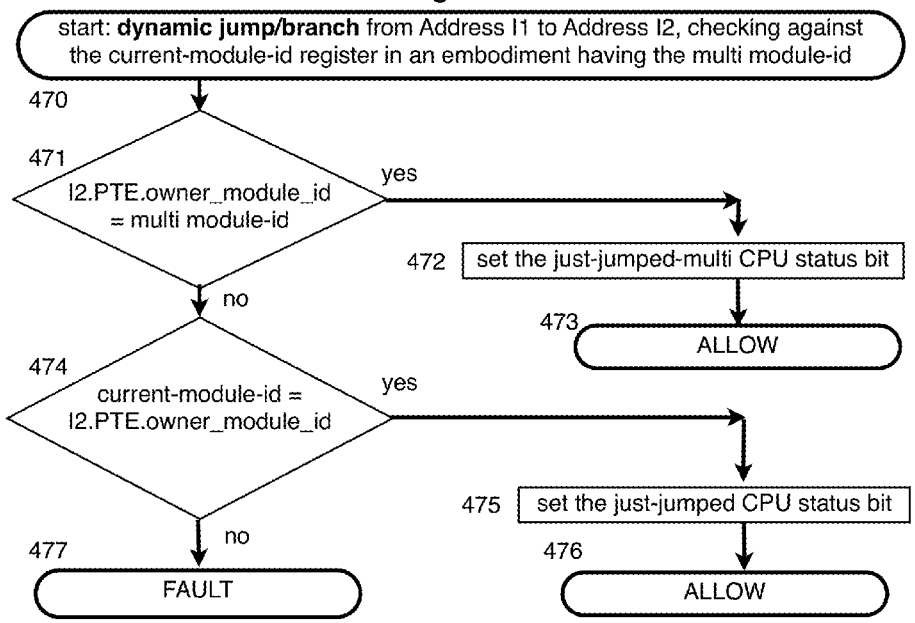

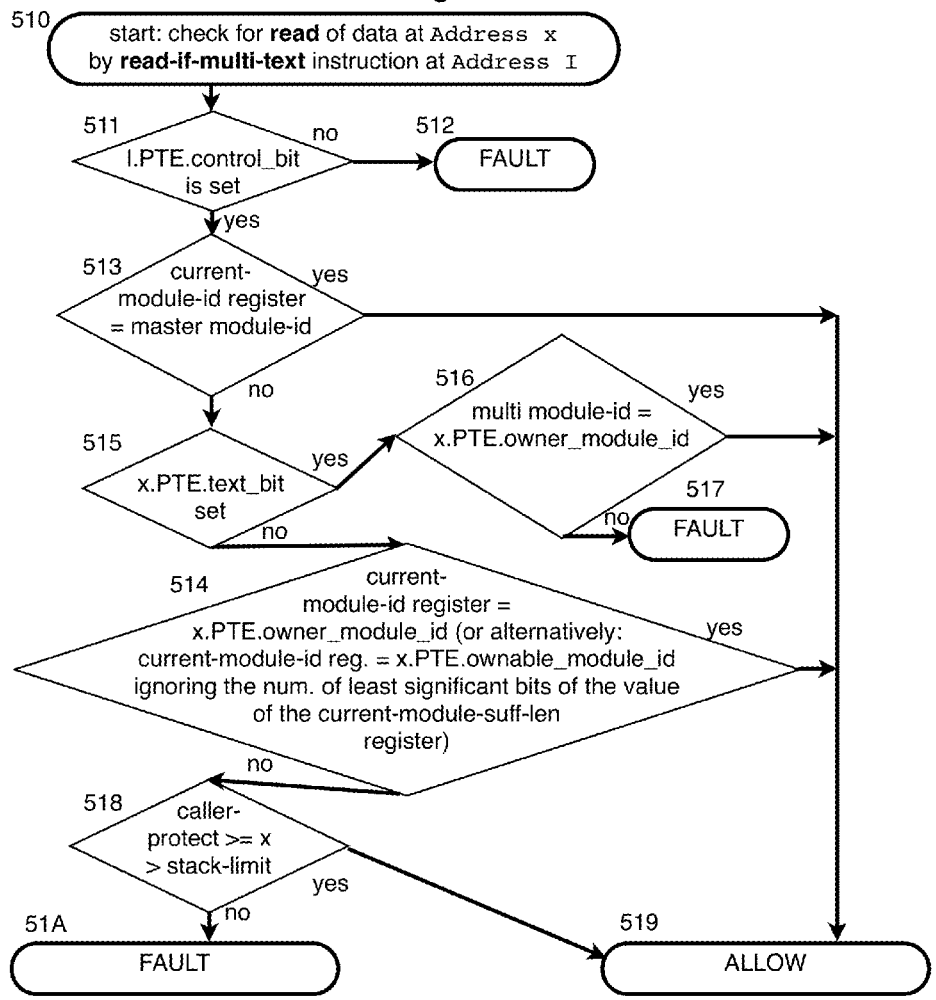

HARD OBJECT: CONSTRAINING CONTROL FLOW AND PROVIDING LIGHTWEIGHT KERNEL CROSSINGS

REFERENCE TO RELATED APPLICATIONS

This is a continuation-in-part patent application of co-pending application Ser. No. 12/965,158, filed Dec. 10, 2010, entitled "HARD OBJECT: CONSTRAINING CONTROL FLOW AND PROVIDING LIGHTWEIGHT KERNEL CROSSINGS". The aforementioned application is hereby incorporated herein by reference.

FIELD

This work relates to improvements in microprocessor architecture for supporting
  (1) software correctness, specifically supporting module isolation and preventing cross-module correctness failures, and
  (2) computer security, specifically protecting parts of programs from each other within a single process.

BACKGROUND

For ease of readability, the system disclosed herein is hereinafter referred to as "Hard Object".

Engineers who build machines made of atoms (rather than of software) rely on locality of causality to make machines mostly safe in the presence of failure or attacks: cars have a firewall between the engine and the driver; houses have walls and a lockable door between the inside and the outside. However, computer hardware engineers have worked very hard to eliminate all locality of causality within a computer: that is, on a modern computer, within any given process, any instruction can access any data in the entire address space of the process. Hardware engineers did this because giving the software engineers freedom to use any instruction to access any data makes it very easy to write programs that do what you really want; however having this much freedom also makes it very easy to write programs that do what you really do not want. Although software engineers separate programs into modules (code that exclusively maintains the invariants of its data), they lack appropriate fine-grain hardware primitives with which to efficiently implement enforcement of this separation. This state of affairs contributes to the problem that "machines made of software" (programs) tend to be much less reliable than machines made of atoms.

A. Software Correctness Generally

The punishing exactitude and overwhelming complexity of computer programs make the task of writing correct software almost impossible. Further, the stakes are high: we need only cite the title of a 2002 NIST study: "Software Errors Cost U.S. Economy $59.5 Billion Annually: NIST Assesses Technical Needs of Industry to Improve Software-Testing." Due to software bugs (a) organized crime controls millions of computers, (b) large infrastructural projects are delayed or fail, and (c) people even die. The problem is that one can never do enough testing to ensure program correctness—something else is badly wanted.

Programmers follow certain disciplines designed to reduce mistakes, a common one being "modularity"—a software embodiment of locality of causality mentioned above: programs are separated into parts called "modules" where each module has its own data together with code to manage it. Further, to ensure correctness, the module's code is written in such a way as to maintain certain "data invariants": properties of the module data which are always true. Some modules manage multiple instances of their data's state, each instance sometimes called an "object" and the module the "class" of the object. While this modularity discipline works well, current computer hardware systems do not protect a module within a program from any possibly errant or malicious behavior of other modules that may violate the module's boundaries; see FIGS. 1 and 2 for examples of one module 017 attacking the data of another 012. Therefore all modules are vulnerable to the threat of a single mistake, or a deliberate attack, from any one module: the correctness of the whole program is extremely brittle.

1. Static Analysis

Even when all of the authors of a program are cooperating, even basic partial correctness properties of a program are hard to ensure. There is a sub-field of Computer Science called "static analysis" which amounts to using an analysis program to read in a target program as its input and then attempt to ensure that no matter what input is given to the target program when it runs, certain kinds of errors cannot occur. (This kind of analysis is called "static" because it only examines the program, in contrast to a "dynamic" analysis which examines the program running with a particular input.)

Static analysis of program is quite difficult. It can be made much easier if the hardware upon which the programs run restricts the potential behavior of the program. Putting code into modules and constraining code to operate only on data of its own module is one way to do that. Constraining code that has access to the super powers of kernel mode (see below) is another.

B. Modern Computers Generally

Modern microprocessors are organized in a fairly standard way. A very readable and thorough reference on this topic is Randal E. Bryant and David R. O'Hallaron "Computer Systems: A Programmer's Perspective" Prentice Hall 2003; for brevity we refer later to this reference as "BO-2003". At a high level of abstraction, a single-core microprocessor consists of a central processing unit 031, a random access memory 035, and peripherals.

The "central processing unit" (CPU) performs one of a fixed set of actions one after another according to the instructions of a program, much as a very reliable, tireless, obedient, and utterly unimaginative person might theoretically follow a detailed set of instructions. The CPU has a small amount of scratch space called "registers"; typically there are on the order of 100 or fewer registers to a CPU. Further, some registers ("CPU status registers") hold special CPU "status" bits or fields which indicate the current mode of the CPU (such as user vs kernel mode; see below) or other properties of the current state of execution. Some registers are exposed to the program; others are for internal use and can be used for purposes such as saving internal temporaries for the duration of an instruction.

The "random access memory" (RAM) is a passive device which maps (1) an "address" to (2) a "datum" stored in a cell at that address, much as cubbyholes on a wall map each cubbyhole's number to the cubbyhole's contents. (While RAM size is also fixed, it is typically on the order of a billion (1 Gigabyte) cells.) The CPU may either:
  (1) "load": read information to a register from a memory cell at a given address, or
  (2) "store": write information from a register to a memory cell at a given address.

The computer's CPU/RAM core is also connected to "peripherals": external devices enabling interaction with the outside world, such as disk drives, displays, keyboards, mice, etc. To allow a program to interact with these devices, the hardware has either (1) special instructions for sending data to or receiving data from them, or (2) "memory-mapped I/O": special RAM cells repurposed by the hardware such that writing or reading from these cells interacts with the device (rather than storing the data, as RAM cells would usually do).

A computer is typically designed to move several bits around together in a block, often called a "word". A computer is characterized by the number of bits in its word, its "word size", much as an engine is characterized by the total volume of its cylinders. Typical modern computers have 32-bit or 64-bit words and are therefore referred to as "32-bit machines" or "64-bit machines" respectively. For specificity we speak below of a 32-bit machine but nothing prevents the same ideas from application to machines of other word sizes, such as 64-bits.

1. Software

Information stored in RAM cells can be interpreted as either "data" or as "program", as follows. There is one special CPU register called the "program counter" (PC) 250 which contains an index into RAM where the next instruction to be followed by the CPU is held. The operation of the computer typically works as follows to "execute" a program:
 (1) load the contents of the RAM cell pointed to by the PC,
 (2) interpret that data as an "instruction" and follow that instruction,
 (3) increment the PC (unless the instruction set it to a new value),
 (4) repeat.

"Instructions" to the CPU are typically of one of the following kinds: (a) a data "access", which is either a "read" (or "load") of data from RAM into a CPU register, or a "write" (or "store") of data from a CPU register into RAM, (b) a logical, fixed-point-arithmetic, or floating-point-arithmetic operation on two registers, or (c) a "jump/branch" which sets the PC to a new value, sometimes only if a certain register has a certain value. Such collections of instructions are called "programs" as opposed to the "data" on which they operate. Instructions plus data is called "software", bits, as opposed to the "hardware", a machine made of actual atoms, which interpret the software.

Writing and maintaining programs at the low abstraction level of these very small steps tends to be tedious, error prone, and mind-numbing. Therefore, programs are typically written in higher-level "programming languages" providing more useful constructs with which to construct programs. One of the most useful constructs is the "function": a re-usable sub-program; a function has an "interface" specifying the format and meaning of data "argument(s)" passed as input and "return value(s)" obtained as output. Programs written in these higher-level languages are translated into executable machine instructions by a special program called a "compiler". Even after a function is compiled however, the resulting low-level instructions often occur in a contiguous block or can be made to occur in a contiguous block by the compiler, if desired.

2. Multi-Processing and the Kernel

Special software called the "kernel" runs in a special CPU mode called "kernel mode" which gives it extra powers over normal "user mode": (1) some data can only be accessed in kernel mode, sometimes indicated by annotating that data with a SUP (supervisor) bit (see FIG. 5, discussed further below), (2) some instructions must be run in kernel mode or have more powers when run in kernel mode, (3) I/O (input/output) devices typically must be accessed in kernel mode (either through special instructions or by a technique called "memory-mapped I/O" where accesses to certain memory addresses are intercepted and interpreted by hardware as access instructions to particular devices); if an instruction attempts to violate these constraints, the CPU faults.

A "multi-processing" computer can run more than one program at once, where each instance of a running program is called a "process". The kernel uses its powers to manage processes, such as putting them to "sleep" when a resource is requested and "waking" them up again when that resource is available.

Much like a city government, the kernel (mayor) coordinates with further special "software libraries" and "utility programs" (public servants) to: (a) provide commonly-needed but often messy utility services for the processes (citizens), such as interfacing to a particular kind of disk drive, and (b) protect the processes from each other (more on this below). Taken together the kernel and these utility libraries and programs are called the "operating system" (OS) (the city government in our metaphor). Users ask for services using a special hardware instruction called a "system call" or "kernel crossing".

Whereas the kernel, just like a government, is the only agent with the power to take certain special actions, the kernel can take actions at the request of user processes if it determines that the user is allowed to take the action. That is, the hardware will allow certain operations only when in kernel mode, however these operations may be "wrapped" with a system call to allow the user to request the kernel to do the operation; one example is intermediating between user programs and hardware peripherals.

Further it is important to note that, just as in real life, asking the government to do something for you is slow; that is, for a user program to do a system call/kernel crossing is much slower (usually at least an order of magnitude slower) than for a user function to simply call another user function. Therefore reducing the number of kernel calls in a program is an important efficiency concern.

3. Operating System

The kernel is sometimes called "the executive". This usage continues our metaphor of the computer as a city: just as not all of the services provided by a city are provided directly by the office of the executive, not all of the services that users expect to have provided run in kernel mode. The entirety of the services provided to the user is called the "operating system"; it consists of (1) the kernel executive plus (2) other "trusted system software/programs" which provide services but do not run in kernel mode.

One of these trusted system programs is called the runtime "linker-loader": it loads programs into memory from the disk and prepares them to run. Modern formats for encoding executable programs include facilities for annotating parts of programs with meta-data; some of these annotations can be interpreted as instructions to the linker-loader. For simple programs, there may not be much to do, but some programs link in other modules at runtime, and so this process can be complex in that case. One service that the Java linker-loader provides is running a "verifier" that checks if the code that is about to be run adheres to certain rules which allow that code to be safely run even if that code is untrusted.

C. Memory Management Generally

Globals:

A program that needs only a fixed amount of memory during its run can allocate all of that state in one place at the start; such state is called "global" state (it is globally associated with the whole program) and is the first of three separate parts into which a process's memory is organized.

Stack 020:

A particular function of a program needs its own local/temporary memory, called its "frame". A "caller" function, $f$, may invoke a "callee" function, g, to solve a sub-problem; during the execution of g, the execution of $f$ is suspended. The frame of memory for the execution of g is allocated immediately below (typically) that of $f$, and when g is done, the memory space that was g's frame may be re-used by a later call. That is, the frames "push" on and "pop" off, like a stack of plates, and so this second part of memory is called the "stack" 020. Note that since each function call has its own frame, a function $f$ may even call itself and the operation of the two instances of $f$ do not mutually interfere. Some special registers help the program stay located within the stack: (a) sometimes a "frame-pointer" is used to point to the top of the temporaries of the current frame (typically where the arguments stop and the temporaries start), (b) usually a "stack-pointer" is used to point to the "top" of the stack, that is to the next free word (or last used word) on the stack. By convention, the stack usually grows down in memory, leading to the potentially confusing invariant that the "top" of the stack has the "lowest" address and in particular is lower than the "top" of the frame.

Heap 010:

Sometimes a program requires long term "data-structures" (that need to last longer than a stack frame) also do not fit into the fixed-sized global state. There is an area of memory managed by a system "memory allocator" library to which a program can make a request to have a specific amount of contiguous addresses or "space" reserved or "allocated" for a particular use. The library finds some available unused space and returns its initial address called a "pointer to" the space. Once in use for a specific purpose the space is typically called an "object". When an object is no longer needed it can be "deleted" or "freed" for re-use by making a different call to the same memory allocator library. This third part of memory where such objects are allocated and freed has no simple organizational structure and is called the "heap" 010.

1. Virtual Memory

A problem arises in that there is sometimes not enough physical memory to store all of the data of all of the running processes. The usual solution is a scheme called "virtual memory". Quoting [BO-2003, Section 10.1 "Physical and Virtual Addressing"](Note that any and all editing is in square brackets; emphasis of non-square-bracket text is in the original):

[M]odern processors designed for general-purpose computing use a form of addressing known as virtual addressing. (See FIG. 3a [which is a copy of [BO-2003, FIG. 10.2]).

With virtual addressing, the CPU accesses main memory by generating a virtual address (VA), which is converted to the appropriate physical address before being sent to the memory. The task of converting a virtual address to a physical one is known as address translation . . . . Dedicated hardware on the CPU chip called the memory management unit (MMU) translates virtual addresses on the fly, using a look-up table stored in main memory whose contents are managed by the operating system.

2. The Memory Hierarchy

Thus the MMU 033, in cooperation with the operating system, stores some of the data from virtual RAM on physical RAM 035 and the rest on an external disk drive 046. Any process requesting access to data that is actually on disk is paused, the data is brought in (often requiring other data to be sent out), and then the process re-started. To support this feature, memory is grouped into "pages" that are moved in and out as a whole. Pages may be of different sizes, but in current practice 4-kilobytes is typical and for specificity we speak of this as the page size, though other sizes will work. The external device that stores the pages that are not in RAM is called the "swap" device.

We can see at this point that there are many kinds of memory, some with fast access and small capacity, some with slow access and large capacity, and combinations in between. These kinds of memory are arranged in "layers", the fast/small layers used when possible and the slow/large layers used when necessary, as follows. (1) Most CPU instructions use CPU registers, access to which is very fast. (2) When the registers are full, the program resorts to using RAM, which is slower, but much larger. RAM actually has at least two layers: (2.1) small amounts of fast memory where frequently-used RAM address/data pairs are stored called the "cache", and (2.2) normal RAM. Moving data between the cache and RAM is handled by the hardware. (3) As described above, when RAM is full, the operating system resorts to using a swap disk, which has huge capacity but is far slower still. (4) Some people may still back up their disks to tape. This whole system is called the "memory hierarchy".

3. Page Tables and Page Meta-Data

The MMU and/or OS clearly must track which virtual pages map to which physical pages or disk blocks. That is, for each page of data, "meta-data", which is data about data, is kept. Quoting [BO-2003, Section 10.3.2 "Page Tables"]:

Figure [FIG. 4][which is a copy of [BO-2003, FIG. 10.4]] shows the basic organization of a page table. A page table is an array of page table entries (PTEs). Each page in the virtual address space has a PTE at a fixed offset in the page table. For our purposes, we will assume that each PTE consists of a valid bit and an n-bit address field. The valid bit indicates whether the virtual page is currently cached in DRAM. If the valid bit is set, the address field indicates the start of the corresponding physical page in DRAM where the virtual page is cached. If the valid bit is not set, then a null address indicates that the virtual page has not yet been allocated. Otherwise, the address points to the start of the virtual page on disk.

The example in figure [FIG. 4] shows a page table for a system with 8 virtual pages and 4 physical pages. Two virtual pages (VP 1, VP2, VP4, and VP7) are currently cached in DRAM. Two pages (VP 0 and VP 5) have not yet been allocated, and the rest (VP 3 and VP 6) have been allocated but are not currently cached.

4. Process Address Spaces

Another problem arises in that if all of these application processes use the same RAM it is difficult for them to cooperate in such a way as to not write on each other's data. The virtual-memory solution is for the operating system and hardware to present an illusion (or abstraction) that each process is the only process running on the computer and has all of RAM to itself; this abstracted RAM is the process's "(virtual) address space". Quoting [BO-2003, Section 10.4 "VM as a Tool for Memory Management"]:

To this point, we have assumed a single page table that maps a single virtual address space to the physical address space. In fact, operating systems provide a separate page table, and thus a separate virtual address space, for each process.

Note however that sometimes multiple "lightweight processes" or "threads" are run in the same address space even on a machine that also runs processes in separate address spaces. One common design is that the kernel/operating system also manages these threads and another design is that user-mode (not kernel) "thread manager" software within a process manages them.

5. Memory Protection

Virtual memory thus prevents processes from accidentally or deliberately overwriting each other's data or that of the operating system itself. This protection aspect of virtual memory has become quite important. Quoting [BO-2003, Section 10.5 "VM as a Tool for Memory Protection"]:

Any modern computer system must provide the means for the operating system to control access to the memory system. A user process should not be allowed to modify its read-only text section [that is, its executable program code]. Nor should it be allowed to read or modify any of the code and data structures in the kernel. It should not be allowed to read or write the private memory of other processes, and it should not be allowed to modify any virtual pages that are shared with other processes, unless all parties explicitly allow it (via calls to explicit interprocess communication system calls).

As we have seen, providing separate virtual address spaces makes it easy to isolate the private memories of different processes. But the address translation mechanism can be extended in a natural way to provide even finer access control. Since the address translation hardware reads a PTE each time the CPU generates an address, it is straightforward to control access to the contents of a virtual page by adding some additional permission bits to the PTE. Figure [FIG. 5][which is a copy of [BO-2003, FIG. 10.11]] shows the general idea.

In this example [FIG. 5], we have added three permission bits to each PTE. The SUP bit indicates whether processes must be running in kernel (supervisor) mode to access the page. Processes running in kernel mode can access pages for which SUP is 0. The READ and WRITE bits control read and write access to the page. For example, if process i is running in user mode, then it has permission to read VP 0 and to read or write VP 1. However, it is not allowed to access VP 2.

If an instruction violates these permissions, then the CPU triggers a general protection fault that transfers control to an exception handler in the kernel. Unix shells typically report this exception as a "segmentation fault".

As you can see, prior art systems usually partition pages into (a) "text" (or executable program code) and (b) "data". After the program has been loaded into memory, text pages are marked to be executable and read-only by setting the permissions bits in the page table; similarly data pages are usually marked to be non-executable and read-write, though read-only data is possible.

6. No-Execute (NX) Bit

An operating system with support for the NX bit may mark certain areas of memory as non-executable. The processor will then refuse to execute any code residing in these areas of memory. The general technique, known as executable space protection, is used to prevent certain types of malicious software from taking over computers by inserting their code into another program's data storage area and running their own code from within this section. Intel markets the feature as the XD bit, for eXecute Disable. AMD uses the name Enhanced Virus Protection. The ARM architecture refers to the feature as XN for eXecute Never; it was introduced in ARM v6. While such a system does annotate an entire area of memory as non-executable, it does not allow (1) modification of the operation of only specific kinds of instructions, nor (2) modification of the operation of instructions while they continue to operate.

D. Control Flow Generally

Recall that the program counter register points to an address on a text page. At each memory cycle, the data pointed to by the program counter is loaded into the CPU and interpreted as an instruction to be executed by the CPU. The default behavior is that after the instruction is executed, the program counter is incremented by the size of the instruction and the process repeats. Recall further that some instructions can change the program counter so that the "control flow" of execution is transferred to another part of the program. See BO-2003, Section 3.6 "Control".

The "control transfer" caused by such a "control flow" instruction may be conditional upon the value of another register. If such a change is unconditional it is usually called a "jump" and if conditional, it is usually called a "branch". Another kind of control transfer is the function/procedure call, detailed in the next section. A function call is initiated by a "call" instruction (in the "caller" function) and terminated by a "return" instruction (in the "callee" function).

How the control flow instruction should modify the program counter in the event of a transfer is specified by a target argument to the control flow instruction. This target argument to a jump, branch, or call instruction can be a constant embedded into the text page; in this case the control transfer is called "static"; this static argument may be specified as an absolute address or simply as an offset to the current address. Alternatively, the argument to a jump, branch, or call instruction can specify a register containing a value to be used as the new program counter, in this case the control transfer is called "dynamic". (Note: we mean the target argument to the hardware instruction; software function calls also take function arguments; that is, a call instruction initiating a function call has a target argument while the function it initiates separately takes function arguments.)

The return instruction is a bit different. The previous matching call instruction (which made the function call from which the return instruction is returning) pushed the return address to which the call should return onto the stack; the return instruction finds that argument on the stack and uses that as its target argument.

1. Function/Procedure Calls

Programmers find it convenient for a function to be able to (1) suspend its execution in order to call another function to compute some sub-part of the execution and then (2) resume the first function where it left off upon the return from the sub-function. Note that even these sub-functions may be suspended in order to call further sub-sub-functions, and so on. At the point of call, the function suspended is called the "caller" and the sub-function called is called the "callee". See BO-2003, Section 3.7 "Procedures".

Recall that each function needs its own space for its variables that is preserved across calls to sub-functions; this space is called a (stack) frame. The suspend-resume nature of function calls makes it very natural to stack these frames so that those of suspended functions remain present in memory as new frames are added (traditionally below in memory) and removed as sub-functions call and return. That is, as sub-functions are called, the top of the stack of frames grows down (traditionally) and as sub-functions return, the top returns upward to where it had been.

Calls to sub-functions often take arguments at their point of call; for example, a function to compute the area of a circle may take the radius as an argument. Arguments are usually passed either in registers or by putting them on the stack where they appear as variables to the called sub-function. After the arguments are ready, the caller function transfers control to the callee function. Transferring control and pushing the return address is so common that there is often a special instruction for doing both called "call". An additional argument is passed to the callee which is the value of the program counter to which control should return when the callee completes: the "return address". Returning from a function by jumping to the return address stored on the stack is also often implemented by a special instruction called "return".

Note that, similarly to a jump or branch, how a call instruction should compute the new program counter to which it transfers control may be specified either (1) statically by an value fixed in the program text or (2) dynamically by the value of data in a register. The difference between static calls and dynamic calls is important as dynamic calls can be quite difficult for a programmer to constrain.

The caller and callee functions must both adhere exactly to a protocol/contract saying how to exchange this information and cooperate in several ways. The first concern is simply how to exchange information; when a caller function calls a callee function, much data is interchanged between them: (1) the arguments to the callee, (2) the address to which the callee should return when done, (3) the return value from the callee. There are at least two other concerns: (a) "caller-save" vs "callee-save": who is responsible for saving and restoring registers that the callee may wish to use that already contain values important to the caller, (b) "caller-cleanup" vs "callee-cleanup": who cleans up the temporaries left on the stack by the callee and resets the stack pointer to where it was before the call. The protocol states how these concerns are handled is called the "calling convention"; note that it has both hardware and software aspects.

Another way to implement a function call from a caller to a callee is for the body of the callee to be wholly inserted into the body of the caller at the point of call (also adjusting the renaming of variables), obviating the need for the usual kind of call/return control transfer or for the creation of a stack frame; this technique is called "function inlining" and is often performed by the compiler, but could be performed by a system linker-loader.

2. Stack Meta-Data

The stack of frames does not only hold temporary values used by the user program; each frame also holds additional data about the stack data. Recall that data about data is called meta-data, so we call this "stack meta-data". Some meta-data typically stored on the stack:

(1) The "return address": often the call instruction pushes onto the stack the address to which the subsequent return instruction should return control.
(2) The "frame-pointer": some systems maintain a register pointing at the top of the temporaries of the current frame called the "frame-pointer". Some software pushes the frame-pointer on the stack at some point during the calling sequence and restores it from the stack at some point during the return sequence.

3. Jump Tables

A jump table is an array of function pointers: the table maps an index to a function. The usual usage is that a function has an index indicating a function to be called, it uses a jump table to map the index to a function pointer and then uses a dynamic call instruction to call that function. If an entire page is devoted to holding this array then virtual memory protections can be used to protect the table in various ways, such as by making it read-only.

4. Exceptional Control Flow

Situations arise that may not have a well-defined behavior, such as dividing by zero or dereferencing a null pointer. A mechanism is provided for handling these, called "trapping to an exception handler", as follows. Each exception kind has a number. A special exception table base register points at a special jump table mapping each exception kind number to a function called the "exception handler" for that exception kind. When an exception occurs, the hardware maps the exception number through the exception table to get the address of the exception handler and then calls that handler. When this call returns, control is returned either (a) to the instruction at or (b) the instruction after the one that trapped to the exception, depending on the exception kind. See BO-2003, Section 8.1 "Exceptions", Section 8.2 "Processes", Section 8.3 "System calls and Error Handling", and Section 8.5 "Signals".

5. Relationship Between Control Flow and the User/Kernel Boundary

Recall that the CPU has a special mode called kernel mode where instructions have the power do to anything on the machine. Only certain software runs in kernel mode; this software is called "the kernel". Most of the time programs are running in user mode which constrains them so that they cannot take actions that could harm other programs, such as writing in the virtual address space of other programs or performing input or output. These actions are "dangerous": they can only be performed in kernel mode. Thus, if a user mode program wants to take one of these actions, it must make a call to the kernel to ask for the action to be taken on its behalf. See BO-2003, Section 8.2.3 "User and Kernel Modes".

The kernel data and functions live in a special area of memory that cannot even be called into when in user mode. This restriction is to protect kernel data and to ensure that kernel functions cannot be attacked by being called anywhere other than at the top of a "public" kernel function. Therefore another method must be provided for user code to request services from the kernel.

The common method is to provide "system call instruction" which generates an "system call" exception. The purpose of this instruction is not to handle an exceptional circumstance, but simply to halt the processing of the user function, switch into kernel mode, and call to the top of the system call exception handler. Before making the system call the user program puts the system call number and other arguments in registers or on the stack where they can be found. Note that the kernel has the power to simply switch itself back into user mode when desired. This transfer of control from a user mode program to the kernel is called a "system call" or a "kernel crossing". (Note that the data of the kernel is within the address space of every process but is marked as accessible only when the CPU is in kernel mode.)

The complexity of this system call mechanism makes system calls an order of magnitude (or more) slower than function calls.

6. Scheduling

Multiple "processes" can pretend to run at the same time, each in their own virtual address space. In reality, the processes usually take turns using the hardware as there are usually more software processes than hardware CPUs to go around. The kernel uses its powers to manage processes, such as putting them to "sleep" when a resource is requested and "waking" them up again when that resource is available. The part of the kernel that manages which processes run and which sleep waiting for their turn is called the "(process) scheduler".

It is possible to run multiple "threads of control" within the same address space; these are called "threads" and, similar to processes, have a "thread scheduler". Since multiple threads are all within the same address space, there must be multiple separate stacks of their function temporaries as well; however, threads usually all share one heap.

BACKGROUND

Prior Art

While reviewing the prior art pertinent to the present Hard Object work, for convenience both similarities and contrasts between the prior art and the Hard Object system are discussed together. Please see "List of Non-Patent Reference Keys", below, for the meanings of reference keys in square brackets.

The present invention builds upon the invention disclosed in copending application Ser. No. 12/045,542, filed 10 Mar. 2008, entitled "Hard Object: Hardware Protection for Software Objects", which application claimed the benefit under 35 USC § 119(e) of U.S. Provisional Application No. 60/905,988, filed 8 Mar. 2007, "HARD OBJECT: HARDWARE PROTECTION FOR SOFTWARE OBJECTS". Both of the aforementioned applications are hereby incorporated herein by reference.

A. Intel x86 Segmented Addressing

As mentioned above, many architectures support a means of managing permissions on text and data as organized into pages. The Intel x86 architecture is one such. Quoting [1-2005]:

> The concept of privilege for pages is implemented by assigning each page to one of two levels: Supervisor level (U/S=0)—for the operating system and other systems software and related data. User level (U/S=1)—for applications procedures and data . . . . When the processor is executing at supervisor level, all pages are addressable, but, when the processor is executing at user level, only pages that belong to the user level are addressable.

Virtual memory protection allows operating system and user programs to interact without danger to the operating system. However two different user modules within the same program, and therefore the same virtual address space, are not protected from one another. In contrast the Hard Object system disclosed herein can isolate two modules even if they are in the same address space.

The Intel x86 architecture, [G-2005], also supports a means of managing permissions on text addresses and data addresses as organized into "segments" which manage the association of permissions and privilege levels to both text and data addresses. Quoting [I-2005]:

> The concept of privilege is implemented by assigning a value from zero to three to key objects recognized by the processor. This value is called the privilege level. The value zero represents the greatest privilege, the value three represents the least privilege . . . . [T]hese levels of privilege can be interpreted as rings of protection. The center is for the segments containing the most critical software, usually the kernel of the operating system. Outer rings are for the segments of less critical software . . . . The processor automatically evaluates access to a data segment by comparing privilege levels . . . . [A] procedure can only access data that is at the same or less privileged level.

Note that in this prior art Intel system, there are only four such privilege levels. Further, this restriction to a small number, such as four, is pervasive throughout the design—for example, each privilege level has its own stack—and so generalizing the design by increasing the number of privilege levels seems infeasible. Therefore it seems that this small number of privilege levels may constitute the maximum number of "protection domains" into which the set of modules may be partitioned (however also see a different way of using segments hypothesized below). In contrast a Hard Object system can easily have an arbitrary number of domains.

The levels of these prior art Intel domains are ordered and therefore apparently they cannot be made mutually exclusive, thus members of a domain with stronger privilege will always have access to the data of a domain with weaker privilege; in contrast the Hard Object system disclosed herein can partition domains in a mutually-exclusive way.

In most systems in the event of a function call, arguments are passed from caller to callee on the stack, but in the Intel system when functions call across privilege levels the function arguments must be copied from the stack of one privilege level to the stack of the other. In contrast, due to the Hard Object stack protection mechanism, a call across a protection domain in a Hard Object system requires no such copying.

In the above-cited Intel system, instructions that manage the segment permissions can only be executed in kernel mode; in contrast Hard Object allows any module to transfer "ownership" of memory addresses to another module without the need to run a privileged instruction or make a system call—where "ownership" is a concept introduced below to indicate the right of code to access memory addresses and/or also the right to transfer this right to other code.

In the above Intel system, segments of memory can be marked with permissions (or the absence of permission) such as "read-only" or "executable"; however there are major design differences between Intel segments and Hard Object owner module-ids. An Intel segment is associated with the current CPU state and refers to a range of addresses that may be accessed; therefore when a protection boundary is crossed, instructions must execute to change the segment registers that are the embodiment of this CPU state. In contrast a Hard Object owner module-id is associated with an address itself and selects a subset of program text that may access this address; this owner module-id is checked whenever an instruction accesses an address and therefore in a Hard Object system when a protection boundary is crossed by the program counter no kernel calls need be made.

B. Intel Itanium Protection Keys

The Intel Itanium architecture [Intel-Itanium] provides a mechanism for protecting memory called "protection keys" that has two components:

(1) Each Page Table Entry is annotated with a field called a "protection key"

(2) The CPU is provided with 16 additional "protection key registers".

When protection keys are being used, when the CPU attempts to access a page, the hardware checks if the value of the protection key field of the PTE of a page matches the value any of the protection key registers; if not, the access faults; if so they access may be allowed as further mediated by other bits annotating the protection key registers.

Quoting [Intel-Itanium, Section 4.1.3]:
> Protection Keys provide a method to restrict permission by tagging each virtual page with a unique protection domain identifier.

Quoting [Intel-Itanium, Section 5.1.2.1]:
> it is the responsibility of the OS to use protection keys and the protection key registers (PKRs) to enforce protection.

Considering the above quotes, it seems that it must be the case that changing a protection key register requires a system call; unfortunately we cannot find a direct quote in the documentation that states this explicitly, but without this requirement protection keys would not "enforce protection" [emphasis added] of data.

> Therefore the way in which software seems to be required to use Intel Itanium protection keys differs considerably from the way software can use Hard Object owner module-ids, as follows. A system call currently costs at least a order of magnitude more than a function call; in contrast, in a Hard Object system, when the control flow moves from the code of one module to that of another, the cost incurred is no more than that of a function call, as, due to the Hard Object hardware mechanism, the data pages that may be accessed change automatically with the movement of the program counter.
>
> Most software tends to exhibit a property where most of the computation time is spent in an "inner loop"; therefore introducing a delay in that inner loop can easily change the performance of the software by an order of magnitude. Should an inner loop of a program cross a module boundary (1) a Hard Object system would still be performant, whereas (2) a system attempting modularity separation using Intel Itanium protection keys could easily lose an order of magnitude in performance due to the cost within the inner loop of the system calls or fault handling required to change either (a) the protection key registers or (b) the protection keys on the data pages being accessed.

C. Mondriaan Memory Protection

Of particular interest, Mondriaan Memory Protection, [WCA-2002; WA-2003; W-2004], and U.S. Pat. No. 7,287,140 Asanovic et al, attaches meta-data to addresses at the word-granularity using a special hardware "permissions tables" 133; see FIG. 13*a*.

1. Protection Domains

In the Mondriaan design there is a concept of "protection domains". Each domain has its own "permissions table" (plural permissions tables 133) which attaches "permission values" 131 meta-data to memory addresses. At any particular time, a single protection domain is active, as indicated by the current value of the Protection Domain ID register 130. Note that the active permissions table must be swapped out on cross-domain calls. This is a heavyweight activity compared to a traditional function call. The Mondriaan scheme does not provide any specific efficient means to perform this swapping. Quoting [WA-2003]:
> We believe CPU designers will be motivated to accelerate cross-domain calls to enable the benefits of protected execution.

In contrast, Hard Object meta-data refers to specific module-ids and, indirectly, their associated subsets of instruction and data addresses. The program counter changes naturally at a function call as part of the calling process and thus little extra work is required when the call also crosses a protection domain boundary. Said another way, the Mondriaan Memory Protection mechanism requires considerably more state to be changed (in the form of a change from one table to the other, with the potential flushing of corresponding caching structures) as a result of a protection boundary change than does Hard Object.

2. Stack Protection Mechanisms

The Mondriaan design discloses a method of stack data protection using a "frame base" register and a "stack limit" register [WA-2003, Section 3.3]. The Hard Object design does something possibly similar with slightly different names ("caller-protect" 021 and "stack-limit" 022); see FIGS. 2 and 11. However the Mondriaan mechanism for performing a function call across domains requires the use of a heavyweight mechanism they call "call gates" to pass information from one protection domain to another, it seems that in the Mondriaan design, data cannot even be simply passed on the stack as is traditional and fast in both prior art systems and the Hard Object system. Quoting [WCA-2002, Section 3.8]:
> Parameters are passed in registers. More elaborate data structures are passed using a very simplified form of marshalling which consists of the caller traversing the data structure and granting appropriate permission to the provider domain . . . . If two domains call each other frequently, they can copy arguments into buffers which are properly exported.

In contrast, a cross-domain function call in Hard Object system requires no such call-gate mechanism and allows very fast traditional use of the stack to (1) pass data as arguments and (2) return data as return values on the stack even when the two functions are in mutually untrusting modules.

3. Ownership and Managing Permissions

The Mondriaan design anticipates the Hard Object rule of allowing only an owner to have the ability to set the owner of the address to another module (be careful reading their articles as they actually they use the word "own" to mean more than one thing; I cite the meaning closest to that of Hard Object). [WCA-2002, Section 3.1]: "Every allocated region of memory is owned by a protection domain, and this association is maintained by the supervisor." [WA-2003]: "Only the owner of a memory region may revoke permissions, or grant ownership to another domain." Note however that the Mondriaan design requires these actions taken by an owner be done using a kernel crossing: [WA-2003]"The MMP supervisor software can enforce additional memory usage policies because all calls for permissions manipulation are made via the supervisor." However, in contrast Hard Object does not require a kernel crossing to change the owner of some addresses, as a user-mode hardware instruction 120 is provided for this purpose; see FIGS. 8 and 12*a*.

D. Nozue et al.

Of particular interest, [OSSNMS-1992] and U.S. Pat. No. 5,890,189 Nozue, et al. (which is a continuation of U.S. Pat. No. 5,627,987 Nozue, et al.) propose both a "capabilities" system and an "access control lists" (ACLs) system for protecting data pages.

1. Protection Regions Using Hardware Text Ranges

The Nozue ACLs system associates data pages and text pages that can read and write them, similar to Hard Object, as well as providing other functionality. While the Nozue design seems to contain hardware features that would provide to software the same functionality as the Hard Object owner module-id 063 functionality—though not the Hard Object user-mode ownership transfer feature 120 nor the user-mode integrity bit 064—the Nozue design contains more hardware complexity than would be needed by software designed for Hard Object hardware. For example, the Nozue design calls for a PTE to contain three access control entries and a pointer to further entries, allowing the construction of an arbitrarily-large linked list of entries which must be read at each access check. In contrast, in the Hard Object design only requires a constant amount of state to be annotated onto a PTE and further all Hard Object checks read only a constant amount of data during the check.

2. Ownership and Managing Permissions

In the Nozue system it seems that setting the ACLs on a page requires a call into the kernel. In current microprocessor architectures and operating systems, kernel calls are expensive (however they do further suggest a change to a Single Address Space Operating System where kernel calls might be cheaper). In contrast the Hard Object method of transferring address ownership uses a single user-mode hardware instruction (the set-owner-module-id instruction 120); see FIGS. 8 and 12*a*.

The Nozue design does not seem to provide any equivalent of the Hard Object integrity bit 064; see FIGS. 6, 8, 9 and 12*a*.

3. Stack Protection Mechanisms

The Nozue system also does not seem to provide any method for protecting the stack frame of a function in one module from the code in another module or at least not in a way that would also allow for the traditional contiguous software stack organization (where, for example, function arguments and return values can be passed on the stack); in contrast Hard Object provides a hardware mechanism for protecting the stack frame of a suspended function from an attack by the currently executing function; see FIG. 2 for an example of this mechanism in action.

E. Google's Native Client

Google's Native Client [Google-NaCl-2009] is an Open Source software project which attempts to provide isolation between different programs using purely software mechanisms. As such it differs considerably from Hard Object which offers hardware mechanisms. The Native Client project addresses some of the same software problems as Hard Object does, such as the problem of constraining dynamic control flow transfer. They constrain dynamic control transfer by requiring software to mask off the low bits of the target address of a dynamic control transfer so that the transfer can only target an address that is a multiple of, say, 32. They then ensure that instructions on such locations are executable only if a given location is a legitimate target of a dynamic control transfer. In contract, Hard Object solves this problem using a hardware mechanism that indicates which locations are legal targets of dynamic control transfers.

F. Others

U.S. Pat. No. 4,408,274 Wheatley, et al. is a hardware capabilities system which associates capabilities to a process; Hard Object works the other way, associating data addresses and code that may operate on it. A similar contrast occurs with U.S. Pat. No. 5,892,944 Fukumoto, et al. which seems to attach their rights to threads; again, Hard Object attaches rights to addresses, not threads. In U.S. Pat. No. 6,542,919 Wendorf, et al. and U.S. Pat. No. 5,845,129 Wendorf, et al. a method is disclosed where a memory page is associated with a group of threads; again, in contrast a Hard Object system associates rights to addresses, not threads. U.S. Pat. No. 4,442,484 Childs, Jr., et al. uses privilege levels per task to protect software objects; in contrast, Hard Object requires no need of privilege levels and does not decide access at the whole-task granularity, but instead in a different way by distinguishing rights by module-ids associating instruction and data address.

U.S. Pat. No. 6,941,473 Etoh, et al. provides hardware support for detecting stack smashing; in contrast, Hard Object protects the heap as well as the stack; See FIG. 1. U.S. Pat. No. 4,701,846 Ikeda, et al. provides hardware support for separation of the heap and the stack; in contrast, Hard Object goes further and separates the heap in a fine-grain way.

U.S. Pat. No. 5,075,842 Lai and U.S. Pat. No. 5,157,777 Lai, et al. provide hardware support for marking some data as special meta-data. U.S. Pat. No. 5,075,845 Lai, et al. and U.S. Pat. No. 5,075,848 Lai, et al. provide pointers to objects stored next to permissions meta-data. In contrast, Hard Object puts its meta-data 061 into the page table 060, leaving the program's virtual address space uncluttered; see FIG. 6.

U.S. Pat. No. 4,525,780 Bratt, et al. provides each software object with a 128-bit identifier; in contrast Hard Object requires no special identifiers for software objects (beyond their usual address) and objects are not even a "first class" concept in the hardware, only modules are. U.S. Pat. No. 4,434,464 Suzuki, et al. seems to associate program regions with memory regions and then seems to change access permissions on transition through a jump table when crossing module boundaries; however they require indirection through a jump table rather than allowing direct function calls and they do not seem to supply a method for protecting stack data requiring calling only trusted modules or using separate stacks; in contrast, Hard Object allows direct function calls and protects the stack temporaries of the caller from untrusted callees. Similarly, [WS-1992]proposes associating to memory pages an Access Identifier (AID) and to processes Protection Identifiers (PID) where the PIDs of a process associate protections to a page with a matching AID; in contrast Hard Object requires no such PIDs/AIDs and associates data addresses and instruction addresses, not data addresses and threads/processes.

iWatcher and AccMon, [ZQLZT-2004; ZQLZT-2004b; ZLFLQZMT-2004], check many kinds of memory accesses in a best-effort way that is different from the Hard Object system.

U.S. Pat. No. 7,134,050 Wenzel isolates the objects of each module from other modules such that the objects of a module can only be operated on only by the program text of the same module; however, modules may only communicate through a special message subsystem: "The illustrated embodiments result in a fault containment sub-environment, or set of interfaces, that surround the module instances, deliver messages, schedule execution of the module instance when a message is delivered, and manage memory key (de)activation when each instance is called." In contrast, the present Hard Object work requires no special message subsystem: modules communicate by normal function calls and no special scheduling mechanism is required.

[EKO-1995] disclose user-readable page table entries: "The page table should be visible (read-only) at application level." User-readable and writable page table entries seem to be disclosed by [HP-1998](the emphasis is mine):

> 64-bit system space refers to the portion of the entire 64-bit virtual address range that is higher than that which contains PT space . . . system space is further divided into the S0, S1, and S2 spaces . . . . Addresses within system space can be created and deleted only from code that is executing in kernel mode. However, page protection for system space pages can be set up to allow any less privileged access mode read and/or write access . . . . The global page table, also known as the GPT, and the PFN database reside in the lowestaddressed portion of S2 space. By moving the GPT and PFN database to S2 space, the size of these areas is no longer constrained to a small portion of S0/S1 space. This allows OpenVMS to support much larger physical memories and much larger global sections.

The Exokernel paper, [EKO-1995], on page 4 tantalizingly refers without citation to another hardware design where there is a concept of memory addresses being owned:

Some Silicon Graphics frame buffer hardware associates an ownership tag with each pixel . . . . The application can access the frame buffer hardware directly, because the hardware checks the ownership tag when the I/O takes place.

BRIEF SUMMARY OF THIS WORK

The present Hard Object work provides simple fine-grain hardware primitives with which software engineers can efficiently implement enforceable separation of programs into modules (code that exclusively maintains the invariants of its data) and constraints on control flow, thereby providing fine-grain locality of causality to the world of software. Additionally, Hard Object provides a mechanism to mark some modules, or parts thereof, as having kernel privileges and thereby allows the provision of kernel services through normal function calls, obviating the expensive prior art mechanism of system calls. These features are achieved using a hardware mechanism that seems to be significantly simpler than those in the prior art. Together with software changes, Hard Object enforces Object Oriented encapsulation semantics and control flow integrity in hardware; that is, we make software objects hard. Although the description above contains many specificities, these should not be construed as limiting the scope of the embodiment but as merely providing illustrations.

BRIEF DESCRIPTION OF THE DRAWINGS

FIG. 3a—Prior Art: shows the Memory Management Unit's place in the virtual-to-physical address translation process; this figure reproduced and slightly simplified from [BO-2003, FIG. 10.2].

FIG. 3b is FIG. 3a augmented to show that the Hard Object rules can be enforced in the Memory Management Unit.

FIG. 4—Prior Art: shows a basic page table; this figure reproduced from [BO-2003, FIG. 10.4].

FIG. 5—Prior Art: shows a virtual memory system being used to provide page-level process protections; this figure reproduced from [BO-2003, FIG. 10.11].

FIG. 6 shows a page table with the additional novel Hard Object meta-data embedded directly into the page table.

FIG. 10a shows the Hard Object meta-data fields.

FIG. 10b shows the extension meta-data field public-readable.

FIG. 11 shows Hard Object registers.

FIG. 11b shows the current-module-id register and the optional current-module-suff-len register from the alternative embodiment 8.2 Replacing the kernel mode bit with a master module-id.

FIG. 12a shows Hard Object owner, integrity, and stack meta-data instructions.

FIG. 12b shows the Hard Object extension instruction branch-on-integrity-false.

FIG. 12c shows the Hard Object extension instructions set-public-readable and get-public-readable.

FIG. 13a—Prior Art: shows the basic organization of Mondriaan Memory Protection; it is an altered combination of reproductions of [WA-2003, FIG. 1] and [WCA-2002, table 1], which were then further modified to point out the Mondriaan meta-data permission values.

FIG. 13b is like FIG. 13a with Mondriaan meta-data permission values replaced with Hard Object meta-data, showing the alternative embodiment Hybrid design with Mondriaan using only Hard Object meta-data.

FIG. 20 shows Hard Object target-indicator instructions.

FIG. 21 shows Hard Object just-transferred-control instructions.

FIG. 22 is a diagram of the stack in a typical configuration; in this figure, the "<--" notation means "points to".

FIG. 23 is a flow chart for the one aspect of dynamic jump/branch instructions as presented in the first embodiment.

FIG. 24 is a flow chart for one aspect of dynamic the call instruction as presented in the first embodiment.

FIG. 29 shows checks done in the alternative embodiment Alternative mechanism for enforcing constraints on dynamic control transfer by a dynamic jump or branch instruction.

FIG. 30 shows checks done in the alternative embodiment Alternative mechanism for enforcing constraints on dynamic control transfer by a dynamic call instruction.

FIG. 31 shows the enter-kernel-mode( ) and exit-kernel-mode( ) instructions from the alternative embodiment An intermediate danger mode between user and kernel mode.

FIG. 32 is a flow chart for the enter-kernel-mode( ) instruction from the alternative embodiment An intermediate danger mode between user and kernel mode.

FIG. 33 is a flow chart for the exit-kernel-mode( ) instruction from the alternative embodiment An intermediate danger mode between user and kernel mode.

FIG. 37*a* shows the special module-ids.

FIG. 37*b* shows the target-pub/priv/jump/return-multi instructions from the alternative embodiment 8.3. Multiple modules per text page.

FIG. 37*c* shows the arguments to the target-pub/priv/jump/return-multi instructions from the alternative embodiment 8.3. Multiple modules per text page.

FIG. 37*d* shows the CPU status bits just-jumped-multi, just-called-multi, and just-returned-multi from the alternative embodiment 8.3. Multiple modules per text page.

FIG. 38*a* shows the Hard Object Meta-Data with the control-danger bit from the alternative embodiment 8.1. Unifying the control bit 066 and the danger bit 065 into a "control-danger" bit 380 annotating memory.

FIG. 38*b* shows the Hard Object Meta-Data with the control-danger bit from the alternative embodiment 8.1. Unifying the control bit 066 and the danger bit 065 into a "control-danger" bit 380.

FIG. 39*a* shows the Hard Object Meta-Data with owner/ownable separation for text pages from the alternative embodiment 3b. Multiple sub-module classes per module; owner/ownable separation.

FIG. 39*b* shows the Hard Object Meta-Data with owner/ownable separation for data pages from the alternative embodiment 3b. Multiple sub-module classes per module; owner/ownable separation.

FIG. 39*c* shows a comparison between two values where the suffix of length 3 of the bitwise exclusive-or of the two values is ignored; that is, the comparison of the two values ignores the 3 least significant bits; from the alternative embodiment 3b. Multiple sub-module classes per module; owner/ownable separation.

FIG. 40 shows a flow chart for the check for access to data at Address x by instruction at Address I when using the embodiment of an owner/ownable module-id separation and an owner-module-suff-len from the alternative embodiment 3b. Multiple sub-module classes per module; owner/ownable separation.

FIG. 42 shows the set-current-module-id (UInt new-module-id) and restore-current-module-id( ) instructions from the alternative embodiment 8.2 Replacing the kernel mode bit with a master module-id.

FIG. 43 shows a flow chart for the set-current-module-id (UInt new-module-id) instruction from the alternative embodiment 8.2 Replacing the kernel mode bit with a master module-id.

FIG. 44 shows a flow chart for the restore-current-module-id( ) instruction from the alternative embodiment 8.2 Replacing the kernel mode bit with a master module-id.

FIG. 45 shows a flow chart for checking required for dynamic jump/branch instruction(s) from the alternative embodiment 8.2 Replacing the kernel mode bit with a master module-id.

FIG. 46*a* shows a flow chart for checking required for dynamic call instruction(s) from the alternative embodiment 8.2 Replacing the kernel mode hit with a master module-id.

FIG. 46*b* shows a flow chart for checking required for static call and return instructions from the alternative embodiment 8.2 Replacing the kernel mode bit with a master module-id.

FIG. 47 shows a flow chart for checking required for dynamic jump/branch instruction(s) from the alternative embodiment 8.3. Multiple modules per text page.

FIG. 50 shows the read-if-multi-text instruction from the alternative embodiment 8.4. Reading text pages in the presence of multiple modules per text page.

FIG. 51 shows a flow chart for checking required for the read-if-multi-text instruction from the alternative embodiment 8.4. Reading text pages in the presence of multiple modules per text page.

DETAILED DESCRIPTION

Figure 1:
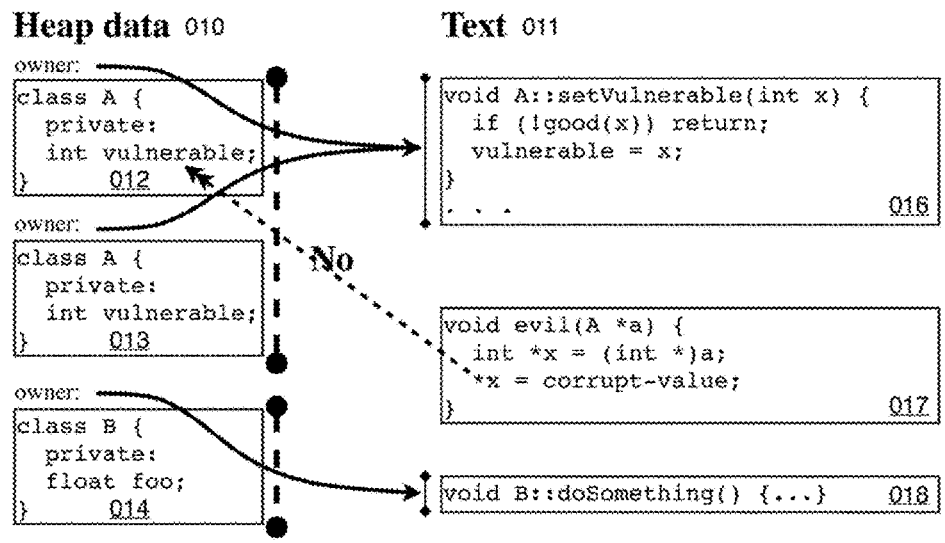
FIG. 1 shows the Hard Object heap protection feature in action.

It is desired to provide sufficient hardware mechanism such that, when coupled with software changes, a computer system may be created which can do the following:
 (1) Protect heap: Partition data and code into modules and prevent the heap and global data of one module from being accessed by code of another, see FIG. 1.
 (2) Protect stack: Protect the stack data of one function from being accessed by another, prevent the corruption of stack meta-data, and guarantee proper function call/return pairing; see FIG. 2.
 (3) Protect control: Constrain control flow such that (a) jumps and branches must remain within a module, (b) function calls must go only to the tops of functions, and (c) certain functions may be designated as "public" (see below) whereby a module may receive a cross-module call only at the top of a "public" function.
 (4) Provide a lightweight kernel: Eliminate the heavyweight prior art system call mechanism used to go from user mode to kernel mode by instead annotating kernel mode onto some text (code) pages and giving kernel powers to instructions exactly when they reside on those pages.

1. Terminology and Notation

We denote logarithm base b of x as "log_b(x)". We denote y raised to the power z as "yz". For the purposes of this document "K" means kilo=210, "M" means mega=220, "G" means giga=230. Strings of characters starting with "0x" are numbers written in hexadecimal notation.

When referring to memory addresses, virtual, rather than physical, addresses are meant. Without loss of generality we assume the convention that that the stack grows downwardly in the address space and therefore the "top" of the stack is the datum on the stack that has the lowest address but is still being used. That said, when we talk about pointing to the "top" of ranges of stack data, such as a block of function arguments or a block of stack temporaries, we mean to point to the highest-addressed element of that block. Unfortunately both of these usages seem to be established conventions.

A "bit" is a binary digit: zero or one. A "word" is the natural size of data moved around by the machine which is usually also the size of a CPU register; by a "word" we may also mean a particular block of data of this size; modern machines have 32 or 64 bit words; throughout we present values for a 32 bit machine for specificity of example, but this is no restriction on our design. An "address" is a word-length sequence of bits which when interpreted by the Memory Management Unit determines a unique cell in memory. An "unsigned integer" or "uint" is a word-length sequence of bits that can be used in fixed-point arithmetic subject to its size limit.

We denote the type of a pair of two types of data by conjoining them with an infix "*"; for example a pair consisting of an address and a uint would be denoted "address*uint". When formally defining a new computer instruction, the instruction interface is given in a notation similar to that of the C language:

ReturnType instruction-name (ArgumentType1 argument1, . . . ).

If the instruction returns no value, the ReturnType may be omitted or given as void.

A data "access" is an attempt to read or write data to or from a memory address and the address accessed is the "target" of the access. "PTE" means page table entry 041. For a page table entry P, let "P.field_name" denote the field of P named by the field_name name after the first dot. "PC" means the program counter 250. For a memory address x, let "x.PTE" denote the Page Table Entry of x. "FAULT" means an error condition in which the attempted operation is disallowed and at which point the CPU invokes an error procedure; the present work is operationally described without specification of any particular form for the FAULT error procedure; "ALLOW" means the operation continues without interruption. When we refer to "the" instruction which performs a given operation, we mean to refer to all instructions that belong to the class of instructions that perform that operation; for example, some architectures have many, say, "branch" instructions and when referring to "the" branch instruction we mean to refer to all instructions providing branch functionality.

The value of a PTE field "of an address" is the value of that field of the Page Table Entry for the page holding the address. The value of a PTE field "of an instruction" or "of a datum" is the value of that field for all of the addresses spanned by the instruction or datum. (These values are unambiguous because if a datum or instruction spans pages then all pages must have the same values for all of the Hard Object PTE fields or the CPU issues a fault; see below).

A page is "owned" by the module-id in the owner module-id field annotating its page (see below). Addresses from (inclusive) the caller-protect 021 to (exclusive) the stack-limit 022 are "in frame" 023 (again, see below). We say a control transfer (jump, branch, call, or return) is "internal" (to a module) if the owner module-id of the instruction initiating the transfer (see below) is the same as the owner module-id of the target of the transfer (again, see below); otherwise the control transfer is "cross-module".

Also see the "GLOSSARY OF SOME TERMS" section, below.

A. Additional Hardware Mechanism

In accordance with one embodiment, Hard Object comprises the mechanisms of the following sections.

1. Additional Fields to the Page Table Entries

Hard Object adds the following meta-data fields 061 to each Page Table Entry (PTE) 041:
 a "text" bit 062,
 an "owner module-id" 063 field.

The text bit indicates whether a page is a text (code) page or a data page.

We add to each PTE of each data page the following field:
 an "integrity" bit 064.

We add to each PTE of each text page the following fields:
 a "danger" bit 065,
 a "control" bit 066,
 a "target-tag" field 067.

See FIG. 10*a* for a list and FIG. 6 to see a page table with these features added.

The "width" of a field is the number of bits it uses, and this may vary, as follows. For the owner module-id we envision using 15-bits on a 32-bit system; other sizes are possible. For the target-tag the number of bits we envision using is the logarithm base two of the page size at the memory addressability granularity (often the byte granularity); for a standard 4 kilobyte page on a byte-addressable machine, this would be 12 bits.

Note that we say that "the X bit is set" (where X could be "control", "danger", etc.) when bit X is set in the PTE of the page containing the instruction address of the current instruction (alternatively, we say that bit X is annotated onto the current instruction address).

2. Additional Instructions to Manipulate the New PTE Fields

We want user-mode code be able to set and get the owner-module-id 063 and integrity bit 064 of a given data page, so we add user-mode set 120 122 and get 121 123 instructions to manipulate these above-mentioned PTE-fields. All of these instructions subject to restrictions given elsewhere. See FIGS. 12*a*, 8, 9.

The other Hard Object PTE fields (the text bit 062, danger bit 065, control bit 066, and target-tag field 067) can already be set by code in kernel mode (having the danger bit) and there is no need to allow other code to have this power (such as by providing special instructions for accessing them).

3. Additional "Target-Indicator" Instructions

We add three new instructions; we refer to these collectively as "target-indicator" instructions:
 a "target-pub" instruction 200,
 a "target-priv" instruction 201,
 a "target-jump" instruction 202.

Each instruction takes an argument wide enough (having sufficient bits) to hold a copy of a Page Table Entry target-tag field 067. See FIG. 20.

4. Additional "Just-Transferred-Control" CPU Status Bits

We add three CPU status bits to a CPU status register (possibly introducing a new CPU status register if necessary); we refer to these collectively as "just-transferred-control" bits; see FIG. 21:
 a "just-called-cross" bit 210,
 a "just-called-internal" bit 211,
 a "just-jumped" bit 212.

5. Additional Registers

We add two special registers; see FIGS. 11 and 22:
(1) A "caller-protect" register 021 which points to the top of the current frame.
(2) A "stack-limit" register 022 which points to the maximum extent of the stack.

We further assume the existence of the standard prior art "stack-pointer" 226 register which points to the "top of the stack", that is, the boundary between used and unused stack memory. We assume that the stack-pointer points to the next word available on the stack for use as a temporary (some architectures instead have the stack-pointer point to the last temporary pushed; in this case some of our operations on the stack-pointer, such as the way it is restored from the caller-protect 263 (see FIG. 26), should be offset by one word in the obvious way).

6. Additional Instructions to Manipulate the New Registers

Figure 28A:
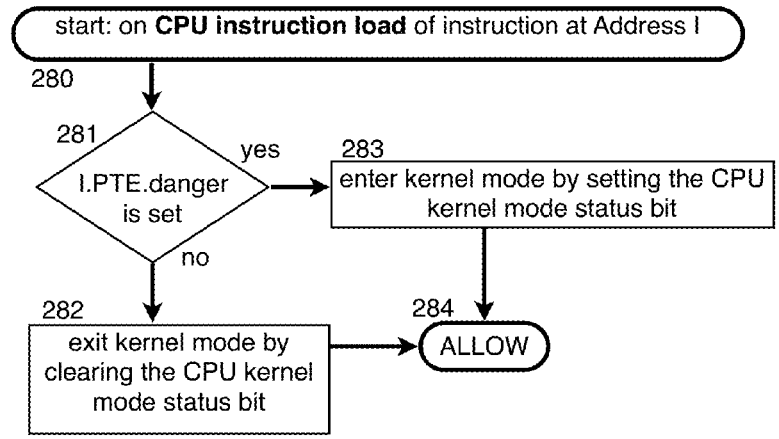
FIG. 28a shows maintaining the mode of the CPU (either kernel or user) done in the first embodiment by the CPU at each instruction load cycle as a function of the value of the danger bit in the PTE annotating the Address held by the program counter.

We add set 124 126 and get 125 127 instructions to manipulate the new caller-protect 021 and stack-limit registers 022. These instructions are "dangerous" and as such may only be used in kernel mode (which in the Hard Object design, means only by instructions on text pages having the danger bit set) 281/286; see FIGS. 28a and 28b. These instructions are listed in FIG. 12a. Again, user-mode code that attempts manipulate the caller-protect or stack-limit registers faults.

7. Modifications to Data Access Rules

We add hardware checks and operations to check the data access rules, as follows.
(1) These checks are made at each PTE-field, register, and memory access.
(2) These checks enforce the below rules (see FIG. 7).
(3) These check are done by either a Hard Object version of the Memory Management Unit 038, see FIGS. 3a (prior art MMU), 3b (Hard Object modified MMU), and 7 (flow chart of checking), (or by the instructions or by the CPU) using the above-mentioned Hard Object PTE-fields and registers.

In particular the hardware implements the three general rules and respective sub-rules given below. These rules are stated textually in quotes and then stated again procedurally. (Note that the meta-data of checks H-access and H-owner are unambiguous due to rule H-unambiguous.)

Figure 7:
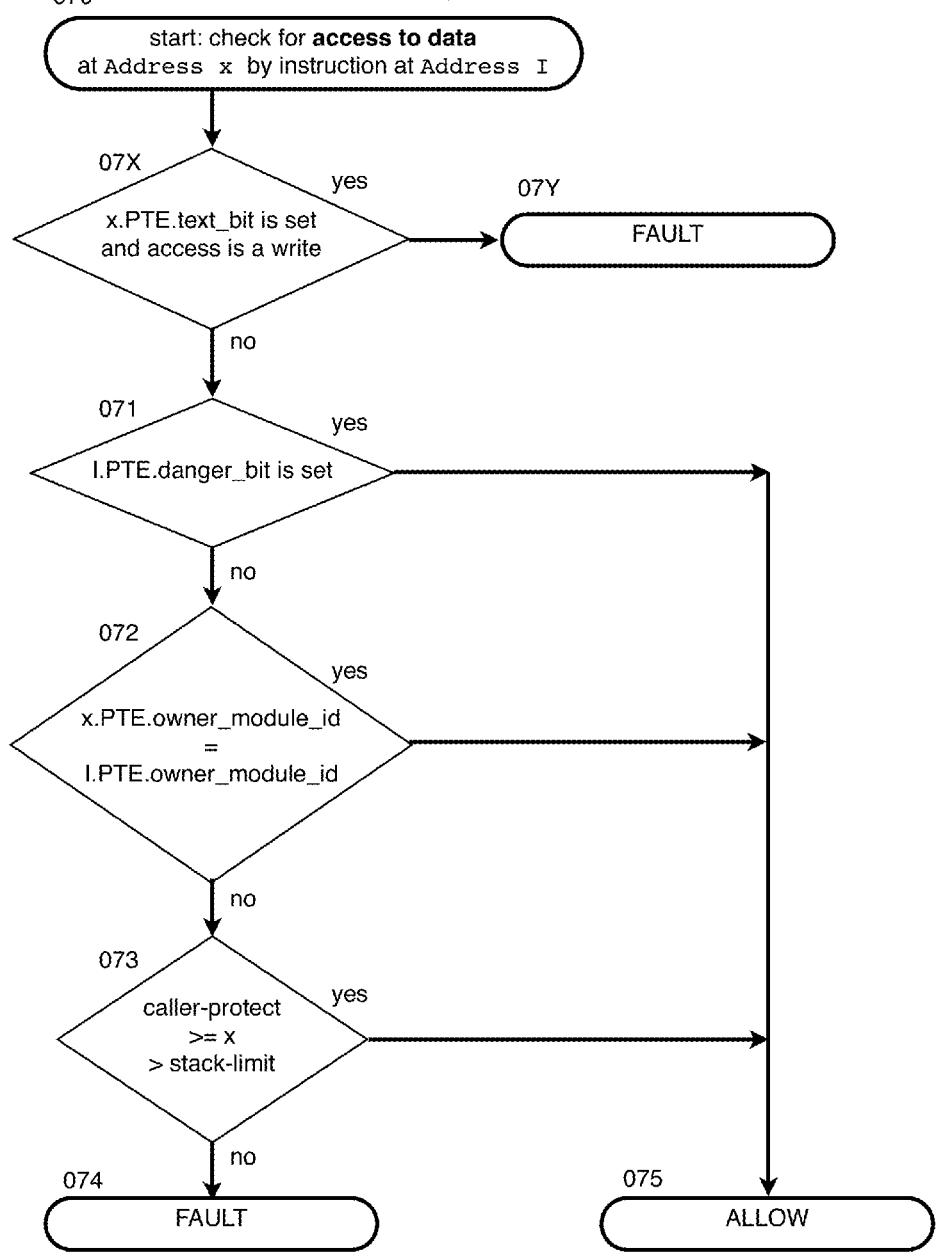
FIG. 7 shows a flow chart for Hard Object Rule H-access.

H-access—see FIG. 7: On an access to data at an address x by an instruction located at address I, these checks are made.
("No writing to text pages.")
(1a) 07X If the access is a write and I.PTE.text_bit is set, FAULT 074 the access.
("Kernel code can access data at any address.")
(1b) 071 If I.PTE.danger_bit is set, ALLOW 075 the access.
("Allow if the instruction and target are in the same module.")
(2) 072 Otherwise, if x.PTE.owner_module_id=I.PTE.owner_module_id, ALLOW 075.
("Allow if the target is in frame.")
(3) 073 Otherwise, if caller-protect>=x>stack-limit, ALLOW 075.
("Access is opt-in.")
(4) 074 Otherwise, FAULT.

Figure 8:
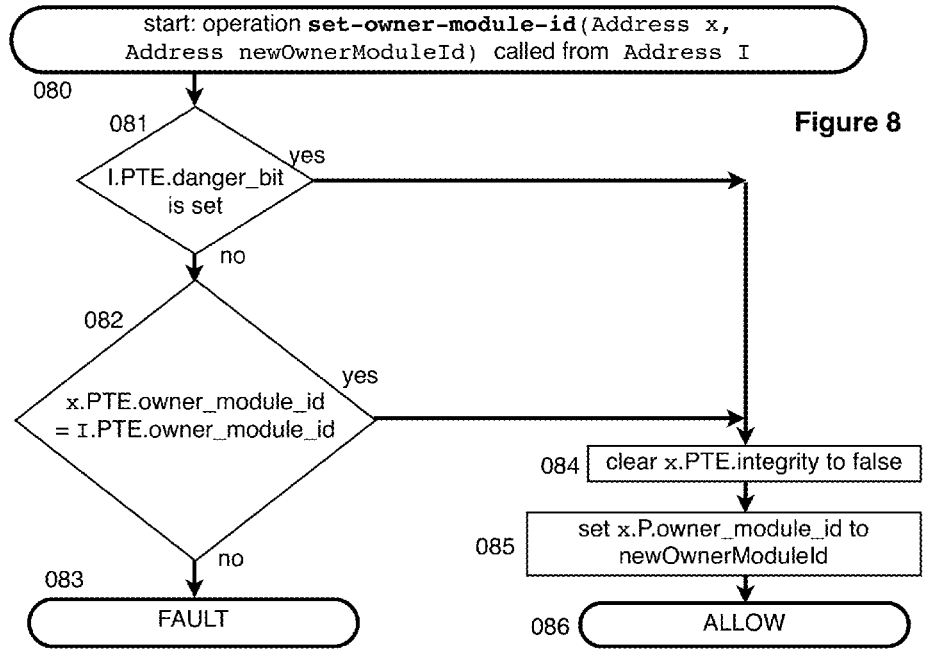
FIG. 8 shows a flow chart for Hard Object Rule H-owner for instruction set-owner-module-id.
Figure 9:
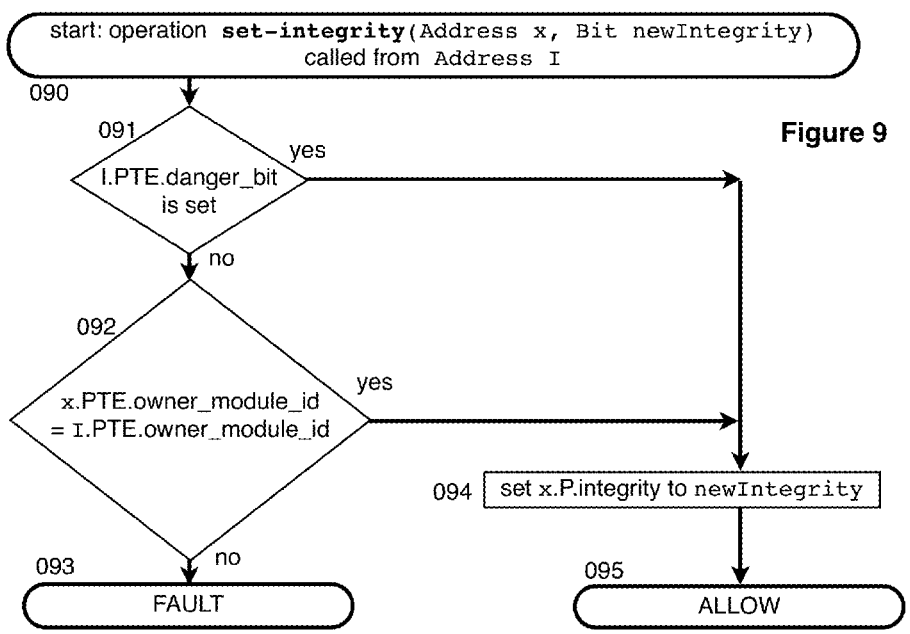
FIG. 9 shows a flow chart for Hard Object Rule H-owner for instruction set-integrity.

H-owner—see FIGS. 8 and 9:
("Other than the kernel, only the page owner can set page's integrity or owner.")

(a) When an instruction at address I executes to set either the integrity 064 or owner module-id 063 fields on a page P, the following check is made:
(1) 081/091 If I.PTE.danger_bit is set, ALLOW 086/095.
(2) 082/092 Otherwise if P.owner_module_id=I.PTE.owner_module_id, ALLOW 086/095.
(3) 083/093 Otherwise FAULT.
("On an ownership change, the integrity bit is cleared to false.")
(b) 084 When the instruction to set the owner field on a page P executes, the P.integrity field is cleared to false.

Figure 19:
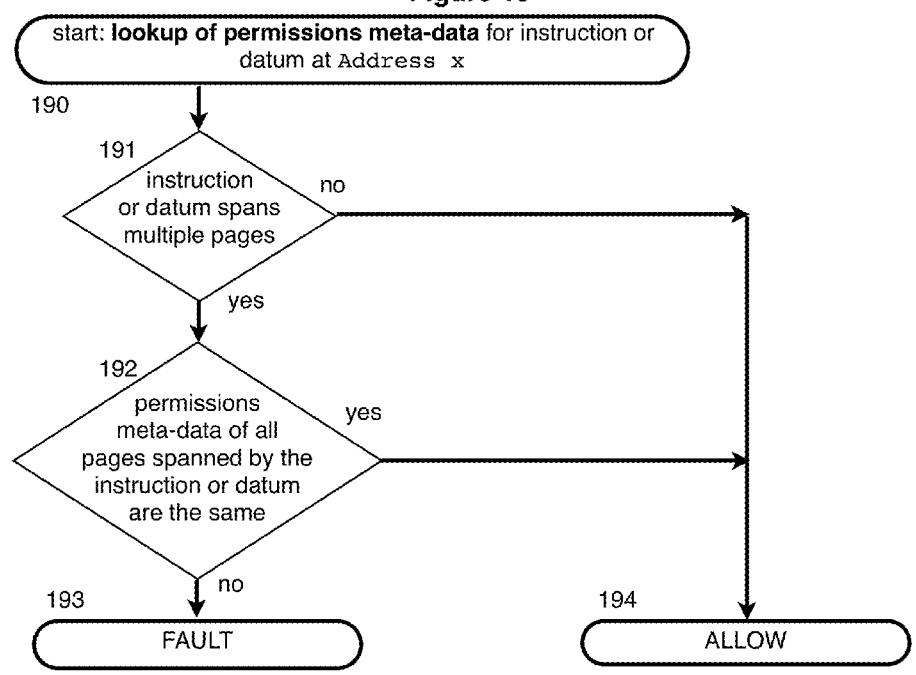
FIG. 19 shows a flow chart for Hard Object Rule H-unambiguous.

H-unambiguous—see FIG. 19. On a Hard Object check that looks up the value of a PTE field associated with an instruction or a datum:
("Meta-data must be unambiguous.")
(1) 191 If the instruction or datum in question lies on multiple pages, then:
(2) 192 If all such pages have identical protection PTE entries, including Hard Object meta-data, ALLOW 194.
(3) 193 Otherwise FAULT.

Note that different virtual pages map to different physical pages, so the PTE entries for two virtual pages in the same address space will not be identical in any case. This rule simply insists that any fields relevant to protection checks, such as Hard Object meta-data, but also any other fields relevant to an access check in question, be unambiguous across two pages that hold an instruction or datum the access permissions of which are being checked.

Note that we have factored out this aspect of the design ensuring meta-data unambiguity from all of the other figures and from the rest of the discussion because to include it explicitly everywhere it applies would create undue complexity of text and figures without providing any additional understanding.

8. Modifications to Dynamic Jump and Branch Instructions

Again, recall that a dynamic control transfer (call, branch/jump, return) is one where the target of the control transfer is data computed at run/dynamic time (rather than at static time). We modify the dynamic jump/branch instruction (there may be many such instructions; we refer to the whole class of them as an abstract instruction in the singular) and branch instructions to operate as follows; see FIG. 23.

The dynamic jump/branch instruction checks if the jump is internal or cross-module by comparing the owner module-id of the instruction address to the owner module-id of the target address 231. If the jump/branch is cross-module, then the CPU faults 233. If the jump/branch is internal, then the instruction sets the just-jumped bit in the CPU, the CPU thereby entering "just-jumped mode" 232.

Control then transfers to the target instruction and the CPU first sees the just-jumped bit when interpreting that target instruction 234.

9. Modifications to Call and Return Instructions

We modify call and return instructions to ensure the following properties:
(1) We must ensure that the caller-protect always points to the top of the arguments to the current function as functions call and return.
(2) We must ensure that the stack pointer is restored correctly.
(3) Although we have constrained the addresses to which control may transfer (using a jump, branch, or call instruction), we have not constrained the addresses to which control may return at return instruction.

The return address used by the return instruction is placed on the stack by the call instruction of the caller; residing on the stack, the return address is vulnerable to being overwritten, thus disrupting the correct operation of call and return. Further, the return instruction could write another return address on the stack and attempt to return to this fake address. We want to prevent this kind of disruption.

We introduce the following changes to the calling convention (the contract of behavior between a caller and a callee function), in particular by altering the call and return instructions. (Recall below that conventionally the stack grows down.)

Figure 25:
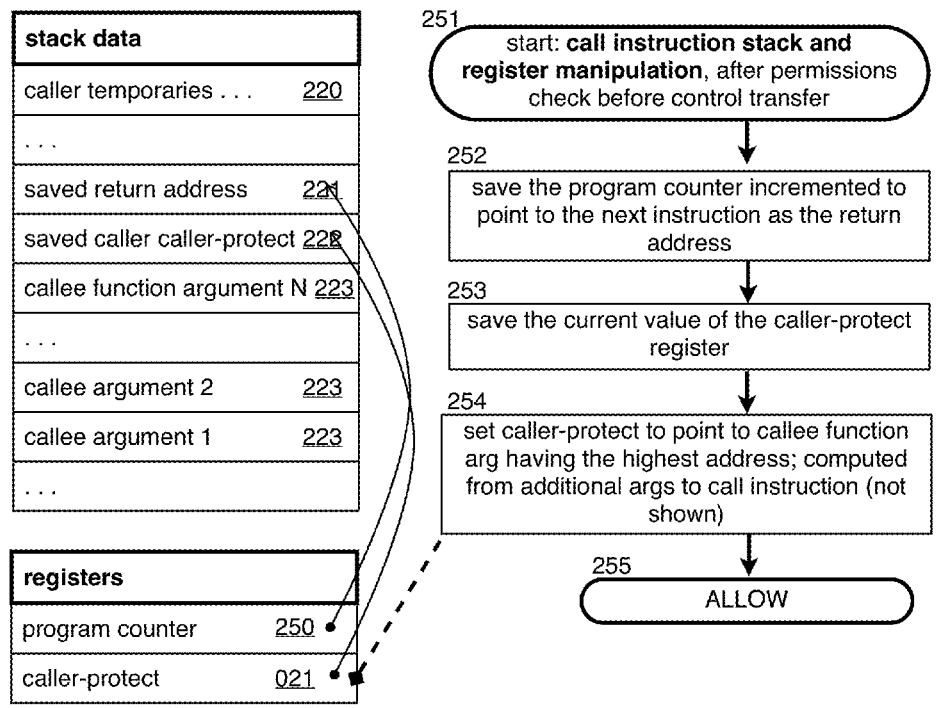
FIG. 25 is a stack and register diagram and a flow chart for the stack and register manipulations done by the call instruction after the permissions check but before the actual transfer of control; in this figure, the solid arrows indicate direct data-flow and the dashed line indicates a more complex computation.

The caller should reserve two words on the stack above the arguments for use by the calling convention. The call instruction (see FIGS. 22 and 25)

(1) 252 saves into the first word reserved above the arguments 221 the return address of the call, namely the current value of the program counter 250 incremented to point to the next instruction, (2) 253 saves into the second reserved word above the arguments 222 the current value of the caller-protect register 021, (3) 254 sets the caller-protect register to point to the callee function argument having the highest address (the first word below the two words reserved on the stack used in steps (1) and (2) above.)

Figure 26:
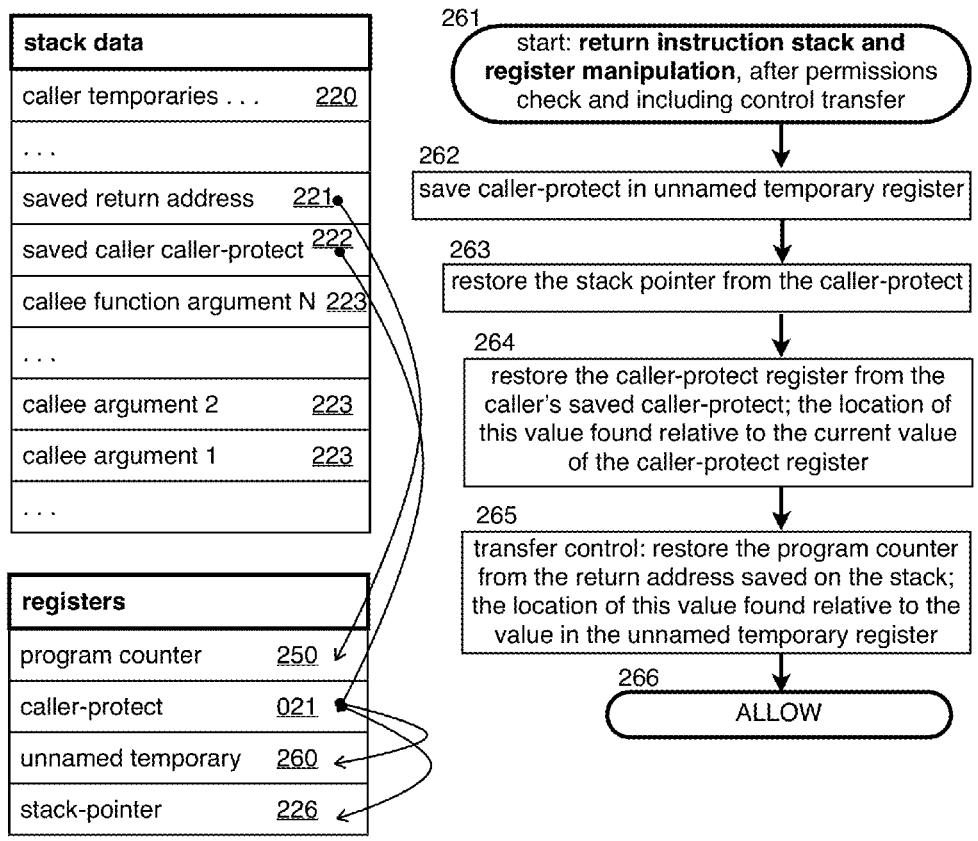
FIG. 26 is a stack and register diagram and a flow chart for the stack and register manipulations done by the return instruction after the permissions check and through the actual transfer of control; in this figure, the solid arrows indicate direct data-flow.

The return instruction (see FIGS. 22 and 26)

(1) 262 saves the value of the current caller-protect register in an unnamed temporary 260 for the duration of the return instruction, (2) 263 restores the stack-pointer 226 from the value of the caller-protect register 021, (3) 264 restores the caller-protect register 021 from the caller's saved caller-protect on the stack 222 (the location of this value found relative to the current value of the caller-protect register), (4) 265 returns, restoring the program counter 250 (transferring control to the caller) from the saved return address on the stack 221 (the location of this value found relative to the value of the unnamed temporary register 260, which was the value of caller-protect at the start of the return instruction before the value of the caller-protect register was altered in step (3) above).

Note that we give the return instruction permission to access the saved caller-protect and saved return address on the stack even though other instructions are prevented from accessing them by the memory access checks against the caller-protect/stack-limit registers. This is safe as the return instruction is about to transfer control away from the callee. No other instructions can alter the caller-protect register unless in kernel mode.

Changing the calling convention in this way plus performing the caller-protect/stack-limit memory access checks 073 together ensures that, during the execution of the callee function, both the stack of saved caller frames (the temporary stack data 220 of suspended functions) and the current saved return address 221 and saved caller-protect stored on the stack 222 cannot be accessed.

As an alternative, we may want to allow the return address to be readable but not writable. Doing so would allow a callee function to determine its caller in an unforgeable way by looking that return address using the get-owner-module-id( ) instruction 121.

Further changes to the software aspect of the calling convention are mentioned below separately.

9b. Modifications to Dynamic Call Instructions

Again, recall that a dynamic control transfer (call, branch/jump, return) is one where the target of the control transfer is data computed at run/dynamic time (rather than at static time). We further modify the dynamic call instruction (there may be many such instructions; we refer to the whole class of them as an abstract instruction in the singular) to operate as follows; see FIG. 24.

A dynamic call sets the just-called-internal bit in the CPU 242 if the call is an internal call 241 or sets the just-called-cross bit in the CPU 243 if the call is cross-module 241, the CPU thereby entering either "just-called-internal mode" or "just-called-cross mode" respectively.

Control then transfers to the target instruction and the CPU first sees the just-called-cross or just-called-internal bit when interpreting that target instruction 244.

10. Modifications to CPU Operation

Handling Page-Straddling Instructions (See FIG. 19):

When crossing a page boundary the CPU faults if an instruction has ambiguous PTE fields 193, that is, if the instruction spans pages 191 and those pages have differing Hard Object annotations on them 192. See rule H-unambiguous above and FIG. 19.

Handling Just-Transferred-Control Status Bits (See FIG. 27):

If the just-jumped bit 212 is set 271, then if the control bit 066 (see FIGS. 6 and 10a) is set 272 on the current instruction (the target instruction of the control transfer instruction which set the just-jumped bit and which just transferred control to the current instruction) then assert a control transfer criterion: the current instruction must 273 be a target-jump 202 having an argument matching 279 the target-tag 067 of its text page or the CPU faults 27E/27B/27D. The CPU clears the just-jumped bit after it checking it 27A.

Otherwise, if the just-called-internal bit 211 is set 274, then if the control bit 066 is set 275 on the current instruction (the target instruction of the control transfer instruction which set the just-called-internal bit and which just transferred control to the current instruction) then assert a control transfer criterion: the current instruction must 276/278 be a target-pub 200 or target-priv 201 having an argument matching 279 the target-tag 067 of its text page or the CPU faults 27E/27C/27D. The CPU clears the just-called-internal bit after checking it 27A.

Otherwise, if the just-called-cross bit 210 is set 277, then assert a control transfer criterion: the current instruction (the target instruction of the control transfer instruction which set the just-called-cross bit and which just transferred control to the current instruction) must 278 be a target-pub 200 having an argument matching 279 the target-tag 067 of its text page or the CPU faults 27C/27D. The CPU clears the just-called-cross bit after checking it 27A.

Handling the Danger Bit (See FIG. 28a):

Any instruction residing on a page having the danger bit 065 (see FIGS. 6 and 10a) set runs in kernel mode; as such the danger bit acts as a "danger mode metadatum" annotating an instruction with the kernel mode. That is, we maintain the CPU to be in kernel mode exactly when 281 the program counter points into a page annotated by the danger bit; this means entering kernel mode 283 when the program counter 250 enters a page annotated with the danger bit and exiting kernel mode 282 when the program counter exits a page annotated with the danger bit.

B. Additional Software Support which Complements the Hardware

We contemplate the following software changes in order to make productive use of the hardware provided above.

1. Initialization Performed by the Runtime Linker-Loader

We envision runtime linker-loader software ensuring the following at program load time:

- static jump/branch instructions are within a module,
- static calls are to the tops of functions,
- static calls to private functions are from within a module,
- static cross-module calls are to "public" functions (see below),
- text pages (and only text pages) have the text bit set to "text" (as opposed to "data"),
- text pages have the correct owner module-id,
- data pages holding globals have the correct owner module-id and the integrity bit set,
- data pages designated for the stack are annotated with a special "nobody" owner module-id,
- text pages have their target-tag set to a sequence not occurring on the page,
- target-indicator instructions have arguments matching the target-tag of their page,
- pages configured as "control" (and only those pages) should have their control bit set,
- pages configured as "danger" (and only those pages) should have their danger bit set.

It is usual for the system allocator to request pages from the kernel as needed, so we do not cover the initialization of those pages here.

Recall that formats for storing executable programs provide facilities for annotating parts of programs. These annotations can be used to partition a single executable into multiple modules and to further annotate meta-data onto functions (and other elements) of a module.

- By a "public" function of a module we mean a function that a module author has annotated as public because the author wishes to allow code from outside of the mode to call into this function; in contrast a "private" function would be a function that the module author only wants to be callable from other functions within the module.
- Note that the linker-loader can read these public/private annotations at program load time and check that (1) no static jumps/branches are cross-module, (2) static functions call only to the tops of functions, and (3) static cross-module function calls only go to public functions. In contrast, constraining dynamic jumps, branches, and calls cannot be done easily at link-load time and thus we provide other mechanisms for constraining them (see FIGS. 23, 24, and 27).

2. Choosing Target-Tags

The point of a target-indicator instruction (see FIG. 20) is that it is different from any other kind of instruction and thereby uniquely indicates the allowed targets of a dynamic control transfer; however accidental combinations of instructions and data on the page can be accidentally identical to a target-indicator instruction, unless its argument and corresponding target-tag field 067 (in the Hard Object meta-data 061 in the PTE) are carefully set to a sequence that is unused for that page. We show that this is always possible.

For a typical 4 kilobyte page that is byte addressable, there are 4K=2**12 possible start locations for an instruction. If we make the target-tag and the argument to the target-indicator instructions 12 bits then (1) a target-indicator instruction takes more than one byte;

(2) so there are at most 2**12-1 possible such (page-straddling instructions) instructions per page where the page has at least one target-indicator instruction (page-straddling instructions can always simply not be used);

(3) since the number of possible target-tag-s is 212, which is greater than the number of possible non-page straddling instruction addresses per page having at least one target-indicator instruction, namely 212-1, (4) there is always an unused byte-aligned 12-bit sequence within a page that can be used as the target-tag and which does not occur anywhere else in the page as an argument to a target-indicator instruction.

Thus we may always pick a target-tag such that no other subsequence within the page is accidentally identical to the target-indicator instruction.

3. Changes to the Software Aspect of the Calling Convention

We envision that the software aspect of the calling convention should be altered to coordinate with the changes to the hardware aspect of the calling convention.

Saving registers: We envision that the calling convention that would be used on cross-module calls is that all registers that the caller wants preserved across the call would be saved by the caller before the call and restored afterwards. That is, on cross-module calls, the calling convention would now treat all registers as caller-save.

Restoring the stack pointer (see FIG. 26): Our automatic maintenance of the caller-protect 021 and stack-pointer 226 registers by the call and return instructions also performs a new kind of automatic callee-cleanup (of the arguments) calling convention by automatically restoring 263 the stack pointer, thereby no longer requiring the caller to trust the stack pointer value left for it by the callee nor to clean up the pushed arguments itself.

4. Management of Owner Module-Ids on Heap Data by the System Allocator

Recall that a system memory allocator provides space for objects on the heap at the request of client programs.

We envision that if a module M requests a data page from the system allocator, that the system allocator sets the owner module-id 063 of that data page to be the module-id of module M before returning the page. We envision the kernel (a) mapping pages into virtual memory for use by the memory allocator and (b) at the same time setting the module-id of the memory allocator module as the owner module-id of those pages. The memory allocator can then simply use set-owner-module-id( ) 120 to give pages to clients.

In order to assign ownership properly, we envision that the system allocator would know the owner module-id of the function that is calling it; one way to accomplish that is as follows. (1) The system allocator preventing dynamic calls to its allocation function by not putting a target-tag for dynamic calls at the top. (2) The linker-loader performing a simple static analysis to ensure that all calls to the allocation function pass their true owner module-id as an argument. If the alternative functioning of the caller-protect is used where the saved return address is readable (but not writeable), then any callee, in particular in this case the system allocator, can read the saved return address and use it to determine the owner module-id of the caller; doing so obviates the need for the caller to pass its owner module-id as an argument.

It is usual for the system allocator to request pages from the kernel, but in an operating system written for Hard Object, there may no longer be a useful distinction between these two. In any case when pages are mapped into memory for use by the allocator, the code mapping these pages in must have the danger bit 065 and we envision that before such pages are given to the system allocator the integrity bit 064 would be cleared so that the system allocator knows to set up its data-structures on those pages and then set 122 the integrity bit when that is done.

5. Maintenance Performed by the Thread/Process Scheduler

The scheduler should ensure that (1) initially the caller-protect 021 points to the stop of the allocated stack memory and (2) the stack-limit 022 points just off the low end of allocated stack memory (one word less than the lowest address of the allocated stack). Further, whenever a thread/process is suspended these registers should be saved and when resumed they should be restored, as is usual with other registers; we envision that to do this such a scheduler would need access to code having the danger bit 065 as writing these registers is a dangerous operation.

C. Enumeration of the Benefits Provided by this System

Note that Hard Object provides hardware mechanisms that module authors can use to protect their modules; however these mechanisms will only protect the module if used correctly; module authors are expected to cooperate in the protection of their own modules.

A software engineer may partition software into modules which may not interfere with each other's stack or heap data.

A module author may constrain calls from other modules to arrive only (1) at the tops (2) of the public functions of the module, and may do so using only standard function calls (no need to require indirection through jump tables on separate pages). Further call and return sequences cannot be disrupted as the integrity of stack meta-data is ensured.

Using the control bit 066 and target-indicator instructions (see FIG. 20), a module author may also constrain internal control flow. Doing so greatly helps static analysis (ensuring machine-checked partial correctness properties of software).

Using the danger bit 065, an operating system designer may eliminate the need for "kernel crossings" or "system calls", which are at least an order of magnitude slower than function calls. This is safe because we have constrained control flow and stack access using new mechanisms which obviate the traditional prior art mechanism of (1) interrupts, (2) jump tables, and (3) a separate kernel stack.

Below we detail how to use the system to obtain specific benefits.

1. Partitioning Programs into Modules

Programmers follow certain disciplines designed to reduce mistakes, a common one being "modularity"—a software embodiment of locality of causality mentioned above: programs are separated into parts called "modules" where each module has its own data together with code to manage it. Further, to ensure correctness, the module's code is written in such a way as to maintain certain "data invariants": properties of the module data which are always true.

The point of the Hard Object design is to enforce this partitioning of programs into mutually untrusting modules so that they may nevertheless operate together in the same address space without danger to one another. That is, the Hard Object hardware provides sufficient mechanisms to allow software to ensure that one module, M1, may not modify the data of another module, M2, nor may trick module M2 into accepting as its own data that does not satisfy the data invariants of module M2.

We envision that in order to make such module separation complete, additions to both standard hardware and software are required. That is, the Hard Object mechanism provides only basic hardware primitives for use by software. If a guaranteed separation of one module from another as described above is to be achieved at run-time, then we envision that the software of both (1) the programmer's compiler and (2) the operating system and libraries on which the program runs would make use of the Hard Object hardware primitives in rather sophisticated ways. Such sophisticated modifications to the compiler and operating system are more extensive than the hardware primitives provided here and are outside the scope of this document.

It is the practice of most programs, and hence modules, are organized into (a) text (executable program code), (b) heap 010/global data and (c) stack data 020. Below mechanisms are given in turn that allow for protection of each of these parts of a module.

2. Protecting Module Text

In the first embodiment, the Hard Object system uses the standard prior art partition of all virtual pages into either text (code) or data pages. One configuration/embodiment by which this can be accomplished is to have the trusted system linker-loader clear the prior art WRITE bit 053 in the PTE on text pages before making such pages visible to user-mode code; one result of such a configuration/embodiment is that only data pages can be written by user processes. This prior art feature is current practice in some architectures and not an innovation herein of Hard Object; we re-state it for completeness. Note that the Hard Object system does not require use of this method as Hard Object has its own text bit 062 which can be used to denote a page as a text (code) page independent of other prior art PTE bits; thus in some cases the Hard Object system can allow the writing of text pages; see alternative embodiment 2. Write non-controlled text pages.

3. Protecting Module Heap and Global Data

Modules have heap and global state that should to be protected from access by other modules; see FIG. 1 for an example of an attack by the code of one module on the heap data of another.

To this end the Hard Object design provides for ownership of data addresses by module-ids and for executable program code (text) of the same module to operate on the data at those addresses, as follows. In the first embodiment, each virtual page is annotated with a module-id called the "owner module-id" 063 of the page; see FIGS. 6 and 10*a*. Text on pages having the same owner module-id can manipulate data on pages having the same owner module-id: that is, (in user mode) when an instruction attempts to access data on a page, the access is allowed if and only if the owner module-id of the page holding the instruction is the same as the owner module-id of the page holding the data 072 (unless that data is on the stack; see below); see FIGS. 1 and 7. A module may only store its data on pages that are owned by itself; the author of the module may thereby ensure any "data invariants" of the data on those pages.

In a Hard Object system, ownership of a data page may be changed or "transferred" from one module to another by setting the page owner field. The process of changing ownership is an operation that may be accomplished through an operation the execution of one or more processor instructions, such as a set-owner-module-id( ) 120 operation; see FIGS. 8 and 12*a*. When initiated in kernel mode, this operation may change ownership of any page without restriction 081. When initiated in any mode other than kernel mode (e.g. user-mode), only code on a text page having the same owner module-id as a data page may 082 change the ownership of that data page.

Consider the scenario where code in module M1 writes to a data page D and then transfers the ownership to module M2. We envision that Module M2 needs a way to recognize that it is a new owner of page D which may contain data that does not satisfy the invariants that M2 requires of its data. The Hard Object system provides a bit for this purpose in the form of the "integrity" bit 064 of page D (see FIGS. 6 and 10*a*), as follows. When ownership is transferred, the integrity bit is cleared to false 084 by the Hard Object hardware and may only be set to true again 094 by the new owner M2, using, say, a set-integrity( ) 122 operation; see FIGS. 8, 9, and 12*a*. Presumably M2 would only do this after it has inspected the page D and verified that the data invariants of M2 hold of the page D. The code of the new owner M2 can always choose to ignore the integrity bit if M2 does not maintain any special invariants on its data.

4. Protecting Module Stack Data

Module functions have temporary stack data that should be protected as well. For modules to interact efficiently, a caller function (example 024) of one module should be allowed to call a callee function of another module that it does not trust (example 025). The stack data of the caller function will remain on the stack while the callee function runs and therefore we envision that the caller stack data needs to be protected from the callee; see FIG. 2 for an example of an attack by one function on the stack data of another.

To provide stack protection, we envision using two user-mode registers that delimit the currently accessible part of the program stack (for one thread) as follows (see FIGS. 11 and 22):

(1) a "caller-protect" register 021 that points to the top of the current stack frame and changes with each function call and return, and (2) a "stack-limit" register 022 that points to the maximum allowed extent of the stack.

Note that the stack-limit register 022 is not the commonly-known prior art "stack pointer" 226 which points to the bottom of the current function's stack frame (example 023). Note also that the caller-protect 021 is not the commonly known frame-pointer register 225; in some prior art designs, the frame-pointer may point to the top of the current stack temporaries 224, below the function arguments (single argument 223), whereas the caller-protect always points to the top of the function arguments. See FIG. 22.

The Hard Object system also adds to the typical instruction set instructions to set 124 126 and get 125 127 these novel registers; see FIG. 12*a*.

The temporary stack variables of all functions reside on the stack, and so the owner of the stack pages should be a special "nobody" module-id 370, indicating ownership by no user-mode module. However we envision that the current function needs to be able to access the stack. Therefore we consider the caller-protect register 021 and the stack-limit register 022 to be delimiting an "accessible stack range" 023 where the current function may always access 073 the data located at data addresses within the accessible stack range. Specifically, as shown in FIG. 7, a (user mode) data access instruction is allowed (a) 072 if the owner module-id of the page holding the accessing instruction matches the owner module-id of the page holding the target address
OR (b) 073 if the target address is within the values of the two stack-delimiting registers: caller-protect (inclusive) and stack-limit (exclusive).

That is, these stack-delimiting registers provide an accessible stack range 023 of addresses that a function may access in addition to the heap pages that are owned by the function's module, namely the function's own stack temporaries and arguments.

5. Constraining Cross-Module Control Flow

When a module author writes a module, the author can only ensure correct operation of the module if control flow is constrained to enter only a the tops of functions which are expecting external calls, namely distinguished public functions. Therefore we provide a mechanism where, in cooperation with the trusted system linker-loader, this constraint can be assured for all kinds of function calls, both static and dynamic. For static calls, the linker-loader checks that cross module calls only go to designated public functions. For dynamic calls, the module can place a target-pub instruction 200 only at the top of public functions. See FIGS. 20, 23, 24, and 27.

6. Constraining Internal-Module Control Flow

An operating system may wish to ensure some additional properties of a module before running the module; one way for an operating system to do this is to use a combination of static and dynamic analysis.

Static analysis is greatly aided by the ability to constrain the control flow of the module; while static control flow transfer is easily checked by examining the code, dynamic control flow cannot be easily predicted by a static analysis. Therefore we provide a means to constrain the internal control flow by (1) setting the control bit 066 (see FIGS. 6 and 10*a*) in the PTE of text pages of the module, requiring dynamic control transfers to those pages to land only on designated instruction addresses and then (2) providing an way to designate those instruction addresses where internal control flow may land: (a) a target-priv instruction 201 to mark allowed targets of internal dynamic calls (the target-pub instruction 200 is also allowed as a target for internal dynamic calls) and (b) a target-j ump instruction 202 to mark allowed targets of internal jumps and branches (non-call control transfers). See FIGS. 20, 23, 24, and 27.

We envision that in order to further constrain the behavior of the program, dynamic checks (to be performed at run-time) can be (1) required by the linker-loader to have been inserted by the module author (or the author's compiler) or (2) inserted into the program by the analysis. As control flow has been constrained, the program cannot avoid these checks by jumping over them.

7. Empowering Some Pages as Kernel Pages

The experience of software engineers is that, in order to maintain a system, some software needs to have unconstrained "super" power. This software is usually called the kernel.

In prior art systems, distinction between user and kernel is a mode on the CPU, perhaps implemented as a bit in a CPU status register. In such systems, switching the CPU from user to kernel mode requires hardware intervention to simultaneously switch the CPU mode and transfer control to trusted kernel code. Despite attempts at optimizing this process, it tends to require at least an order of magnitude more time than a standard function call.

We instead attach kernel mode to a text (code) page using a danger bit 065 (see FIG. 10*a*) annotation on the Hard Object meta-data 061 of the page: the CPU is in kernel mode whenever the program counter 250 is on such a page, and in user mode when the program counter is not on such a page. As we have also provided a means for constraining control flow, and protecting heap and stack data, kernel services can be provided as Hard Object modules and accessed from user mode code by a relatively cheaper standard function call.

8. Illustrating Hard Object in Action

The active operation of the present Hard Object protection mechanisms in action is further illustrated in the following scenarios, accompanied by figures.

FIG. 1 shows the heap protection feature preventing the function evil( ) 017 from violating the integrity of an object of class A 012. On the left is some heap data 010 and on the right some text 011 addresses. Text and heap data of the same module share the same owner module-id field 063 that owns that heap page; note that there can be more than one software object per page (owned by the same owner) as all objects of one class are owned by the same class (module) code, however this amount of generality is not shown in the diagram. The double-headed dashed line indicates a failed access by a function 017 to a heap page 012 that it does not own. The access fails because the owner module-id annotating the text page holding the address of the instruction attempting the access does not match the owner module-id of the data page holding the address of the data address that the access targets.

Another more subtle kind of attack can be made by module M1 on module M2 as follows. Module M1 creates a heap data 010 page D that is subtly corrupt and if M2 were to treat this page as its own then M2 might do something self-destructive. More precisely M1 creates a heap data page that does not adhere to all of the data invariants of module M2. M1 then calls set-owner-module-id 120 on D, transferring ownership of D to M2; however notice in FIG. 8 that at the same time set-owner-module-id also clears 084 the integrity bit 064 on D to zero. M1 then calls a function M2::f( ) in M2 asking module M2 to perform an operation on the data on page D. If M2 were to do this something undesired by the author of module M2 might happen. However the author of M2 has inserted code at the top of function M2::f( ) to call get-integrity 123 (or the optimized version branch-on-integrity-false 128 in FIG. 12*b*; see below) on page D and detects that the integrity bit 064 is zero and therefore refuses to operate on this data, thereby avoiding the attack. In order for module M2 to make use of a heap page having a clear integrity bit, module M2 may want to check that this page satisfies the invariants of module M2 and then after doing so, set the integrity bit on that page using the set-integrity 122 operation; see FIG. 9.

Figure 2:
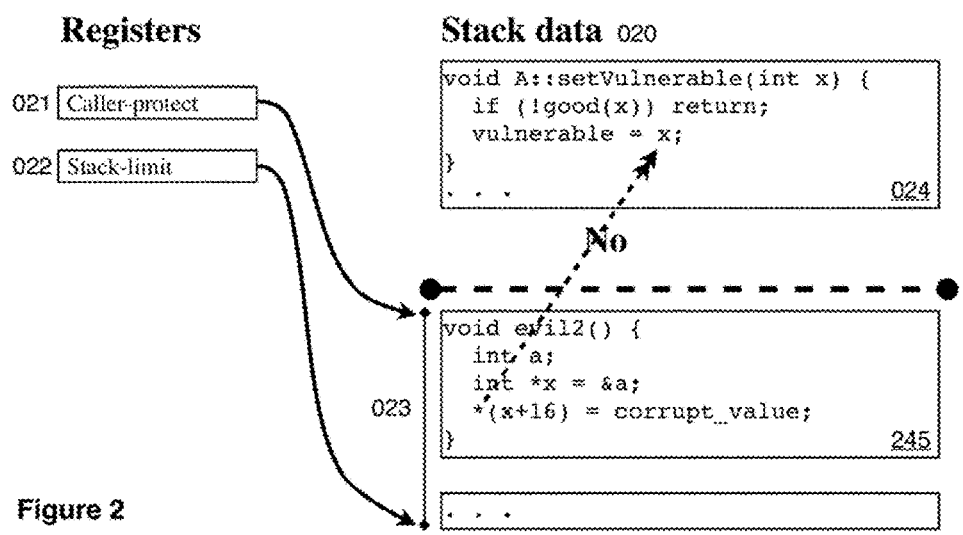
FIG. 2 shows the Hard Object stack protection feature in action.

FIG. 2 shows the stack protection feature preventing the function evil2( ) (stack frame of which at 025) from violating the integrity of the stack frame of function A::setVulnerable( ) 024. On the left we see some CPU registers 021 022 and on the right some stack data 020. The caller-protect 021 and stack-limit 022 registers delimit the currently accessible range 023 of the stack. In this scenario the stack frame of function A::setVulnerable( ) is still on the stack, due to A::setVulnerable( ) having delegated control to function good( ) which has further delegated control to other functions, eventually delegating control to function evil2( ). The double-headed dashed line indicates a failed access by the function evil2( ) to the stack frame of A::setVulnerable( ) 024. The access fails because it targets an address not in the currently accessible range 023 of the stack.

Enhancements and Alternatives

The mechanisms of the first embodiment can be enhanced to provide more functionality or better performance, as follows. (Note that, when we think it is more clear to do so, we sometimes refer to an alternative embodiment as an "option" on an embodiment when it may be used additionally with that embodiment; to indicate this we may say "(or) optionally".)

1. Branch-on-Integrity-False Instruction 128

Since the integrity bit 064 will be checked often and since there is only a single bit of meta-data to check, one embodiment implements an optimization for the common use of the get-integrity instruction 123 as a single operation to be used instead of the typical sequence of a register load followed by a test and then a branch:

branch-on-integrity-false (Address x, Address jumpTo) 128.

A complementary operation be useful as well, as follows:

branch-on-integrity-true (Address x, Address jumpTo) 129.

See FIG. 12*b*.

2. Write Non-Controlled Text Pages

It may be useful to allow the prior art technique called "self-modifying code" where a program may write its own text pages. However, note that the control flag annotated onto text indicates that the trusted system linker-loader has examined the text page and ensured certain properties of it, and therefore if we allowed writing of controlled pages, the invariants originally ensured by the trusted system linker-loader could be violated.

Figure 41:
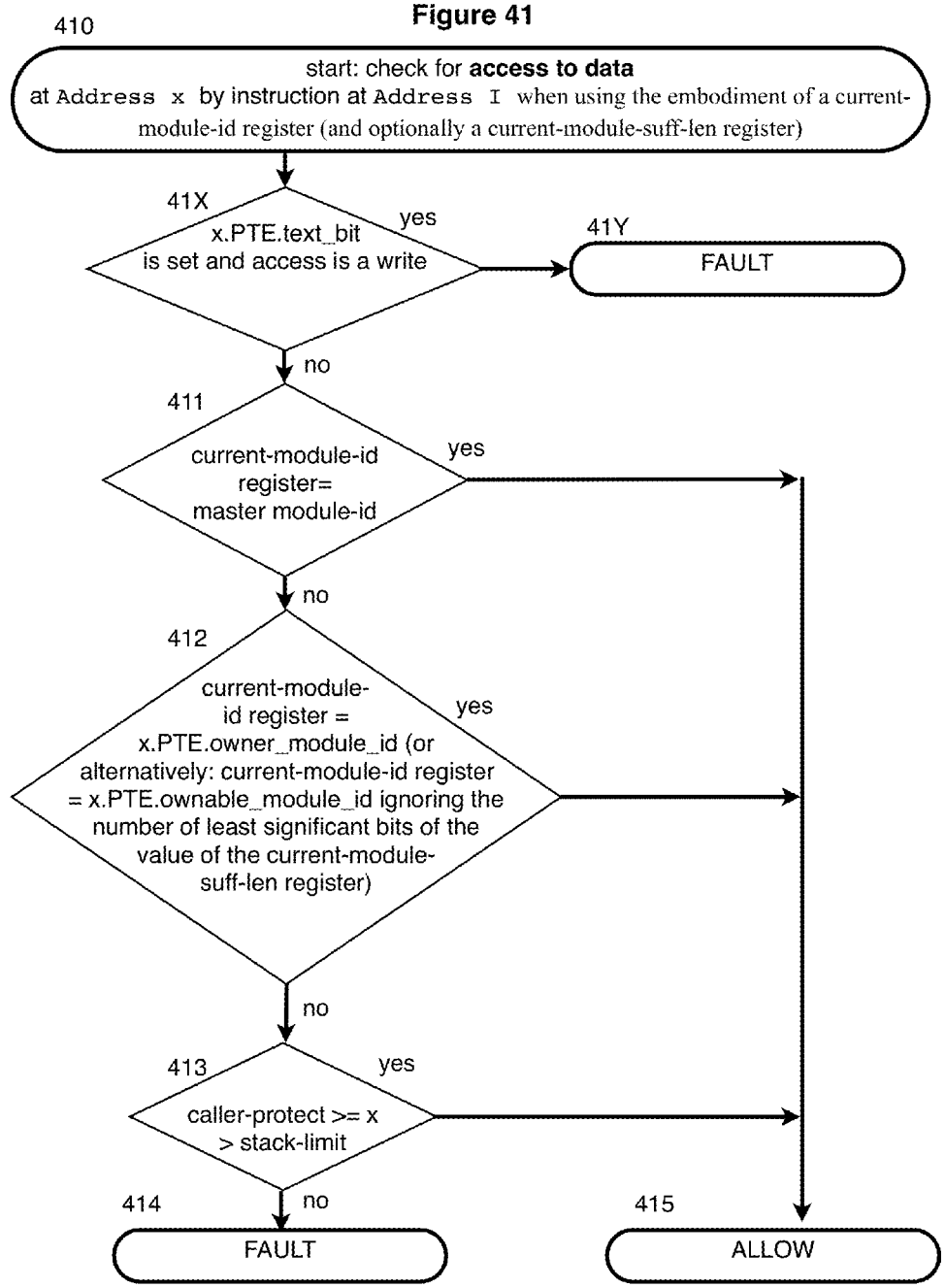
FIG. 41 shows a flow chart for the check for access to data at Address x by instruction at Address I when using the embodiment of a current-module-id register (and optionally a current-module-suff-len register) from the alternative embodiment 8.2 Replacing the kernel mode bit with a master module-id.

Therefore, we allow write access from an instruction at instruction address I to a target x on a text page if (1) the owner module-id annotated onto I is the same as the owner module-id annotated onto x and (2) the address of target x is not annotated with the control bit 066 (or control-danger bit 380). To do this we change the following tests/checks in the following figures to instead be the test in the preceding sentence: 07X in FIG. 7, 40X in FIGS. 40, and 41X in FIG. 41.

3. Public-Readable Bit 100

For a module M2 to allow another module M1 to read some of M2's heap or global data is usually much less dangerous than allowing M1 to write the same data addresses. It is also common for one module author to wish to allow other modules to do this. However the ownership mechanisms outlined so far only allow both reading and writing, or neither. One solution is for M2 to have a function that simply reads the data at a given address and returns its value to the caller (by copying the value onto the stack); call such a function an "accessor function". Forcing M1 to expend the overhead of a function call to an accessor function simply to read the data of M2 when the author of M2 does not wish to keep the data private is an unfortunate inefficiency.

To alleviate this problem, an extension of Hard Object provides an additional meta-data field called the "public-readable" bit 100; see FIG. 10*b*. The semantics are that any read access to such a page is allowed, while write accesses would still be prohibited unless they first pass the usual Hard Object tests. This extension also provides user-mode instructions set-public-readable (Address x, Bit newPublicReadable) 12A and

Bit get-public-readable(Address x) 12B, see FIG. 12*c*. These set-public-readable instruction should only function when the CPU is in kernel mode or when the owner module-id annotating the program counter equals owner module-id annotating address x.

3b. Multiple Sub-Module Classes Per Module; Owner/Ownable Separation

In this embodiment we separate the notion of a module-id on a data object/page being owned from the notion of a module-id on a text/code page that owns the object/page; the former we will call an "ownable module-id" 391 (and the latter we already call an owner module-id 063); see FIG. 39b.

We want the text/code of a module, having one owner module-id 063, to have access to multiple kinds of data objects/pages, each having different ownable module-id-s. To get this effect, we create a "owner module-suff-len" (for "suffix length") field 390 (see FIG. 39a); this field contains enough bits to count from 0 to the length of an owner module-id (for example, for a 15-bit owner module-id we would need 4 bits in the owner module-suff-len to count from 0 to 15 (inclusive, inclusive)). An (owner) module-suff-len 390 is paired with each (owner) module-id wherever an (owner) module-id occurs throughout the Hard Object design, such as (1) we create an owner module-suff-len 390 in the Page Table Entry paired with the owner module-id PTE field 063 and (2) if this embodiment is combined with the embodiment of Section 8.2 below, we create a current-module-suff-len register 111 paired with the current-module-id register 110 described there (see FIG. 11b).

Note that throughout the Hard Object design, (1) when we check if an instruction has access to data, we are checking if an (owner) module-id 063 matches a ownable module-id 391 and (2) (recall from the above that) the (owner) module-id will always be paired with a parallel (owner) module-suff-len in any context. We change the semantics of the match check of the first sentence to now work as follows: when the (owner) module-id is checked 402 for equality with the (ownable) module-id 391, (1) compute the bitwise exclusive-or (also known as "exclusive-or", "bitwise xor", "xor", or "symmetric difference") of the owner module-id 402 and the ownable module-id 391, then (2) if the bitwise exclusive-or is zero, ignoring the suffix having the length (in bits) of the value of the owner module-suff-len, then the result of the test for equality is affirmative; another way to say this is when the (owner) module-id is checked 402 for equality with the (ownable) module-id 391, we ignore the number of least significant bits of the value of the owner module-suff-len; see FIGS. 39c and 40. FIG. 39c shows an example of two strings of bits being compared while ignoring the 3 least significant bits: first the bitwise exclusive-or of the two values is computed, then that bitwise exclusive-or is compared to 0 while the suffix of length 3 (the 3 least significant bits) are ignored; note that in FIG. 39c the example shown tests in the affirmative, even though the 3 least significant bits of the bitwise exclusive-or are not 0, due to those 3 least significant bits being ignored. Note that for ease of presentation here we give a mechanism for testing for equality of two bit strings that computes the bitwise exclusive-or as an intermediate step, however any mechanism that tests for equality while ignoring the suffix of the required length, that is, any method of testing for equality which computes the same abstract function, would work as well; for example, another way to compute the same function is to first zero the suffixes of the two bit strings being compared and then simply test the results for equality using any bit string equality test.

This comparison mechanism may be viewed as follows. Note that we may consider a string of N bits a leaf of the rooted full binary tree of height N and we may consider the bits in the string as denoting a path from the root to this leaf (to get the usual ordering of strings, at any branch 0 meaning to go left and 1 meaning to go right). In this context, the pair of (a) an owner-module-id and (b) an owner-module-suff-len denote (a) a path from the root to a leaf and (b) a distance to go up that path from the leaf which determines a unique an internal node in the tree. Note that from the matching semantics described above (where during an access check comparison between an owner-module-id and an ownable-module-id we ignore the number of least significant bits given by the value of the owner-module-suff-len (FIG. 39c)) this internal node of the binary tree will compare in the affirmative as matching ("owning") exactly the leaves in the binary sub-tree descended from this internal node.

Note that, as some of the (least-significant) bits of the ownable module-id 391 annotated onto a data object are no longer used for access checks, these bits are now freed up to be used for internal purposes by its module's text/code as an internal "class ID".

4. Flexible Number of Bits in the Target-Tag

The size of a page can vary. On 32-bit systems pages are typically 4K bytes but there can be "jumbo" pages of 4 M bytes. On 64-bit systems pages are typically 4K bytes but there can be "jumbo" pages of 2 M bytes and "super-jumbo" pages of 1G bytes. Other page sizes are possible.

The number of addressable locations on a page is the page size divided by the addressability granularity. Some machines are addressable at the byte granularity, so the number of addressable locations is the same as the page size in bytes. Some machines are addressable at the word granularity, which is typically 32-bites (4 bytes) or 64-bits (8 bytes).

In the above scheme of the first embodiment the number of bits in target-tag 067 is just log_2 (number of addressable locations)

because in the worst case each addressable location has a unique combination of bytes (possibly an accidental combination of unaligned parts of instructions and data) and therefore we envision that we need a sufficient number of bits to generate a number of combinations of one more than that so that a unique target-tag for that page, one unlike any of those at any other addressable location, can always be found.

> However the whole point of the target-tag and the argument to the target-indicator instructions (see FIG. 20) is to be unique on the page. Perhaps someone could use fewer bits that the number we specify if they somehow knew for other reasons that fewer bits would be needed to sufficiently constrain the viable set of jump targets. For example, this could be made possible by adding additional requirements that, say, dynamic transfers only land on word boundaries, such as is done with Google's Native Client. Other techniques are possible.

5. Alternative Mechanism for Enforcing Constraints on Dynamic Control Transfer

An alternative mechanism for constraining control transfer without using just-transferred-control CPU status bits is to have the control transfer instruction check for itself that transferring to its target is allowed (see FIGS. 29 and 30). Just before a dynamic control transfer instruction transfers control to a target instruction address, the control transfer instruction checks if the instruction at the target instruction address satisfies our control transfer criterion, that is, the target instruction (1) is a target-indicator instruction of the correct kind and (2) has an argument matching the target-tag field of the page holding the target address. This check considers the following variables:

(A) the kind of transfer (call vs jump/branch),
(B) the locality of transfer (internal vs cross-module), and
(C) the value of the control bit of the target address.

The specifics of part (1) of the check above are a function of the kind of control transfer. (Recall that a control transfer is internal if the owner module-id of the control-transfer instruction equals the owner module-id of the target instruction and is cross-module otherwise.)

(a) For a dynamic jump or branch 290, if the jump/branch is cross-module 291, then the control-transfer instruction faults 295; see FIG. 29.
(b) For a dynamic jump or branch 290, if the jump/branch is internal 291 and the control bit 066 is set on the target instruction 292, then the target instruction must 293 be a target-jump 202 having an argument matching 294 the target-tag 067 of the page holding the target-jump 202 instruction; otherwise the control transfer instruction faults 296/297; see FIG. 29.
(c) For a dynamic call 300, if the call is cross-module 301, then the target instruction must 302 be a target-pub 200 instruction having an argument matching 303 the target-tag 067 of the page holding the target-pub 200 instruction; otherwise the control-transfer instruction faults 307/309; see FIG. 30.
(d) For a dynamic call 300, if the call is internal 301 and the control bit 066 is set 304 on the target instruction, then the target instruction must 305/302 be a target-priv 201 or a target-pub 200 having an argument matching 306/303 the target-tag 067 of the page holding the target-priv 201 or target-pub 200 instruction; otherwise the control-transfer instruction faults 307/308/309; see FIG. 30.

6. Use Dynamic Enforcement Mechanisms for Static Enforcement as Well

Recall that, in the first embodiment and the above alternative embodiment, the target-indicator (see FIG. 20)/target-tag 067 mechanism only constrains dynamic jumps, branches, and calls, that is, those that take a target argument that is computed at runtime. The targets of static jumps, branches, and calls, those that take a static target argument (one not computed dynamically at runtime), can be examined by the runtime linker-loader at program load time (when the linker-loader loads the program into memory and prepares it to be run). Thus no further mechanism is required in order to constrain function calls to only go to the top of public functions.

However an alternative embodiment for constraining static control transfers is to modify the mechanism for static control transfer instructions to be constrained in a manner parallel to that which constrains dynamic control transfers, as follows.

(1) Create a CPU status bit "just-made-static-transfer" which is set when a static control transfer is made and cleared when a dynamic control transfer is made.
(2) Add an argument to each target-indicator instruction which says if arriving control transfers are allowed to be (a) only static, (b) only dynamic, or (c) either static or dynamic. The target-indicator instruction can enforce this.

7. Alternative Mechanism for Enforcing Danger Bit

An alternative method of constraining the operation of dangerous instructions without using a special CPU mode bit, such as kernel mode, is to modify dangerous instructions to check for themselves that the program counter points into a page having the danger bit and fault if it does not. That is, when a dangerous instruction operates, first it examines 286 the danger bit 065 annotated on the page of the current value of the program counter 250; if the danger bit is clear, the dangerous instruction faults 287; if the danger bit is set, the dangerous instruction continues to operate as usual 288. (Even though the mode is now of the instruction instead of the CPU, in this alternative the danger bit continues to function as a "mode meta-datum" by associating a mode with the instruction it annotates.) See FIG. 28b.

Note that, unlike prior art systems or the first embodiment, in this alternative embodiment there is no explicit need for a kernel mode bit in the CPU status register.

8. An Intermediate Danger Mode Between User and Kernel Mode

Kernel mode is very dangerous as there are no safety protections provided by the hardware. In prior art systems, a large program called the kernel runs entirely in kernel mode. In the first embodiment, (1) we eliminated the need for a special expensive system call transition from user mode to kernel mode and (2) we further allowed pages that normally run in the kernel program but do not need special kernel powers to give up those powers by providing kernel powers only at the page granularity.

In this alternative embodiment, we allow even more of the kernel program to give up kernel powers by allowing only the few instructions that use the kernel powers to request them, use them, and then release them, providing full kernel powers at the instruction granularity. Such a narrowing of the extent of code having kernel powers greatly helps software engineers attempting to analyze the correctness of such software using static analysis.

Recall that, in the first embodiment, the kernel mode bit in the CPU status register is set exactly when the program counter 250 points to a text page having the danger bit set 065. In this alternative embodiment, (1) we retain the kernel mode bit in the CPU status register; however (2) we no longer automatically set the kernel bit just because the program counter points to a page having the danger bit set; instead (3) in this embodiment we add two new "kernel mode gateway" instructions (or operations) which are used to enter and exit kernel mode; see FIG. 31:

enter-kernel-mode( ) 310,
exit-kernel-mode( ) 311.

(Note that we envision these operations being implemented as single instructions, but other implementations may be possible.)

The enter-kernel-mode( ) instruction only runs on a page having the danger bit set; that is, when the enter-kernel-mode( ) instruction runs at Address I, it checks that I.PTE.danger is set 321; if so, it sets the kernel CPU status bit 322, putting the CPU into kernel mode; if not, it faults 323; see FIG. 32.

The exit-kernel-mode( ) instruction can run under any circumstance and clears 331 the kernel CPU status bit, putting the CPU into user mode; see FIG. 33.

Previously we distinguished instructions (or specific configurations thereof) requiring kernel mode as "dangerous". In this alternative embodiment we separate (a) the notion of a "dangerous subset of instructions" (or configurations thereof) and (b) a "kernel mode subset of instructions" (or configurations thereof), since enter-kernel-mode( ) is a dangerous instruction but not a kernel mode instruction.

Figure 28B:
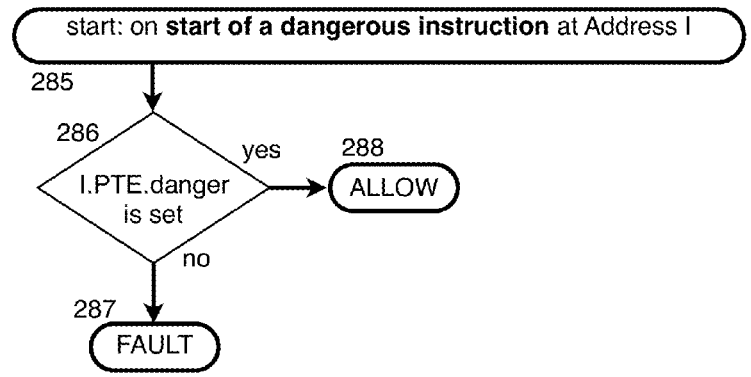
FIG. 28b shows checking done in the alternative embodiment Alternative mechanism for enforcing danger bit by a dangerous instruction.
Figures 34, 35, 36:
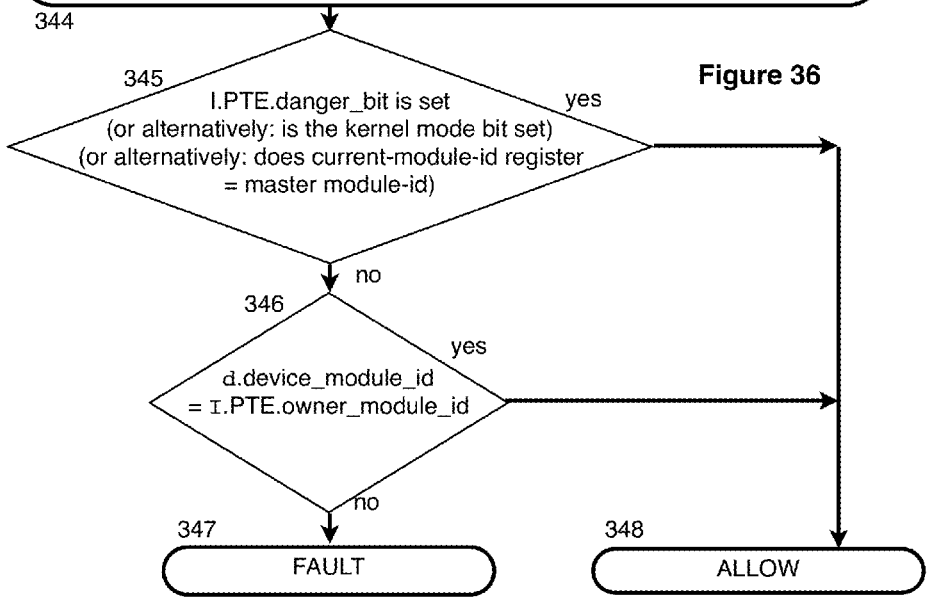
FIG. 34 shows the device owner module-id from the alternative embodiment Constraining access to input/output devices using device owner module-ids.
FIG. 35 shows example annotations of device owner module-ids onto input/output devices from the alternative embodiment Constraining access to input/output devices using device owner module-ids.
FIG. 36 shows a flow chart for the operation of access to input/output device d from address I, from the alternative embodiment Constraining access to input/output devices using device owner module-ids.

In this alternative embodiment, many instruction tests/checks which would previously check if they were annotated with the danger bit now check if the kernel mode bit is set; these include: 071 in FIG. 7, 081 in FIG. 8, 091 in FIG. 9, 286 in FIG. 28b, 345 in FIG. 36, 401 in FIG. 40.

8.1. Unifying the Control Bit 066 and the Danger Bit 065 into a "Control-Danger" Bit 380

This embodiment extends that of Section 8. An intermediate danger mode between user and kernel mode. Here we combine the danger bit 065 and the control bit 066 into one bit which we will call a "control-danger" bit 380 (see FIGS. 38a and 38b): when it is set, the hardware behaves just as if both the control bit 066 and the danger bit 065 (as interpreted by Section 8 immediately above) are both set. In more detail, this means that when the control-danger bit 380 is set:

(1) the page is controlled in that all dynamic control transfers must land on a target-pub 200, target-priv 201, or target-jump 202 instruction as detailed elsewhere (or the hardware faults), and (2) the page has dangerous powers in that the enter-kernel-mode( ) 310 instruction operates (without faulting).

8.2 Replacing the Kernel Mode Bit with a Master Module-Id

This embodiment extends that of Section 8. An intermediate danger mode between user and kernel mode. In this embodiment, we add a current-module-id register 110 (see FIG. 11b).

Figure 28C:
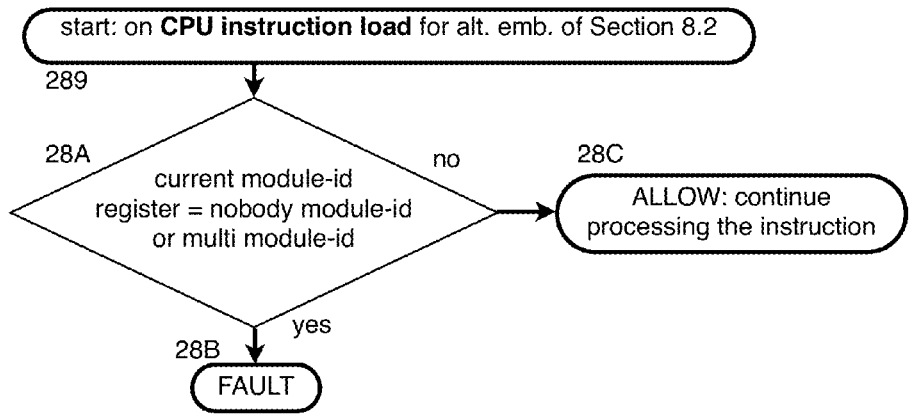
FIG. 28c shows checking of the current module-id register done on instruction load in the alternative embodiment 8.2 Replacing the kernel mode bit with a master module-id.

We change the call and return instructions to maintain this register as follows: (1) upon a successful cross-module call, the call instruction changes the current-module-id register 110 to hold the module-id of the text page containing the target address of the call (step 468 of FIG. 46b or step 464 of FIG. 46a), and (2) upon a successful cross-module return, the return instruction sets the current-module-id register 110 to hold the module-id of the text page holding the return address to which control is returned (step 468 of FIG. 46b). We also change any hardware checks which previously checked against the owner module-id of the text page holding the current instruction to instead check against the value of the current-module-id register 110; for example, during a data access check (step 412 of FIG. 41), or during a dynamic jump/branch (step 451 of FIG. 45), or during a static call (step 467 of FIG. 46b), or during a dynamic call (step 461 of FIG. 46a), or during a return (step 467 of FIG. 46b). (Note that FIGS. 45, 46a, and 46b show only one aspect of these instructions, namely the changes to their functionality introduced here, and elide other aspects already established (such as the instructions actually operating to transfer control, as is the purpose of such instructions); this is done to simplify the figures.) If upon instruction load the current-module-id register is ever the special nobody module-id 370 or the special multi-module-id 372 (see Section 8.3. Multiple modules per text page below), then the CPU faults; see test 28A in FIG. 28c.

(Optionally, if the embodiment of Section 3b. Multiple sub-module classes per module; owner/ownable separation is also used then we also add a current-module-suff-len register 111 (see FIG. 11b). Whenever the current-module-id register 110 is compared for equality to the ownable module-id 391 in a Page Table Entry, we ignore the suffix of their bitwise exclusive-or computed in this comparison where the suffix has the length given in the current-module-suff-len register 111 (that is, the comparison ignores the current-module-suff-len register number of least significant bits) (see FIGS. 39c and 41); such test/checks which perform this kind of comparison include: 072 in FIG. 7, 082 in FIG. 8, 092 in FIG. 9, 346 in FIG. 36, 402 in FIG. 40, 412 in FIG. 41, 514 in FIG. 51.)

In this embodiment, we eliminate the prior art kernel mode bit and instead introduce a special "master" module-id 371 (for example, the number 1 could be used to indicate master, but other numbers could also work); see FIG. 37a.

In this alternative embodiment, dangerous instructions may execute only when the value of the current-module-id register 110 is the special master module-id 371. The CPU checks this property before running a dangerous instruction, faulting if it does not hold (or, alternatively, dangerous instructions can check it themselves, faulting if it does not hold). In this embodiment the following tests/checks in the following figures would be altered to check if the current-module-id register holds the value of the special master module-id: 071 in FIG. 7, 081 in FIG. 8, 091 in FIG. 9, 286 in FIG. 28b, 345 in FIG. 36, 401 in FIG. 40.

We also eliminate the enter-kernel-mode( ) 310/exit-kernel-mode( ) 311 instructions and instead introduce a set-current-module-id (UInt new-module-id) instruction 420; see FIG. 42. The set-current-module-id (UInt new-module-id) instruction 420 takes one argument: new-module-id 421 (a module-id). The set-current-module-id (UInt new-module-id) instruction 420 only operates if the control bit 066 is set (or when used in conjunction with section 8.1 above, when the control-danger bit 380 is set) and otherwise faults; see step 431 in FIG. 43. If it does not fault, the set-current-module-id (UInt new-module-id) instruction 420 operates to change the value of the current-module-id register 110 to that of its UInt new-module-id argument 421; see step 432 in FIG. 43. We also introduce a no-argument restore-current-module-id( ) instruction 422 (see FIG. 42) that sets the current-module-id register 110 to have the value of the owner module-id 063 of the text/code page holding the restore-current-module-id( ) instruction 422, (unless that value is the special multi module-id 372 of Section 8.3. Multiple modules per text page below, in which case fault instead); note that it is safe for the restore-current-module-id( ) instruction 422 to be allowed to execute even without the control bit being set; see FIG. 44.

As an example of the utility of this embodiment, a trusted system linker-loader can use the new instructions to inline function calls across module boundaries by (1) requiring or making the client module controlled (that is: making the module's text pages have the control 066 (or control-danger bit 380) set and arranging for dynamic control transfers to land on target-pub 200, target-priv 201, or target-jump 202 instructions) and then (2) performing standard compiler function inlining and (3) doing a static analysis to ensure that there is no non-standard control flow or data flow into or out of the resulting inlined section and (4) that any dynamic tests needed to ensure module boundaries are inserted into the inlined and surrounding code (as appropriate); (note that such a static analysis is possible due to the ability of the linker-loader to compute a usable over-approximation to the control flow graph on pages that are operating with the control bit 066 set, since uncontrolled dynamic control flow is not possible into such pages (due to the mechanism of the target-pub instruction and the control bit 066)).

Even code that requires kernel powers to do its job sometimes only needs kernel powers for a few of its instructions; further, it is helpful if those instructions that do not need kernel mode powers do not have them in case a mistake is made. Using this embodiment trusted system libraries that in prior art systems need some instructions to have kernel powers (in prior art systems called "the kernel") and therefore in those prior art systems might then execute all of their instructions entirely in kernel mode can instead in this Hard Object embodiment (1) be placed onto on pages having the control 066 (or control-danger 380) bit set and then (2) use the set-current-module-id (UInt new-module-id) instruction 420 to set the value of the current-module-id register 110 to the special master module-id 371, thereby turning on "master powers" (just before executing instructions requiring master powers), and then (3) similarly use the restore-current-module-id( ) instruction 422 to set the value of the current-module-id register 110 back to their previous non-master module-id, thereby turning off "master powers" (just after executing instructions which needed master powers). This idiom is similar to the Un*x utility "sudo" where a single shell command can be temporarily run with super-user powers, obviating the need to turn on super-user powers for an entire shell session (we do not mean to imply that kernel mode is the same as super-user mode; usage of sudo is a metaphor for only temporarily increasing one's power as needed).

8.3. Multiple Modules Per Text Page

This embodiment builds upon that of Section 8.2 Replacing the kernel mode bit with a master module-id above which introduces the current-module-id register 110. In this embodiment we provide a mechanism by which one text/code page can have the text of multiple modules on different parts of the page; that is, the text/code of the page is partitioned into different regions, each of which holds the text/code for exactly one module. (Note that actually partitioning the page between modules is not necessary: there is nothing in the technique of this section to prevent it from being used to create text/code pages containing blocks of code which may be run several module-ids; here we present the technique of this section as if the text/code page were partitioned into modules as doing so simplifies the presentation.)

To do this we create new instructions: "target-pub-multi" 373, "target-priv-multi" 374, "target-jump-multi" 375, which (1) replicate, (2) modify and (3) extend the semantics of target-pub 200, target-priv 201, and target-jump 202, respectively; we also create a "target-return-multi" 376 instruction; see FIGS. 37b and 37c. (We call the target-pub-multi, target-priv-multi, target-jump-multi, and target-return-multi instructions the "target-pub/priv/jump/return-multi" instructions.) We start with an overview and follow with detailed mechanism.

- The target-pub-multi 373, target-priv-multi 374, and target-jump-multi 375 instructions replicate the semantics of the non-multi versions as follows: (1) just as with the non-multi versions, each instruction takes a (first) target-tag argument 203 wide enough (having enough bits) to hold a copy of a PTE target-tag field 067, and (2) just as with the non-multi versions, the target-tag field 067 of the PTE of the containing page must match that of the first argument (above), or the control transfer results in a fault (see step 279 of FIG. 27). Further, similar to their non-multi versions, an internal jump must land on a target-jump-multi 375, an internal call must land on a target-priv-multi 374 or target-pub-multi 373, and a cross-module call must land on a target-pub-multi 373. (See Subsection 10. Modifications to CPU operation in the Section DETAILED DESCRIPTION).

- The target-pub-multi 373, target-priv-multi 374, and target-jump-multi 375 instructions modify the semantics of the non-multi versions as follows: We add a new special "multi" module-id 372 (we suggest using the number −2, but other constants would also work); when a dynamic control transfer (dynamic call, dynamic branch/jump, or any return) targets an instruction address where the owner module-id 063 of the text page is the new special multi module-id 372, then the hardware faults unless the control transfer targets (1) one of the new multi-target instructions introduced in this embodiment (target-pub-multi, target-priv-multi, target-jump-multi, target-return-multi), (2) on a page where the Page Table Entry has the control bit 066 (or control-danger bit 380) set. (Note that this fault does not necessarily happen at the call site, but can happen later, such as in the subsequent instruction, which is the implementation we suggest below.)

- The target-pub-multi 373, target-priv-multi 374, and target-jump-multi 375 instructions extend the semantics of the non-multi versions as follows: these new "multi-" instructions take one (or two) more argument(s): a new-module-id argument 378 (and optionally when this embodiment is used with that of Section 3b. Multiple sub-module classes per module; owner/ownable separation above, a third new-module-suff-len argument 379). When a target-pub-multi instruction executes, it sets the current-module-id register 110 (of section 8.2 above) to the value of this second new-module-id argument 378 (and if there is a third module-suff-len argument 379, also sets the current-module-suff-len register 111 to the value of that third new-module-suff-len argument 379). When a target-priv-multi or target-jump-multi instruction executes it faults if the value of this second new-module-id argument 378 does not equal the value of the current-module-id register 110.

- The target-return-multi instruction 376 operates in a way parallel to the target-pub-multi instruction 373 with the difference being that, where a cross-module target-pub-multi 373 is the required target of a cross-module call under the condition where the owner module-id 063 of the PTE of the target page is the special multi module-id 372, instead a target-return-multi instruction 376 is the required target of a (cross-module or internal) return (which is a dynamic control transfer) occurring under the same condition above.

The above semantics may be realized by the following mechanism.

Figure 48A:
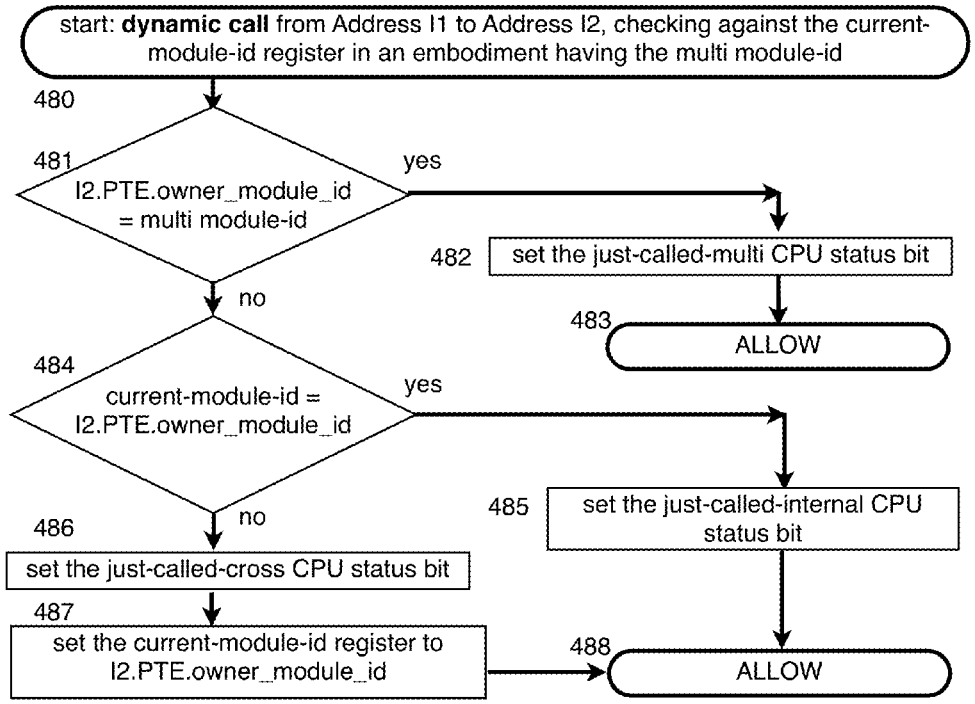
FIG. 48*a* shows a flow chart for checking required for dynamic call instruction(s) from the alternative embodiment 8.3. Multiple modules per text page.
Figure 48B:
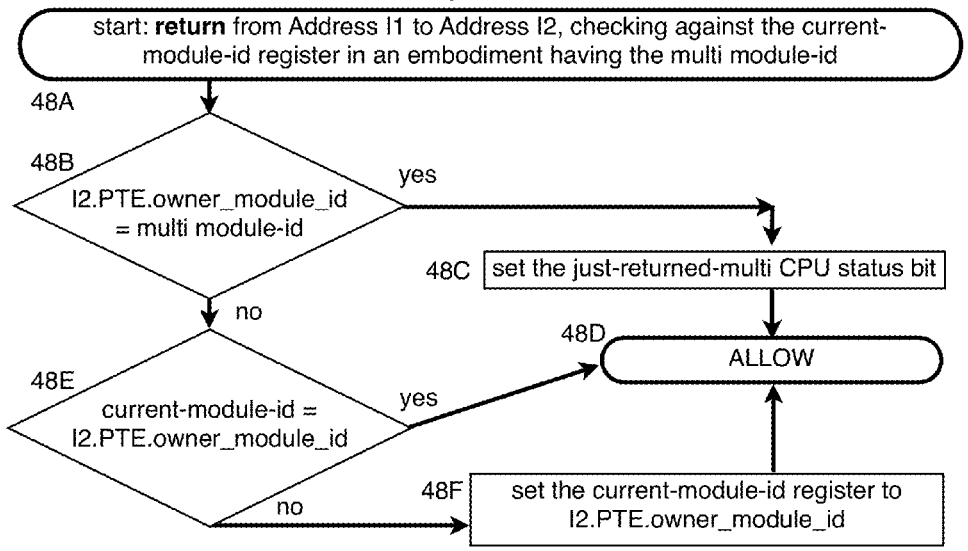
FIG. 48*b* shows a flow chart for checking required for return instruction(s) from the alternative embodiment 8.3. Multiple modules per tert page.

- Create three new CPU status bits called "just-called-multi" 37A, "just-jumped-multi" 37B, and "just-returned-multi" 37C; see FIG. 37d. In the previous embodiment of Section 8.2, a dynamic call instruction checks the owner module-id 063 of the PTE of the target instruction address against the current-module-id register 110 to find out if the call is cross-module (step 461 of FIG. 46a); we modify this behavior so that in the case where the owner module-id 063 of the PTE of the target is the special multi module-id 372 (step 481 of FIG. 48a) then (1) the call instruction does not modify the current-module-id register 110, and (2) (instead) sets the just-called-multi bit 37A (step 482 of FIG. 48a). Similarly, in the case of a dynamic branch/jump when the owner module-id of the PTE of the target is the special multi module-id (step 471 of FIG. 47), then the branch/jump sets the just-jumped-multi bit 37B (step 472 of FIG. 47). Similarly, in the case of a return when the owner module-id of the PTE of the target is the special multi module-id (step 48B of FIG. 48b), then the return sets the just-returned-multi bit 37C (step 48C of FIG. 48b). (Note that FIGS. 47, 48a, and 48b show only one aspect of these instructions, namely the changes to their functionality introduced here, and elide other aspects already established (such as the instructions actually operating to transfer control, as is the purpose of such instructions); this is done to simplify the figures.)

Figure 49:
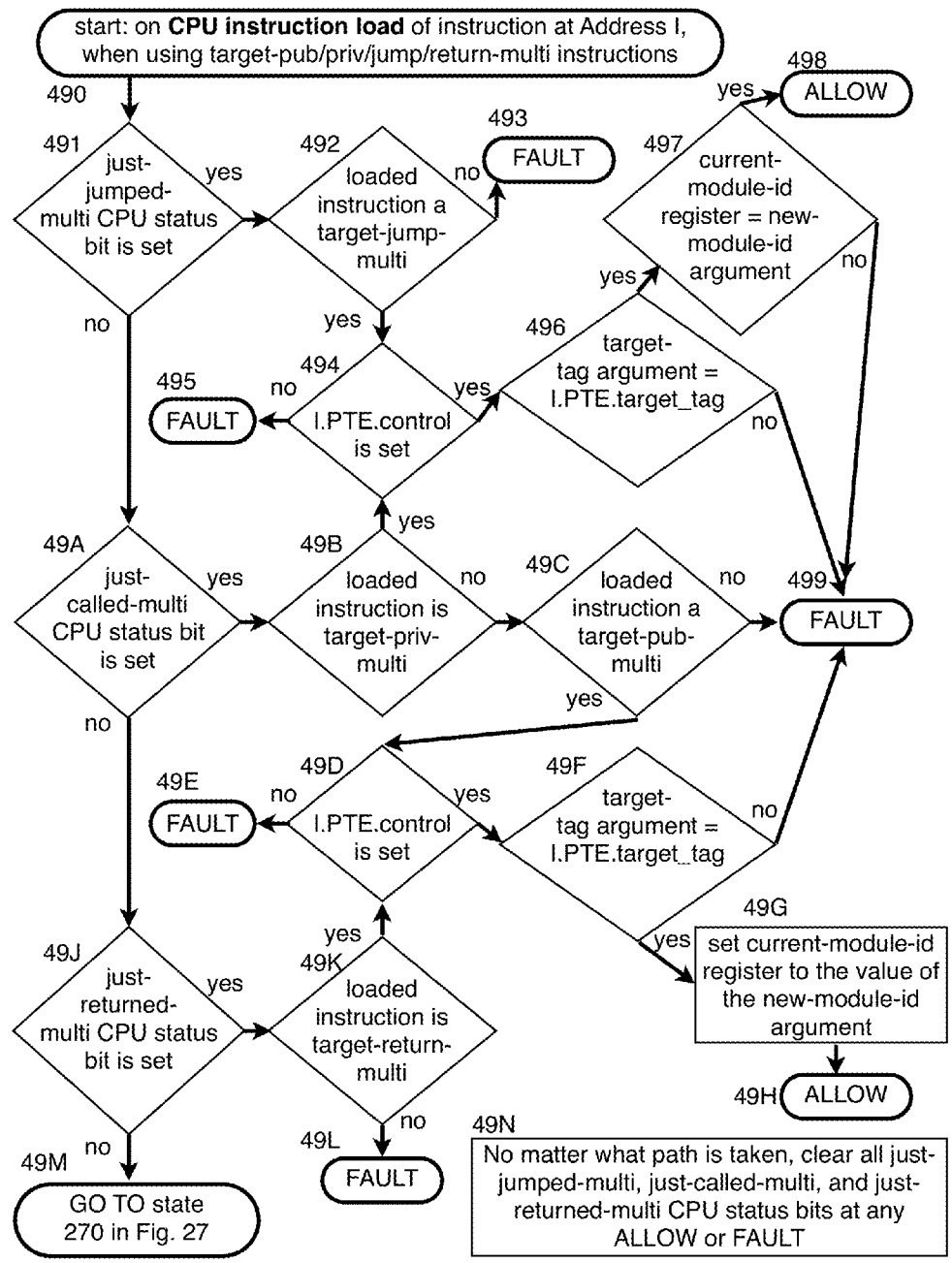
FIG. 49 shows a flow chart for checking required on a CPU instruction load from the alternative embodiment 8.3. Multiple modules per text page.

We also modify the operation of the CPU so that when it starts a cycle we check as follows (see FIG. 49):

(1) If the just-jumped-multi bit is set 491 then: (1a) if the current instruction is not the target-jump-multi instruction 492, then fault; (1b) if the control bit 066 is not set in the PTE entry for the page holding the current instruction 494, then fault; (1c) if the target-tag argument 203 to the current instruction does not equal the target-tag field of the PTE of the page holding the current instruction 496, then fault; (1d) if the current-module-id register does not equal the new-module-id argument 378 to the current instruction, then fault (and, if the embodiment of Section 3b. Multiple sub-module classes per module; owner/ownable separation is also being used, if the current-module-suff-len register 111 does not equal the value of the new-module-suff-len argument 379 to the current instruction, then fault) 497.

(2) If the just-called-multi bit is set 49A and the current instruction is the target-priv-multi instruction 49B, then: (2a) if the control bit 066 is not set in the PTE entry for the page holding the current instruction 494, then fault; (2b) if the target-tag argument 203 to the current instruction does not equal the target-tag field of the PTE of the page holding the current instruction 496, then fault; (2c) if the current-module-id register does not equal the new-module-id argument 378 to the current instruction, then fault (and, if the embodiment of Section 3b. Multiple sub-module classes per module; owner/ownable separation is also being used, if the current-module-suff-len register 111 does not equal the value of the new-module-suff-len argument 379 to the current instruction, then fault) 497.

(3) If the just-called-multi bit is set 49A and the current instruction is the target-pub-multi instruction 49C, then: (3a) if the control bit 066 is not set in the PTE entry for the page holding the current instruction 49D, then fault; (3b) if the target-tag argument 203 to the current instruction does not equal the target-tag field of the PTE of the page holding the current instruction 49F, then fault; (3c) set the current-module-id register 110 to value of the new-module-id argument 378 of the current instruction (and if the embodiment of Section 3b. Multiple sub-module classes per module; owner/ownable separation is also being used, set the current-module-suff-len register 111 to the value of the new-module-suff-len argument 379 to the current instruction) 49G.

(4) If the just-called-multi bit is set and the current instruction is not the target-pub-multi instruction nor the target-priv-multi instruction, then fault.

(5) If the just-returned-multi bit is set 49J, then: (5a) if the current instruction is not the target-return-multi instruction 49K, then fault; (5b) if the control bit 066 is not set in the PTE entry for the page holding the current instruction 49D, then fault; (5c) if the target-tag argument 203 to the current instruction does not equal the target-tag field of the PTE of the page holding the current instruction 49F, then fault; (5d) set the current-module-id register 110 to value of the new-module-id argument 378 of the current instruction (and if the embodiment of Section 3b. Multiple sub-module classes per module; owner/ownable separation is also being used, set the current-module-suff-len register 111 to the value of the new-module-suff-len argument 379 to the current instruction) 49G.

No matter which case is taken above, clear any just-called-multi bit 37A, just-jumped-multi bit 37B, or just-returned-multi bit 37C in the CPU status 49N.

If the just-called-multi bit 37A, the just-jumped-multi bit 37B, and the just-returned-multi bit 37C are all not set, then we proceed as in Section DETAILED DESCRIPTION, 10. Modifications to CPU operation, Handling just-transferred-control status bits 49M (see FIG. 27).

Note that we could modify the multi-target-pub, multi-target-priv, multi-target-jump instructions to operate exactly as their non-multi versions when on text pages where the owner module-id is not the special multi module-id; explicit separate non-multi versions of these instructions would then not be required.

Using these multi-target instructions, we may partition a text page into subsets of instructions for use by multiple modules and, together with the control 066 (or control-danger 380) bit, force updating the current-module-id register 110 (and current-module-suff-len register 111) as control is transferred into and out of or within the page, thereby reducing the memory fragmentation that would otherwise have resulted from modules that have small amounts of text each taking up an entire page.

8.4. Reading Text Pages in the Presence of Multiple Modules Per Text Page

This embodiment extends that of Section 8.3. Multiple modules per text page above. In the first embodiment, the text (code) of a module may only read text a page having the owner module-id 063 of its own module (note: here we are not speaking of the usual concern of instructions reading data pages, but of the perhaps more unusual concern of instructions reading text pages, such as if constants are embedded there); see test 072 of FIG. 7. If the embodiment of Section 8.2 is used, then this access is checked by checking the current-module-id register 110 against the owner module-id 063 in the PTE of the target text page; see test 412 of FIG. 41. However if the embodiment of Section 8.3 above is used, where the text/code of multiple modules may occur on the same page, then for a text page owned by the multi module-id, the PTE does not contain enough information to determine what module the target address is in. Note that, because no instruction may run with the current-module-id register set to the special multi module-id 372 (the CPU would fault on instruction load; see FIG. 28c), a Hard Object read instruction faults if it attempts to read from (a) a text page that also (b) has the special multi module-id as the value of the owner module-id in the PTE. (In detail: (1) the value of the current module-id register cannot be the special multi module-id 372 (as above, the CPU would fault on instruction load) and (2) by assumption the special multi module-id is annotated onto the target (text/instruction address) of the read, therefore (3) these two will not match during the access check 412 of FIG. 41).

In this embodiment, we create a new kind of read instruction: read-if-multi-text 550 (see FIGS. 50 and 51). This instruction works just as a usual Hard Object read instruction, except that the read-if-multi-text instruction (1) faults unless it is run from a controlled page (FIG. 51 step 511) and (2) may read when the target is (a) a text page (FIG. 51 step 515) that also (b) has the special multi module-id 372 as the value of the owner module-id 063 in the PTE (FIG. 51 step 516).

Note that, as the read-if-multi-text instruction 550 only operates on controlled pages, the trusted system linker-loader always has the opportunity to check for the read-if-multi-text instruction and can always refuse to load a text page if it cannot prove that read-if-multi-text instructions contained therein should be allowed. By introducing this special read-if-multi-text instruction distinct from the standard read instruction we make the checks (static analysis) that the linker-loader must do easier for it to perform, as the linker-loader can always simply categorically refuse to load a module having read-if-multi-text instructions if the required checks are too difficult for it to perform.

9. Constraining Access to Input/Output Devices Using Device Owner Module-Ids

Prior art systems typically enforce in hardware that access to peripherals on the I/O (input/output) bus be done while the CPU is in kernel mode. This is done to prevent untrusted user programs from interfering with input and output. On such prior art systems, user programs must request the kernel to perform input and output for them; the kernel checks if a request for a particular input or output is allowed by the particular user program making the request. Eliminating the need to have kernel mode to access input or output while still protecting input and output from untrusted programs would reduce the amount of software requiring kernel mode to run.

We do this by annotating each I/O device (also input/output device or input-output device) with a particular "device owner module-id" 340, just as if it were a page of data; see FIGS. 34 and 35. We envision this annotation of device owner module-ids to devices being chosen at hardware construction time and never needing to change, and thus being built-in to the hardware. Similar to addresses, we denote the device owner module-id annotated onto a device d as d.device_owner_module_id.

We check access to this device in a similar way as we check access to data: when an instruction at an instruction address attempts to access the input or output device, the following checking is done by the CPU (or some other part of the hardware); see FIG. 36.

(1) 345 If the instruction is annotated by the danger bit (or if alternative embodiment 8. An intermediate danger mode between user and kernel mode is used then this test is changed to: if the kernel mode bit is set) (or if alternative embodiment 8.2 Replacing the kernel mode bit with a master module-id is used, then this test is changed to: if the current-module-id register=master module-id), ALLOW the access.

(2) 346 If the owner module-id annotating the instruction is the same as the device owner module-id assigned to the device, ALLOW the access 348.

(3) 347 Otherwise, FAULT.

10. Reducing Memory Fragmentation Using Smaller Page Sizes

Some recent architectures, such as those by Intel, now allow for huge pages of up to 2 Gigabytes. Since in a Hard Object system heap pages are allocated to a module at the heap granularity, use of Hard Object with such architectures might result in an inconveniently-large heap region being allocated per module, as even one page would be too large for most modules. An alternative embodiment provides a solution as follows: pages are subdivided into multiple chunks for the purposes of Hard Object annotation and each chunk gets its own Hard Object meta-data in the page table entry. The cost of this design would be offset by the fewer number of page table entries used when such large pages are used span the same amount of memory.

11. Hybrid Design with Mondriaan Using Only Hard Object Meta-Data

Mondriaan Memory Protection [W-2004] is a memory protection technique that can be easily seen as comprising several separate parts as follows; see FIG. 13a.

(M1) A "permissions table" mechanism for associating meta-data (here Mondriaan permission values) 131 with addresses at the word-granularity (M2) Multiple tables 133, one per "protection domain", and (M3) Meta-data encoding read, write, and execute permissions 135 and rules enforced in the MMU to allow read/write/execute operations to the addresses when the associated permissions allow it.

An alternative embodiment of Hard Object comprises the following parts; see FIG. 13b.

(H1) A single instance of the permissions table mechanism of (M1) above, which annotates addresses with meta-data.

(H2) The Hard Object meta-data 061 (which in the first Hard Object embodiment is contained in the PTE-fields) instead of the Mondriaan read/write/execute bits.

This permissions table mechanism has been repurposed to annotate addresses with Hard Object meta-data 061 (multiple instances in a table being 136), we call it a "meta-data table" 138. This embodiment does not use the Mondriaan mechanisms (M2) and (M3) above. This embodiment also does not use the Mondriaan Protection Domain ID register, as this embodiment uses only one meta-data table 138.

Hard Object rules are enforced 038 by the instructions or the CPU or the Memory Management Unit as follows.

(a) When an access to data at a target address is requested by the CPU 031, the MMU gets the Hard Object meta-data 061 associated with that address using the meta-data table 138 (or the cache 137), which again is just the repurposed Mondriaan Memory Protection permissions table mechanism.

(b) As that meta-data is Hard Object meta-data 061, and the Hard Object data access rules are enforced 038 in the MMU as in the first Hard Object embodiment previously described.

That is, in this embodiment, the (above, (b)) Hard Object style data protections are provided as in the first embodiment, but at the (above, (a)) word-granularity instead of the page-granularity. The cost to provide this extension to Hard Object is the implementation of one instance of the Mondriaan permissions table mechanism.

On an attempted access to data by an instruction both the prior art Mondriaan design and this Hard Object embodiment use two inputs to compute the associated permissions that allow or deny the access: (1) the target address and (2) one other parameter (as follows): in this Hard Object embodiment this other parameter is simply the address of the instruction attempting the access, whereas in the Mondriaan design this other parameter is the value of a special-purpose Protection Domain ID register 130. An important difference is that in the Hard Object design, changes in the program counter require no special management as they happen naturally as part of the computation process, whereas the Mondriaan design suffers from additional complexity as a consequence of the need to explicitly manage this Protection Domain ID register.

This Hard Object embodiment presents an improvement and simplification of the Mondriaan design: This embodiment uses one single Mondriaan-style permissions-table-like mechanism (the Hard Object meta-data table 138) to associate meta-data to memory addresses (and thus the Mondriaan mechanism for associating different meta-data to memory addresses per a separate protection domain ID is dropped). The semantics of the Hard Object meta-data and rules do not require any changes to any kind of permissions meta-data on a cross-domain call nor any of the other complexity attending the management of a separate protection domain ID. This simplification alleviates one of the biggest complexities of the Mondriaan design while still retaining its ability to annotate addresses with meta-data at the word (rather than page) granularity.

Although the description above contains many specificities, these should not be construed as limiting the scope of the embodiment but as merely providing illustrations of some of the presently envisioned embodiments as there are many ways of associating an integrity bit and owner text to memory addresses in such a way as the basic Hard Object rules may be checked efficiently. Thus the scope of the embodiment should be determined by the appended claims and their legal equivalents, rather than by the examples given.

Glossary of Some Terms access: The movement of data between a CPU register and a RAM cell at an address—a read or a write.

access condition: The conditions under which an access to data at a data address is allowed.

accessible stack range 023: The range of data addresses on the stack that can be accessed; delimited by the caller-protect register (inclusive) and the stack-limit register (exclusive).

accessing instruction: An instruction performing an access to data at a data address.

accessing instruction address: The address of an accessing instruction.

address: The name of a memory cell; the bits that are placed on the memory bus in order for the CPU to access a cell in memory.

annotate: To attach an annotation to something; to associate an annotation with something.

annotation: An association.

argument: A datum passed to an operation which parameterizes the behavior of the operation. Note that arguments occur in multiple contexts, including but not limited to: (1) instructions take arguments, (2) functions take arguments. This is potentially confusing in the situation of a "call" instruction which (1) as an instruction may take an instruction argument, but (2) as an initiator of a function call, where the function may take its own function arguments.

assert (a criterion): to check if a criterion evaluates to true and if not perform some exceptional action, such as issuing a fault.

association: A abstraction indicating a persistent relationship between two things, x and y, where having one thing, x, one may find the other, y. Thing y is said to be "associated with"×"by the association". The terms "relation" and "relationship" are meant to at least encompass, without being limited to, the meaning of the term "relation" as used in the field of Relational Algebra.

bitwise: A function F from two input bits to an output bit applied "bitwise" to two strings of bits means the output is a string of bits and the $i^{th}$ bit of the output is F applied to (1) the $i^{th}$ bit of the first input and (2) the $i^{th}$ bit of the second input.

bitwise exclusive-or (also "bitwise xor" or "bitwise symmetric difference"; also "exclusive-or" or "xor" or "symmetric difference" when it is implied to apply to an entire string of bits and is therefore implied to be bitwise): A function taking two strings as input and producing as output the exclusive-or function applied bitwise: the $i^{th}$ bit of output is the exclusive-or of the $i^{th}$ bit of the first input and the $i^{th}$ bit of the second input.

branch instruction: An instruction which may or may not transfer control depending upon some condition, such as the value of a register. Contrast with "jump instruction", "call instruction" and "return instruction".

call instruction: An instruction which initiates a function call; often takes several actions such as pushing the return address onto the stack and then transferring control to the address of the code of the callee function. Control is usually returned to the instruction in the caller after the call instruction at the completion of the function call by use of the return instruction by the callee. See "return instruction". Contrast with "branch instruction", "jump instruction".

caller-protect register 021: The CPU register pointing to the top of the arguments of the current function; only addresses less than or equal to caller protect and greater than stack-limit are "in frame".

coarse grain: In the context of granularity, larger quanta.

computer: A self-contained device for computing, usually presenting a well-defined interface.

computing an association (or annotation): An abstract association may be realized using many kinds of mechanisms; computing an association is to use some mechanism to get from one side of an association, a given, to the other side, the associated object of the given, that is, the object related to the given by the association. To realize a declarative association using an imperative mechanism.

condition: A mathematical predicate. Equivalently, a declarative sentence that is either true or false; such a sentence is usually about certain given objects and is then called a "condition on" those objects.

control: An abstract way of referring to the progress of the program counter through the space of (instruction) addresses.

control-danger bit 380: A bit annotating an instruction address (such as using a field in the PTE of the page of the instruction, but other methods are possible) which when set is equivalent to both control and danger bits annotating the instruction address being set.

control transfer: By default after the execution of an instruction the program counter increments to the address of the next instruction; a control transfer is any action taken to set the program counter to any value other than this default.

criterion: See "condition".

current-module-id register 110: A register holding a module-id which is used for access checks against the owner module-id (or ownable module-id) annotated onto a datum when that datum is accessed.

current-module-suff-len register 111: A register holding an unsigned int of sufficient bits to count from 0 to the maximum possible module-id (inclusive, inclusive). In some embodiments, when a datum is accessed, the access check comparing the current-module-id register against the ownable module-id annotated onto that datum ignores any differences in the suffix of the bitwise exclusive-or computed when comparing the two values where the suffix has the length of the value of this register (that is, the comparison ignores the number of least significant bits of the value of this register); see FIG. 39c.

danger mode meta-datum: an annotation on an instruction address indicating that the instruction at that address runs with more powers than user mode; in one embodiment, the danger mode meta-datum gives kernel mode powers to the instruction at the annotated address. One example is the Hard Object danger bit 065.

dangerous: We use this term to indicate an instruction (or configuration thereof) which invokes powers beyond those of normal user mode instructions. We introduce this term, as distinct from "kernel" (or "supervisor"), in order to distinguish instructions which may require more privileges (powers) than user mode allows, but may not necessarily require full kernel mode privileges (powers); however in some embodiments, "dangerous" may simply be synonymous with "requiring kernel mode".

dangerous subset of instructions: a subset of instructions or configurations thereof which are dangerous (see "dangerous").

data: Bits in a computer not intended to be interpreted directly as instructions by the CPU.

data access: An access to data at a data address.

data address: Many prior art computer systems partition RAM addresses into "data", those for storing data, and "text", those for storing program instructions; a data address is one address of the first part, that is, the addresses for storing data.

data address set-integrity argument: The argument to the set-integrity operation 122 that is a data address; the operation associates this argument with a new integrity bit 064.

data address set-owner argument: The argument to the set-owner-module-id operation 120 that is a data address; the operation associates this argument with a new owner module-id 063.

data address set-public-readable argument: The argument to the set-public-readable operation 12A that is a data address; the operation associates this argument with a new public-readable bit 100.

data module-id: A module-id annotated onto a datum or a plurality of data.

data page: Prior art computer systems organize RAM addresses into pages; a page containing data addresses is a data page. Note that prior art computer systems tend to mark entire pages as completely data or completely text (instruction) pages.

datum: singular of data; see entry for data.

destination instruction: See "target instruction".

device owner module-id 340: An identifier annotated onto a particular device; see FIGS. 34, 35, and 36.

domain: an abbreviation for "protection domain"; see the entry for protection domain.

element: (Mathematics) A member of a set.

exclusive-or (also "xor"): The exclusive-or of two bits is their sum modulo 2.

execution: The act of executing or running a program.

fault: A condition which the CPU of a microprocessor can enter in an exceptional circumstance requiring special handling and suspension of the currently executing program. Usually upon the occurrence of a fault the CPU aborts its execution of the current program and begins executing an fault-handling routine.

finding: See "computing an association".

fine grain: In the context of granularity, smaller quanta.

granularity: The level of detail or size of unit or quantum of expression for a computation. See "fine grain" and "coarse grain".

indicator instruction: An instruction which indicates that its (instruction) address has some property. One example of an indicator instruction is a target-indicator instruction.

input-output device: Also "input/output device" or "I/O device". An abstract identifier used by software to identify a particular piece of hardware attached to a computer, such as a disk drive, keyboard, mouse, etc. when input or output to such a piece of hardware is desired. Alternatively, the actual physical device so attached to a computer: a disk drive, etc.

input-output operation: Also "input/output operation" or "I/O operation". An operation by which software can request input or output from an input-output device.

instruction: Bits in a computer meant to be interpreted by the CPU as directions for it to perform one of a predetermined list of manipulations of data, such amount of data usually fixed and such manipulations usually implemented completely in microprocessor hardware.

instruction address: Many prior art computer systems partition RAM addresses into "data", those for storing data, and "text", those for storing program instructions; an instruction address is one address of the second part, that is, the addresses for storing instructions.

instruction argument: An argument to an instruction (as opposed to an argument to a function).

instruction module-id: A module-id annotated onto an instruction or a plurality of instructions.

integrity-bit 064: A bit of meta-data associated with a data address. This bit is cleared to false whenever the owner of this data address is changed, and can only be set to true again by the new owner. This bit allows a module to recognize a Trojan Horse attack by another module.

jump instruction: An instruction which unconditionally transfer control, independent of any condition. Contrast with "branch instruction", "call instruction", and "return instruction".

just-called-multi CPU status bit 37A: A CPU status bit indicating that (1) a call instruction has just executed and (2) the target (instruction address) of that call is annotated with an owner module-id which is the special multi module-id.

just-jumped-multi CPU status bit 37B: A CPU status bit indicating that (1) a jump or branch instruction has just executed and (2) the target (instruction address) of that jump or branch is annotated with an owner module-id which is the special multi module-id.

just-returned-multi CPU status bit 37C: A CPU status bit indicating that (1) a return instruction has just executed and (2) the target (instruction address) of that return is annotated with an owner module-id which is the special multi module-id.

just-transferred-control mode: A mode of the CPU indicating that a control transfer has just been made and that some condition should be checked of the next instruction and/or its (instruction) address.

kernel: Software which runs in kernel mode.

kernel mode: The mode of a CPU where all instructions are allowed; usually as distinguished from user-mode.

map: As a noun, the embodiment of any abstract association. As a verb, the abstract act of associating. This term is meant to indicate any method for associating elements with one another. Use of this term—and others like it that evoke the context of an association or relationship between elements—is not meant to limit to any particular embodiment.

master powers: An abstract property that instructions are said to "have" when the program is arranged such that when these instructions are running the current-module-id register has as its value the special master module-id; deliberately reminiscent of prior art kernel mode.

master module-id 371: A special module-id value (for example, we could use the number 1) such that when the current-module-id register is set to this value, the instructions executed have powers very similar to instructions running in prior art kernel mode in prior art systems; see "master powers".

multi module-id 372: A special module-id value (for example, we could use the number −2) such that when annotated onto instruction addresses (such as in a owner-module-id field in the PTE of a text page) changes the operation of control transfer into the page (and could have other consequences, depending on the details of the embodiment); if the current-module-id register is ever set to the multi module-id, the CPU faults.

nobody module-id 370: A special module id value (for example, we could use the number 0); if the current-module-id register is ever set to the nobody module-id, the CPU faults. Note that this value can be useful as the owner (or ownable) module-id annotating data pages that should not be accessed as heap pages by user code, such as stack pages.

matching: Two objects match if they satisfy some relation. Equality is a common example of such a relation. Matching relations include, but are not limited to, equality.

meta-data: data about data (where "about data" here is meant in the more general sense which means about or annotating any kind of information at all, including instructions). For example, meta-data of data often indicates how said data may be used, including but not limited to encoding access permissions to said data. The plural of meta-datum.

meta-datum: singular of meta-data. See "meta-data".

microprocessor: The core of a modern computer system.

mode: A subset of the abstract state space of a machine. We say a machine is in a particular mode when the state of the machine is in the subset of the state space associated with the mode.

mode of operation: See "mode".

module: A subset of instruction addresses all collectively owning and maintaining data as one.

module-id: an identifier for a module.

new integrity set-integrity argument: The integrity bit argument to the set-integrity operation 122. This is the integrity bit with which the instruction/address pairs comprising (a) the instruction addresses in the subset of instruction addresses argument and (b) the data address argument will be associated after the set-integrity operation.

new-module-id argument to the set-current-module-id instruction 421: the set-current-module-id instruction sets the current-module-id register to the value of his argument.

new-module-id argument to the target-pub/priv/jump/return-multi instructions 378: the target-pub-multi and target-return-multi set the current-module-id register to the value of this argument, whereas the target-priv-multi and target-jump-multi instructions assert that the current-module-id register already has the value of this argument or they fault.

new-module-suff-len argument to the target-pub/priv/jump/return-multi instructions 379: when the embodiment of Section 3b. Multiple sub-module classes per module: owner/ownable separation is used with target-pub/priv/jump/return-multi instructions this argument is used in a way parallel to the new-module-id argument to the target-pub/priv/jump/return-multi instructions 378, specifically: (a) when the target-pub-multi and target-return-multi set the current-module-id register to the value of the new-module-id argument argument, they also set the current-module-suff-len register to the value of the new-module-suff-len argument and (b) when the target-priv-multi and target-jump-multi instructions assert that the current-module-id register already has the value of the new-module-id argument they also further assert that the current-module-id register already has the value of the new-module-suff-len argument or they fault.

new owner set-owner argument: The owner module-id argument to the set-owner-module-id operation 120. This is the owner module-id with which the data address argument will be associated after the set-owner-module-id operation.

new public-readable set-public-readable argument: The public-readable bit argument to the set-public-readable operation 12A. This is the public-readable bit with which the data address argument will be associated after the set-public-readable operation.

operation: An action comprising the execution of one or more instructions.

ownable-module-id 391: An identifier annotated onto a data address; it is used during checking of access to the address; see FIG. 39*b*.

owner module-id 063: An identifier annotated onto an address (instruction address or a data address); it is used during checking of access to the address; when the current-module-id register is used, the owner module-id annotated onto an instruction address is used to initialize the current-module-id register when control transfers to the instruction address; see FIG. 6 for an example of how to do this annotation using page table entries.

owner-module-suff-len 390: An unsigned integer of sufficient bits to count from 0 to the maximum possible module-id (inclusive, inclusive) which is annotated onto an instruction address; it is used to update the current-module-suff-len register when control transfers to that instruction address; see FIG. 39*a*.

owner subset of instruction addresses: Said of a data address: the subset of instruction addresses that (a) controls access to the data address and (b) can give ownership away to another subset of instruction addresses. The exact details of controlling access are a function of which embodiment of the Hard Object design is chosen.

page: A prior art unit of partition of a space of memory addresses. See also "page table entry".

page-straddling instruction: An instruction the encoding of which in bits begins on one page and ends on another. See "page".

page table entry 041: A prior art mechanism for annotating memory pages with meta-data. Also can mean the meta-data so annotated.

page table entry owner module-id 063: The module-id owning of all of the data addresses on a data page. It is associated with those data addresses in an efficient manner by being annotated on the page as a field of the page table entry.

partition: (Mathematics) A collection of subsets of a set which (a) are pairwise disjoint and (b) the union of which is the entire set.

permission value 134: A value encoding what kind of accesses are allowed at a given address.

permissions table (single instance of permissions tables 133): A table associating an address with a permission value. The permission value is used at the time of an access to the address to determine if the access should be allowed.

point to: We say some data A points to other data B if A contains the address of B. The intent is usually to provide a mechanism to realize an association of B to A.

predicating (said of an action): possibly altering the action in question depending on some criteria.

program: A collection of instructions executed by a computer/microprocessor.

program counter 250: A special CPU register holding the address (or pointing to) the current instruction being executed.

protection domain: abstractly, a set of resources that may be accessed in a particular context; one says that any metaphor of an agent is 'in the protection domain' when it has such access to said resources.

public-readable-bit 100: A bit of meta-data associated with a data address. Can only be set by the owner of the data address. If this bit is true then any instruction can read, but not necessarily write, the data at the data address—unless the untrusted region embodiment is used and the instruction address of the instruction is in the untrusted region, overriding the pubic-readable-bit.

read: An access to data at a data address that transfers data from the RAM cell indexed by the data address to a CPU register.

read-if-multi-text instruction 500: An instruction which under some conditions can read text pages even when the owner (or ownable) module-id is the special multi module-id.

restore-current-module-id( ) instruction 422: An instruction which under some conditions can restore the current-module-id register to the value of the owner-module-id annotated onto the instruction address holding the restore-current-module-id( ) instruction.

register: Special memory within the CPU; not general-purpose Random Access Memory (RAM). Registers often have special semantics, such as CPU status registers and the program counter. See also "program counter".

relation: Terms "relation" and "relationship" are meant to at least encompass, without being limited to, the meaning of the term "relation" as used in the field of Relational Algebra.

return instruction: An instruction which causes normal function call termination; often takes several actions such as popping values off of the stack then transferring control to the address that was stored by the return address which was pushed onto the stack by the call instruction which initiated the call. See "call instruction". Contrast with "branch instruction", "jump instruction".

set: (Mathematics) Usually considered a undefined primitive concept in mathematics; perhaps describable as a containment metaphor where any given thing must be either in the set or not, never neither nor both; the things contained are called elements.

set-current-module-id(UInt new-module-id) instruction 420: An instruction which under some circumstances sets the current-module-id register to the value of its new-module-id argument.

set-integrity operation 122: An operation that sets the integrity bit associated with a data address.

set-integrity condition: A condition that if met in a situation allows the set-integrity operation to proceed in that situation.

set-owner-module-id operation 120: An operation that sets the owner associated with a data address.

set-owner condition: A condition that if met in a situation allows the set-owner-module-id operation to proceed to alter the owner in that situation.

set-public-readable operation 12A: An operation that sets the public-readable bit associated with a data address.

set-public-readable condition: A condition that if met in a situation allows the set-readable-bit operation to proceed in that situation.

stack-limit register 022: A CPU register that points to the maximum allowable extent of the stack; only addresses less than or equal to caller-protect and greater than stack-limit are "in frame". In a usual prior art memory organization it should not change while a particular thread context is executing; however it should be changed by the thread scheduler as a CPU switches from executing one thread to executing another.

subset: (Mathematics) In the context of an other set, a set where all of its elements are also elements of the other set.

subset of data addresses: A subset of all of the data addresses of the microprocessor.

subset of instruction addresses: A subset of all of the instruction addresses of the microprocessor.

table: The embodiment of any abstract association. This term is meant to indicate any method for associating elements with one another. Use of this term is meant to suggest an embodiment and is not meant to limit to any particular embodiment.

tag meta-datum: Any data annotating other data in order to make the data it annotates distinct. One example of a tag meta-datum is a target-tag meta-datum.

target data address: The data address in the context of an instruction making an access to target data at a data address.

target-indicator instruction: An address at which an indicator instruction is located the presence of which indicates suitability as a target instruction address for some control transfers. See "indicator instruction" and "target instruction address".

target instruction: an instruction at a target instruction address; see "target instruction address".

target instruction address: In the context of control transfer, the instruction address to which a control transfer instruction changes the program counter (or to which control is transferred).

target-jump-multi instruction 375: An instruction which under some circumstances may be targeted (without faulting) by a jump or a branch from text of the same module even if the instruction address where it is located is annotated with the special multi module-id.

target-pub-multi instruction 373: An instruction which under some circumstances may be targeted (without faulting) by a call even if the instruction address where it is located is annotated with the special multi module-id.

target-priv-multi instruction 374: An instruction which under some circumstances may be targeted (without faulting) by a call from text of the same module-id even if the instruction address where it is located is annotated with the special multi module-id.

target-return-multi instruction 376: An instruction which under some circumstances may be targeted (without faulting) by a return even if the instruction address where it is located is annotated with the special multi module-id.

target-tag 067: A field of a Page Table Entry the value of which must match the argument of target-indicator instructions on the corresponding page for those target indicator instructions to not fault. See "target indicator instruction".

user mode: The typical mode for the execution of programs on a microprocessor where dangerous instructions are not allowed; in prior art systems, as distinguished from kernel-mode.

value: The bits contained in a register or memory cell. That is, at times when it is clear from context we may say "the program counter", confusing the hardware register with the software (in this case an instruction address) value contained in the register; however when we wish to be explicit, we may refer to (1) the register on one hand, meaning the hardware device, and (2) the value of the register on the other hand, meaning the bits contained in the hardware device.

write: An access to data at a data address that transfers data to the RAM cell indexed by the data address from a CPU register.

LIST OF REFERENCE NUMERALS

A note on the uniqueness of operation tests, steps, and states: please note that each test, step, and state (together "step") within an operation is unique to that operation; thus even if the step has the same description out of context as that of another step of another operation, in context the step is not really the same (for example, it has different subsequent steps) and thus we label each step, test, and state of each operation with a unique reference numeral.

| | |
|---|---|
| 010 | heap data |
| 011 | program text (code) |
| 012 | heap object under attack |
| 013 | heap object of same module as heap object 012 |
| 014 | heap object of another module |
| 016 | text having same module-id (not shown) as heap objects 012 and 013 |
| 017 | module text of an attacking module |
| 018 | module text of another module |
| 020 | stack data |
| 021 | caller-protect register |
| 022 | stack-limit register |
| 023 | accessible stack range |
| 024 | caller function stack frame under attack |
| 025 | callee attacking function |
| 030 | CPU chip |
| 031 | CPU |
| 032 | a virtual address being looked up |
| 033 | memory management unit (MMU) |
| 034 | physical address (PA) |
| 035 | physical main memory |
| 036 | physical memory cell |
| 037 | data word being retrieved from physical main memory |
| 038 | Hard Object rule enforcement happening within the memory management unit |
| 040 | memory resident page table |
| 041 | page table entry |
| 042 | "valid" field of a page table entry |
| 043 | "physical page number or disk address" field of a page table entry |
| 045 | a page stored in physical memory |
| 046 | virtual memory on disk/system swap store |
| 047 | a page stored on disk |
| 050 | a page table 040 plus permission bits |
| 051 | the SUP bit field of a page table entry |
| 052 | the READ bit field of a page table entry |
| 053 | the WRITE bit field of a page table entry |
| 054 | the page table of a process; subset of 050 memory resident page table plus permission bits |
| 056 | an unallocated page of physical memory |
| 060 | page table plus permissions bits 050 and also plus additional Hard Object meta-data fields |
| 061 | Hard Object meta-data |
| 062 | Hard Object text bit meta-data field |
| 063 | Hard Object owner module-id meta-data field |
| 064 | Hard Object integrity bit meta-data field |
| 065 | Hard Object danger bit meta-data field |
| 066 | Hard Object control bit meta-data field |
| 067 | Hard Object target-tag meta-data field |

-continued

LIST OF REFERENCE NUMERALS

A note on the uniqueness of operation tests, steps, and states: please note that each test, step, and state (together "step") within an operation is unique to that operation; thus even if the step has the same description out of context as that of another step of another operation, in context the step is not really the same (for example, it has different subsequent steps) and thus we label each step, test, and state of each operation with a unique reference numeral.

| | |
|---|---|
| 070 | start state for checking access to data at address x by instruction at address I |
| 071 | test if instruction at address I is annotated with the danger bit |
| 072 | test if address x and address I have the same owner module-id |
| 073 | test if address x is within the accessible stack range |
| 074 | fault state |
| 075 | allow state |
| 07X | test if the target address x is annotated with a text bit and the access is a write |
| 07Y | fault state |
| 080 | start state for the set-owner-module-id operation taking arguments address x and address newOwnerModuleId, being called from address I |
| 081 | test if address I is annotated with the danger bit. |
| 082 | test if address x and address I have the same owner module-id |
| 083 | fault state |
| 084 | step of clearing the integrity bit of x to false |
| 085 | step of setting the new owner of x from the arguments to the operation |
| 086 | allow state |
| 090 | start state for the set-integrity operation taking arguments address x and bit newIntegrity, called from address I |
| 091 | test if instruction at address I is annotated with the danger bit |
| 092 | test if address x and address I have the same owner module-id |
| 093 | fault state |
| 094 | step of clearing setting the integrity bit of x to newIntegrity |
| 095 | allow state |
| 100 | public-readable Hard Object meta-data bit |
| 110 | current-module-id register |
| 111 | current-module-suff-len register |
| 120 | set-owner-module-id operation |
| 121 | get-owner-module-id operation |
| 122 | set-integrity operation |
| 123 | get-integrity operation |
| 124 | set-caller-protect operation |
| 125 | get-caller-protect operation |
| 126 | set-stack-limit operation |
| 127 | get-stack-limit operation |
| 128 | branch-on-integrity-false operation |
| 129 | branch-on-integrity-true operation |
| 12A | set-public-readable operation |
| 12B | get-public-readable operation |
| 130 | protection domain ID register |
| 131 | Mondriaan permission values |
| 132 | permissions cache |
| 133 | permissions tables |
| 134 | a single permission value |
| 135 | meaning of Mondriaan permission values |
| 136 | multiple instances of Hard Object meta-data as stored in the meta-data table 138 or meta-data cache 137 |
| 137 | meta-data cache |
| 138 | meta-data table |
| 190 | start of the operation of looking up permissions meta-data for an instruction or datum at address x |
| 191 | test if target instruction or datum spans multiple pages |

LIST OF REFERENCE NUMERALS

A note on the uniqueness of operation tests, steps, and states: please note that each test, step, and state (together "step") within an operation is unique to that operation; thus even if the step has the same description out of context as that of another step of another operation, in context the step is not really the same (for example, it has different subsequent steps) and thus we label each step, test, and state of each operation with a unique reference numeral.

| | |
|---|---|
| 192 | test if the permissions meta-data on the multiple pages are the same |
| 193 | fault state due to permissions meta-data on multiple pages being different |
| 194 | allow state |
| 200 | target-pub target-indicator instruction |
| 201 | target-priv target-indicator instruction |
| 202 | target-jump target-indicator instruction |
| 210 | just-called-cross CPU status bit |
| 211 | just-called-internal CPU status bit |
| 212 | just-jumped CPU status bit |
| 220 | caller function temporaries |
| 221 | saved return address to which the callee should return |
| 222 | saved value of the caller's caller-protect register, to be restored upon return |
| 223 | a function argument to the callee function |
| 224 | callee function temporaries |
| 225 | a possible position of the prior art frame pointer, pointing at the top of the current temporaries |
| 226 | the prior art stack pointer pointing to the very top of the stack |
| 230 | start state for Hard Object additions to the start of a dynamic jump/branch operation |
| 231 | test if if the owner module-id of the source instruction address equals the owner module-id of the target instruction address |
| 232 | step of setting the just-jumped CPU status bit |
| 233 | fault due to an attempt to make a cross-module jump/branch |
| 234 | allow state |
| 240 | start state for Hard Object additions to the start of a dynamic call operation |
| 241 | test if if the owner module-id of the source instruction address equals the owner module-id of the target instruction address |
| 242 | step of setting the just-called-internal CPU status bit |
| 243 | step of setting the just-called-cross CPU status bit |
| 244 | allow state |
| 250 | program counter CPU register |
| 251 | start state for Hard Object additions to the call instruction (dynamic or static) stage of stack and register manipulations |
| 252 | step of saving the return address |
| 253 | step of saving the current value of the caller-protect register |
| 254 | step of setting the caller-protect register to point to the callee function argument having the highest address |
| 255 | allow state |
| 260 | an unnamed temporary register for short-term use during the execution of the return operation |
| 261 | start state for Hard Object additions to the start of a return instruction, also replacing the prior art actual control transfer made at the end of any return instruction |
| 262 | step of saving the current value of the caller-protect register into an unnamed temporary register for use during the duration of the operation of the return instruction |
| 263 | step of restoring the stack pointer from the value of the caller-protect register |
| 264 | step of restoring the caller protect register from the caller's saved caller-protect on the stack; this saved value is found on the stack relative to the current-value of the caller-protect register |
| 265 | step of returning restoring the program counter (and thus transferring control to the caller) from the return address saved on the stack; this saved value is found on the stack relative to the value of the unnamed temporary register |
| 266 | allow state |
| 270 | start state for Hard Object additions to the operation of a CPU that occur on the loading of an instruction at instruction address I concerning constraint of dynamic control flow |
| 271 | test if the just-jumped CPU status bit is set |
| 272 | test if address I is annotated with the control bit |
| 273 | test if loaded instruction is a target-jump instruction |
| 274 | test if the just-called-internal CPU status bit is set |
| 275 | test if address I is annotated with the control bit |
| 276 | test if loaded instruction is a target-priv instruction |
| 277 | test if the just-called-cross CPU status bit is set |
| 278 | test if the loaded instruction is a target-pub instruction |
| 279 | test if the argument of the loaded target-indicator instruction (to get to this test the instruction must be some kind of target indicator instruction) equals the target-tag PTE field annotating instruction address I |
| 27A | step of clearing all just-transferred control bits (just-jumped, just-called-internal, or just-called-cross) at the end of the operation no matter the outcome (including this step in the flow of the chart would have made it far more complex) |
| 27B | fault state: expected target-jump |
| 27C | fault state: expected a target-pub |
| 27D | fault state: expected argument to match target-tag |
| 27E | allow state: CPU operation continues from here |
| 280 | start state for Hard Object additions to the operation of a CPU that occur on the loading of an instruction at instruction address I concerning the danger bit |
| 281 | test if address I is annotated with the danger bit |
| 282 | step of exiting kernel mode by clearing the CPU kernel mode status bit |
| 283 | step of entering kernel mode by setting the CPU kernel mode status bit |

LIST OF REFERENCE NUMERALS
A note on the uniqueness of operation tests, steps, and states: please note that each test, step, and state (together "step") within an operation is unique to that operation; thus even if the step has the same description out of context as that of another step of another operation, in context the step is not really the same (for example, it has different subsequent steps) and thus we label each step, test, and state of each operation with a unique reference numeral.

| | |
|---|---|
| 284 | allow state: CPU operation continues from here |
| 285 | start state for Hard Object additions to the operation of a dangerous instruction at instruction address I from the alternative embodiment Alternative mechanism for enforcing danger bit. |
| 286 | test if address I is annotated with the danger bit |
| 287 | fault state: expected address I to be annotated with the danger bit |
| 288 | allow state: CPU operation continues from here |
| 289 | start state for CPU instruction load for alt. emb. of Section 8.2 Replacing the kernel mode bit with a master module-id |
| 28A | test if the value of the current module-id register is the special nobody module-id or the special multi module-id |
| 28B | fault state |
| 28C | allow state: continue processing the instruction |
| 290 | start state for Hard Object additions to the operation of a dynamic jump/branch from instruction address I1 to instruction address I2 from the alternative embodiment Alternative mechanism for enforcing constraints on dynamic control transfer |
| 291 | test if the owner module-id annotated onto instruction address I1 equals the owner module-id annotated onto instruction address I2 |
| 292 | test if address I2 is annotated with the control bit |
| 293 | test if instruction address I2 holds a target-jump instruction |
| 294 | test if the argument of the target-jump instruction at instruction address I2 equals the target-tag annotated onto instruction address I2 |
| 295 | fault state: expected instruction addresses I1 and I2 to have equal owner module-ids |
| 296 | fault state: expected address I2 to hold a target-jump instruction |
| 297 | fault state: expected argument of target-jump instruction to equal the target-tag annotated onto instruction address I2 |
| 298 | allow state: CPU operation continues from here |
| 300 | start state for Hard Object additions to the operation of a dynamic call from instruction address I1 to instruction address I2 from the alternative embodiment Alternative mechanism for enforcing constraints on dynamic control transfer |
| 301 | test if the owner module-id annotated onto instruction address I1 equals the owner module-id annotated onto instruction address I2 |
| 302 | test if instruction address I2 holds a target-pub instruction |
| 303 | test if the argument to the target-pub instruction at instruction address I2 equals the target-tag annotated onto instruction address I2 |
| 304 | test if instruction address I2 is annotated with the control bit |
| 305 | test if instruction address I2 holds a target-priv instruction |
| 306 | test if the argument of the target-priv instruction at instruction address I2 equals the target-tag annotated onto instruction address I2 |
| 307 | fault state: expected instruction address I2 to hold a target-pub instruction |
| 308 | fault state: expected the argument of the target-priv instruction at I2 to equal the target-tag annotation on instruction address I2 |
| 309 | fault state: expected the argument of the target pub instruction at I2 to equal the target-tag annotated onto instruction I2 |
| 30A | allow state: CPU operation continues from here |
| 310 | enter-kernel-mode operation |
| 311 | exit-kernel-mode operation |
| 320 | start state for Hard Object enter-kernel-mode operation from the alternative embodiment An intermediate danger mode between user and kernel mode |
| 321 | test if instruction address I is annotated with the danger bit |
| 322 | step of entering kernel mode by setting the kernel CPU status bit |
| 323 | fault state: expected instruction address I to be annotated with the danger bit |
| 324 | allow state: the operation succeeds |
| 330 | start state for Hard Object exit-kernel-mode operation from the alternative embodiment An intermediate danger mode between user and kernel mode |
| 331 | step of clearing the kernel CPU status bit and thus going into user mode |
| 332 | allow state: the operation succeeds |
| 340 | device owner module-id |
| 342 | example input/output device: disk0 |
| 343 | example device owner module-id: 0x7000 |
| 344 | start state for Hard Object access to input/output device d from instruction address I operation from the alternative embodiment Constraining access to input/output devices using device owner module-ids |
| 345 | test if instruction address I is annotated with the danger bit (or alternatively: is the kernel mode bit set) (or alternatively: does current-module-id register = master module-id) |
| 346 | test if the device owner module-id annotated onto device d is the same as the owner module-id annotated onto instruction address I |
| 347 | fault state |
| 348 | allow state: the operation succeeds |
| 370 | special nobody module-id |
| 371 | special master module-id |
| 372 | special multi module-id |
| 373 | target-pub-multi instruction |
| 374 | target-priv-multi instruction |
| 375 | target-jump-multi instruction |
| 376 | target-return-multi instruction |
| 378 | new-module-id argument |
| 379 | new-module-suff-len argument |
| 37A | just-called-multi CPU status bit |
| 37B | just-jumped-multi CPU status bit |
| 37C | just-returned-multi CPU status bit |

LIST OF REFERENCE NUMERALS

A note on the uniqueness of operation tests, steps, and states: please note that each test, step, and state (together "step") within an operation is unique to that operation; thus even if the step has the same description out of context as that of another step of another operation, in context the step is not really the same (for example, it has different subsequent steps) and thus we label each step, test, and state of each operation with a unique reference numeral.

| | |
|---|---|
| 380 | control-danger bit |
| 390 | owner-module-suff-len |
| 391 | ownable-module-id |
| 400 | start state of check for access to data at Address x by instruction at Address I when using the embodiment of an owner/ownable module-id separation and an owner-module-suff-len |
| 401 | test if instruction address I is annotated with the danger bit (or alternatively: is the kernel mode bit set) (or alternatively: does current-module-id register = master module-id) |
| 402 | test if the ownable module-id annotated onto data address x equals the owner-module-id annotated into instruction address I, ignoring the number of least significant bits of the value given in the owner-module-suff-len annotated onto instruction address I |
| 403 | test if address x is within the accessible stack range |
| 404 | fault state |
| 405 | allow state |
| 40X | test if the target address x is annotated with a text bit and the access is a write |
| 40Y | fault state |
| 410 | start state of check for access to data at Address x by instruction at Address I when using the embodiment of a current-module-id register (and optionally a current-module-suff-len register) |
| 411 | test if instruction address I is annotated with the danger bit |
| 412 | test if the current-module-id register equals the owner module-id annotated onto data address x (or alternatively: test if the current-module-id register equals the ownable-module-id, ignoring the number of least significant bits of the value of the current-module-suff-len register) |
| 413 | test if address x is within the accessible stack range |
| 414 | fault state |
| 415 | allow state |
| 41X | test if the target address x is annotated with a text bit and the access is a write |
| 41Y | fault state |
| 420 | set-current-module-id(UInt new-module-id) instruction |
| 421 | new-module-id argument to set-current-module-id instruction |
| 422 | restore-current-module-id( ) instruction |
| 430 | start state for executing set-current-module-id(UInt new-module-id) operation at Address I |
| 431 | test if control bit (or alternatively control-danger bit) annotates instruction address I |
| 432 | step of setting the value of the current-module-id register to the new-module-id argument |
| 433 | fault state |
| 434 | allow state |
| 440 | start state for executing restore-current-module-id( ) operation at Address I |
| 441 | test if the owner-module-id annotated onto instruction address I is the multi-module-id |
| 442 | step of restoring the value of the current-module-id register to that of the owner-module-id annotated onto instruction address I |
| 443 | fault state |
| 444 | allow state |
| 450 | start state for dynamic jump/branch from Address I1 to Address I2, checking against the current-module-id register, from the alternative embodiment of Section 8.2 Replacing the kernel mode hit with a master module-id |
| 451 | test if current-module-id register equals the owner-module-id annotated onto instruction address I2 |
| 452 | step of setting the just-jumped CPU status bit |
| 453 | fault state |
| 454 | allow state |
| 460 | start state for dynamic call from Address I1 to Address I2, checking against and updating the current-module-id register, from the alternative embodiment of Section 8.2 Replacing the kernel mode bit with a master module-id |
| 461 | test if the current-module-id register equals the owner-module-id annotated onto instruction address I2 |
| 462 | step of setting the just-called-internal CPU status bit |
| 463 | step of setting the just-called-cross CPU status bit |
| 464 | step of setting the current-module-id register to the owner-module-id annotated onto instruction address I2 |
| 465 | allow state |
| 466 | start state for static call or return from Address I1 to Address I2, checking against and updating the current-module-id register, from the alternative embodiment of Section 8.2 Replacing the kernel mode bit with a master module-id |
| 467 | test if the current-module-id register equals the owner-module-id annotated onto the instruction address I2 |
| 468 | step of setting the current-module-id register to the owner-module-id annotated onto the instruction address I2 |
| 469 | allow state |
| 470 | start state for dynamic jump/branch from Address I1 to Address I2, checking against the current-module-id register in an embodiment having the multi module-id |
| 471 | test if the owner-module-id annotated onto instruction address I2 is the multi module-id |
| 472 | step of setting the just-jumped-multi CPU status bit |
| 473 | allow state |
| 474 | test if the current-module-id register equals the owner-module-id annotated onto instruction address I2 |
| 475 | step of setting the just-jumped CPU status bit |
| 476 | allow state |
| 477 | fault state |

LIST OF REFERENCE NUMERALS

A note on the uniqueness of operation tests, steps, and states: please note that each test, step, and state (together "step") within an operation is unique to that operation; thus even if the step has the same description out of context as that of another step of another operation, in context the step is not really the same (for example, it has different subsequent steps) and thus we label each step, test, and state of each operation with a unique reference numeral.

Figure 27:
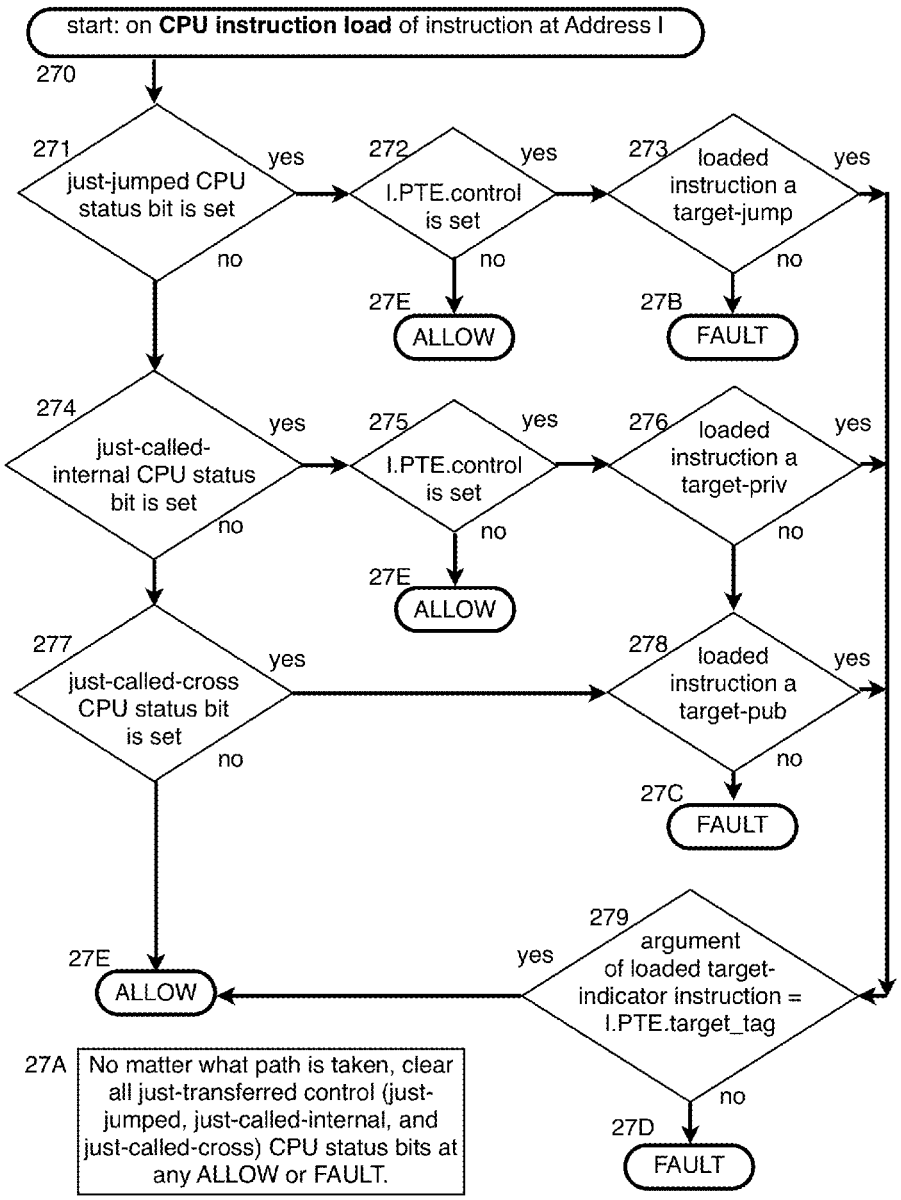
FIG. 27 shows checking done in the first embodiment by the CPU at each instruction load cycle as prompted by just-transferred-control CPU status bits.

| | |
|---|---|
| 480 | start state for dynamic call from Address I1 to Address I2, checking against the current-module-id register in an embodiment having the multi module-id |
| 481 | test if the owner-module-id annotated onto the instruction address I2 equals the multi module-id |
| 482 | step of setting the just-called-multi CPU status bit |
| 483 | allow state |
| 484 | step of setting the current-module-id to the owner-module-id annotated onto the instruction address I2 |
| 485 | step of setting the just-called-internal CPU status bit |
| 486 | step of setting the just-called-cross CPU status bit |
| 487 | step of setting the current-module-id register to the owner-module-id annotated onto instruction address I2 |
| 488 | allow state |
| 48A | start state for return from Address I1 to Address I2, checking against the current-module-id register in an embodiment having the multi module-id |
| 48B | test if the owner-module-id annotated onto instruction address I2 equals the multi module-id |
| 48C | step of setting the just returned-multi CPU status bit |
| 48D | allow state |
| 48E | step of setting the current-module-id register to the owner-module-id annotated onto instruction address I2 |
| 48F | step of setting the current-module-id register to the owner-module-id annotated onto instruction address I2 |
| 490 | start state on CPU instruction load of instruction at Address I, when using target-pub/priv/jump/return-multi instructions |
| 491 | test if just-jumped-multi CPU status bit is set |
| 492 | test if the instruction just loaded is a target-jump-multi instruction |
| 493 | fault state |
| 494 | test if the control bit is annotated onto instruction address I |
| 495 | fault state |
| 496 | test if the target-tag argument (to whichever target-pub/priv/jump/return-multi instruction was just loaded) equals the target-tag annotated onto instruction address I |
| 497 | test if the current-module-id register equals the new-module-id argument (to whichever target-pub/priv/jump/return-multi instruction was just loaded) (optionally: if the alt. emb. of owner/ownable separation is also being used, then there is also a current-module-suff-len register and the instruction just loaded also has a third new-module-suff-len argument and this test is in the affirmative only if it is also the case that (by which we mean logical AND) the current-module-suff-len register equals the value of that new-module-suff-len argument) |
| 498 | allow state |
| 499 | fault state |
| 49A | test if the just-called-multi CPU status bit is set |
| 49B | test if the instruction just loaded is a target-priv-multi instruction |
| 49C | test if the instruction just loaded is a target-pub-multi instruction |
| 49D | test if the control bit is annotated onto instruction address I |
| 49E | fault state |
| 49F | test if the target-tag argument (to whichever target-pub/priv/jump/return-multi instruction was just loaded) equals the target-tag annotated onto instruction address I |
| 49G | step of setting the current-module-id register to the value of the new-module-id argument (to whichever target-pub/priv/jump/return-multi instruction was just loaded) (optionally: if the alt. emb. of owner/ownable separation is also being used, then (a) there is also a current-module-suff-len register and (b) the instruction just loaded also has a third new-module-suff-len argument and (c) this step also sets the current-module-suff-len register to the value of that new-module-suff-len argument) |
| 49H | allow state |
| 49J | test if the just-returned-multi CPU status bit is set |
| 49K | test if the instruction just loaded is a target-return-multi instruction |
| 49L | fault state |
| 49M | step of going to state 270 in FIG. 27 and executing the procedure given there |
| 49N | step of clearing all just-called-multi, just-jumped-multi, just-returned-multi CPU status bits at any fault or allow (including this step in the flow of the chart would have made it far more complex) |
| 500 | read-if-multi-text instruction |
| 510 | start state of check for read of data at Address x by read-if-multi-text instruction at Address I |
| 511 | test if the control bit is annotated onto instruction address I |
| 512 | fault state |
| 513 | test if the danger bit is annotated onto instruction address I |
| 514 | test if the current-module-id register equals the owner module-id annotated onto data address x (or alternatively: test if the current-module-id register equals the ownable module-id, ignoring the number of least significant bits of the value of the current-module-suff-len register) |
| 515 | test if the text bit is annotated onto address x (that is, this is a test if address x is on a text page (as opposed to a data page)) |
| 516 | test if the owner-module-id annotated onto address x is the multi-module-id |
| 517 | fault state |

LIST OF REFERENCE NUMERALS

A note on the uniqueness of operation tests, steps, and states: please note that each test, step, and state (together "step") within an operation is unique to that operation; thus even if the step has the same description out of context as that of another step of another operation, in context the step is not really the same (for example, it has different subsequent steps) and thus we label each step, test, and state of each operation with a unique reference numeral.

| | |
|---|---|
| 518 | test if address x is within the accessible stack range |
| 519 | allow state |
| 51A | fault state |

LIST OF NON-PATENT REFERENCE KEYS

[BO-2003]: RANDAL E. BRYANT and DAVID R. O'HALLARON "Computer Systems: A Programmer's Perspective" Prentice Hall 2003

[EKO-1995]: DAWSON R. ENGLER, M. FRANS KAASHOEK, JAMES O'TOOLE "Exokernel: An Operating System Architecture for Application-Level Resource Management", Symposium on Operating Systems Principles, 1995, pages 251-266

[G-2005]: S. GORMAN, "Overview of the Protected Mode Operation of the Intel Architecture" (date unknown to me)

[Google-NaCl-2009]: YEE et al., "Native Client: A Sandbox for Portable, Untrusted x86 Native Code", IEEE Symposium on Security and Privacy, May 2009

[HP-1998]: "HP OpenVMS Systems Documentation: OpenVMS Alpha Guide to 64-Bit Addressing and VLM Features", January 1998

[1-2005]"Intel 80386 Programmer's Reference Manual", 1986

[Intel-Itanium-2010]: Intel, "Intel Itanium Architecture Software Developer's Manual, Volume 2: System Architecture", Revision 2.3, May 2010, pp. 2:59-2:60, pp. 2:564-2:565 and Intel, "Intel Itanium Architecture Software Developer's Manual, Volume 3: Intel Itanium Instruction Set Reference", Revision 2.3, May 2010, p. 3:29, p. 3:53.

[MUNGI]: "The Mungi Manifesto", http://www.ertos.nicta.com.au/research/mungi/manifesto.pml (date unknown to me)

[OSSNMS-1992]: T. OKAMOTO, H. SEGAWA, S. H. SHIN, H. NOZUE, KEN-ICHI MAEDA, M. SAITO, "A Micro-Kernel Architecture for Next Generation Processors", Proceedings of the Workshop on Micro-kernels and Other Kernel Architectures, 1992, pages. 83-94

[W-2004]: EMMETT WITCHEL, "Mondrian Memory Protection", Ph.D. Thesis MIT, 2004

[WA-2003]: EMMETT WITCHEL, KRSTE ASANOVIC, "Hardware Works, Software Doesn't: Enforcing Modularity with Mondriaan Memory Protection" 9th Workshop on Hot Topics in Operating Systems (HotOS-IX), Lihue, Hi., May 2003

[WCA-2002]: EMMETT WITCHEL, JOSH CATES, KRSTE ASANOVIC, "Mondrian Memory Protection", ASPLOS-X: Proceedings of the 10th international conference on Architectural support for programming languages and operating systems, San Jose, Calif. 2002, pages 304-316

[WS-1992]: JOHN WILKES, BART SEARS, "A comparison of Protection Lookaside Buffers and the PA-RISC protection architecture", HP Laboratories Technical Report HPL-92-55, March 1992, pp. 1-11

[ZLFLQZMT-2004]: P. ZHOU, W. LIU, L. FEI, S. LU, F. QIN, Y. ZHOU, S. MIDKIFF, J. TORRELLAS, "AccMon: Automatically Detecting Memory-related Bugs via Program Counter-based Invariants", IEEE MICRO, 2004

[ZQLZT-2004]: P. ZHOU, F. QIN, W. LIU, Y. ZHOU, J. TORRELLAS, "iWatcher: Efficient Architectural Support for Software Debugging", International Symposium on Computer Architecture ISCA, 2004

[ZQLZT-2004b]: P. ZHOU, F. QIN, W. LIU, Y. ZHOU, J. TORRELLAS, "iWatcher: Simple and General Architectural Support for Software Debugging", IEEE Top Picks in Computer Architecture, 2004

We claim:

1. A method of regulating an execution of a program by a microprocessor having a plurality of instruction addresses, at least one of said instruction addresses having at least one instruction, at least one instruction of at least one of said instruction addresses being a control transfer instruction in which execution of said control transfer instruction effecting a transfer of control to a target instruction address, at least one of said instruction addresses containing a target-indicator instruction indicating that the at least one of said plurality of instruction addresses is a valid target for transfer of control, and at least one instruction address annotated with at least one target-tag field, the method comprising:
 (a) the microprocessor reading a control transfer instruction instructing the microprocessor to transfer control to a target instruction address;
 (b) the microprocessor reading the instruction at the target instruction address;
 (c) the microprocessor comparing the instruction at the target instruction address to at least one target-indicator instruction; considering the comparison to match only if the instruction at the target instruction address has at least one target-tag argument and at least one target tag argument of the instruction at the target instruction address matches at least one target-tag field annotating the target instruction address; and
 (d) the microprocessor executing the instruction at the target instruction address if the instruction at the target instruction address matches at least one target-indicator instruction, otherwise the microprocessor trapping to a handler.

2. The method of claim 1, in which said microprocessor further comprises a page table comprising a plurality of page table entries describing a plurality of memory address pages, said method further comprising the step of:
 the microprocessor annotating at least one target-tag field onto at least one instruction address by associating the at least one target-tag field with at least one page table entry describing at least one memory address page containing the at least one instruction address.

3. A method of regulating an execution of a program by a microprocessor having a plurality of instruction addresses, at least one of said instruction addresses having at least one instruction, at least one instruction of at least one of said instruction addresses being a control transfer instruction in which execution of said control transfer instruction effecting a transfer of control to a target instruction address, at least one of said instruction addresses containing a target-indicator instruction indicating that the at least one of said plurality of instruction addresses is a valid target for transfer of control, at least one instruction address being annotated with at least one target-tag field, and said microprocessor having a plurality of modes of operation comprising at least a just-transferred-control mode, the method comprising:

(a) when said microprocessor executes a control transfer instruction, causing the microprocessor to enter the just-transferred-control mode;

(b) when said microprocessor processes an instruction to be executed at a current instruction address in said just-transferred-control mode:

(i) said microprocessor comparing the instruction to be executed to at least one target-indicator instruction, considering the comparison to match only if the instruction to be executed has at least one target-tag argument and at least one target-tag argument of the instruction to be executed matches at least one target-tag field annotating the current instruction address and (ii) the microprocessor executing the instruction to be executed if said comparison matches, otherwise the microprocessor trapping to a handler.

4. The method of claim 3, in which said microprocessor further comprises a page table comprising a plurality of page table entries describing a plurality of memory address pages, said method further comprising the step of:

the microprocessor annotating at least one target-tag field onto at least one instruction address by associating the at least one target-tag field with at least one page table entry describing at least one memory address page containing the at least one instruction address.

5. A method of regulating an execution of a program by a microprocessor having a plurality of instruction addresses, at least one instruction address of said plurality of instruction addresses having at least one instruction, said microprocessor having a kernel mode of operation in which any operation is allowed to be performed and a kernel mode meta-datum corresponding to said kernel mode of operation, said method comprising:

annotating said kernel mode meta-datum onto said at least one instruction address, when executing an instruction at an instruction address annotated with said kernel mode meta-datum, and the instruction attempts an operation, the microprocessor allows the operation independent of any other restrictions.

6. The method of claim 5, in which said microprocessor further comprises a page table comprising a plurality of page table entries describing a plurality of memory address pages, said method further comprising the step of:

the microprocessor annotating the kernel mode meta-datum onto at least one instruction address by associating the kernel mode meta-datum with at least one page table entry describing at least one memory address page containing the at least one instruction address.

7. A method of regulating an execution of a program by a microprocessor having a plurality of instruction addresses, at least one instruction address of said plurality of instruction addresses having at least one instruction, said microprocessor having a plurality of mode meta-data comprising a dangerous mode meta-datum, said microprocessor having a plurality of instructions, at least one of said instructions being an enter-kernel-mode instruction which puts the microprocessor into a kernel mode when executed, the method comprising:

annotating said dangerous mode meta-datum onto at least one instruction address of said plurality of instruction addresses, when the microprocessor is executing the enter-kernel-mode instruction at an instruction address, the microprocessor enters kernel mode only if the instruction address of the enter-kernel-mode instruction is annotated with said dangerous mode meta-datum.

8. The method of claim 7, in which said microprocessor further comprises a page table comprising a plurality of page table entries describing a plurality of memory address pages, said method further comprising the step of:

the microprocessor annotating the dangerous mode meta-datum onto at least one instruction address by associating the dangerous mode meta-datum with at least one page table entry describing at least one memory address page containing the at last one instruction address.

9. A method of regulating an execution of a program by a microprocessor having a plurality of instruction addresses and a plurality of owner module-ids, and at least one input-output device, where said at least one input-output device is not main memory, at least one of said instruction addresses having at least one instruction, at least one instruction being an input-output operation, and at least one of said input-output devices having at least one device module-id, said method comprising:

annotating at least one instruction address with at least one of said plurality of owner module-ids;

when an instruction of an input-output operation at an instruction address attempts to access an input-output device, allowing the input-output operation only if the device module-id of the input-output device which the input-output operation is attempting to access matches the owner module-id annotated onto the instruction address of said instruction of said input-output operation.

10. A method for regulating an execution of a program by a microprocessor, said microprocessor having instruction addresses and data addresses, said method comprising:

annotating at least one instruction address with an owner module-id and an owner module suffix length, annotating at least one data address with an ownable module-id, when an instruction at an instruction address accesses a datum at a data address, (a) performing a check that the owner module-id annotated onto said instruction address matches the ownable module-id annotated onto said data address, and (b) ignoring in said check any differences in a number of least-significant bits of the owner module-id and of the ownable module-id, where the number of the least-significant bits ignored is the owner module suffix length annotated onto said instruction address, and if said check fails, trapping to a handler.

11. A method for regulating an execution of a program by a microprocessor, said microprocessor having instruction addresses and data addressees, said microprocessor having a current-module-id register, said current-module-id register having a value, said method comprising:

annotating at least one data address with an ownable module-id, when an instruction at an instruction address accesses a datum at a data address, (a) performing a check that the value of said current-module-id register matches the ownable module-id annotated onto said data address, and if said check fails trapping to a handler.

12. The method of claim 11, said microprocessor further having a current module suffix length register, said current module suffix length register having a value, said method further comprising, (b) ignoring in said check any differences in a number of least-significant bits of the value of said current-module-id register and of the ownable module-id, where the number of the least-significant bits ignored is the value of said current module suffix length register.

13. The method of claim 11, said microprocessor further having a target-pub-multi instruction, said target-pub-multi instruction having a new-module-id argument, said method further comprising, when a control transfer instruction transfers control to a target instruction address, if said target instruction address has a target-pub-multi instruction, setting the value of said current-module-id register to the new-module-id argument of said target-pub-multi instruction.

* * * * *